(12) United States Patent
Imagawa et al.

(10) Patent No.: US 6,819,782 B1
(45) Date of Patent: Nov. 16, 2004

(54) DEVICE AND METHOD FOR RECOGNIZING HAND SHAPE AND POSITION, AND RECORDING MEDIUM HAVING PROGRAM FOR CARRYING OUT THE METHOD RECORDED THEREON

(75) Inventors: Kazuyuki Imagawa, Fukuoka (JP); Hideaki Matsuo, Fukuoka (JP); Seiji Igi, Tokorozawa (JP); Shan Lu, Tokorozawa (JP)

(73) Assignees: Matsushita Electric Industrial Co., Ltd., Osaka (JP); Communications Research Laboratory of Ministry of Posts and Telecommunications, Toyko (JP)

( * ) Notice: Subject to any disclaimer, the term of this patent is extended or adjusted under 35 U.S.C. 154(b) by 528 days.

(21) Appl. No.: 09/588,948

(22) Filed: Jun. 8, 2000

(30) Foreign Application Priority Data

Jun. 8, 1999 (JP) ............................................ 11/161557
Nov. 11, 1999 (JP) ............................................ 11-321580

(51) Int. Cl.[7] ............................. G06K 9/00; G06K 9/46; G06K 9/68
(52) U.S. Cl. ......................... 382/115; 382/203; 382/218
(58) Field of Search ................................ 382/103, 115, 382/116, 190, 195, 203, 209, 217, 218, 224, 225, 228; 345/157

(56) References Cited

U.S. PATENT DOCUMENTS 5,710,833 A    1/1998  Moghaddam et al. ........ 382/228

(List continued on next page.)

FOREIGN PATENT DOCUMENTS

JP           8-263629        10/1996

(List continued on next page.)

OTHER PUBLICATIONS

"Gesture Recognition Using Colored Gloves" by Watanabe et al., Publication of the Electric Information Communication Society, vol. J80–D–2, No. 10, pp. 2713–2722, Oct. 1997.

(List continued on next page.)

Primary Examiner—Mehrdad Dastouri
(74) Attorney, Agent, or Firm—Wenderoth, Lind & Ponack L.L.P.

(57) ABSTRACT

An object of the present invention is to provide a device and a method for recognizing hand shape and position even if a hand image to be provided for recognition is rather complicated in shape, and a recording medium having a program for carrying out the method recorded thereon.

A hand image normalization part 11 deletes a wrist region respectively from a plurality of images varied in hand shape and position before subjecting the images to normalization in hand orientation and size to generate hand shape images. An eigenspace calculation part 13 calculates an eigenvalue and an eigenvector respectively from the hand shape images under an analysis based on an eigenspace method. An eigenspace projection part 15 calculates eigenspace projection coordinates by projecting the hand shape images onto an eigenspace having the eigenvectors as a basis. A hand image normalization part 21 deletes a wrist region from an input hand image, and generates an input hand shape image by normalizing the input hand image to be equivalent to the hand shape images. An eigenspace projection part 22 calculates eigenspace projection coordinates for the input hand shape image by projecting the same onto the eigenspace having the eigenvectors as the basis. A hand shape image selection part 23 compares the eigenspace projection coordinates calculated for the input hand shape image with each of the eigenspace projection coordinates calculated for the hand shape images, and then determines which of the hand shape images is closest to the input hand shape image. A shape/position output part 24 outputs shape information and position information on the determined hand shape image.

28 Claims, 37 Drawing Sheets

U.S. PATENT DOCUMENTS

| | | | | |
|---|---|---|---|---|
| 6,002,808 A | * | 12/1999 | Freeman | 382/288 |
| 6,128,003 A | * | 10/2000 | Smith et al. | 345/157 |
| 6,236,736 B1 | * | 5/2001 | Crabtree et al. | 382/103 |
| 6,526,156 B1 | * | 2/2003 | Black et al. | 382/103 |

FOREIGN PATENT DOCUMENTS

| | | |
|---|---|---|
| JP | 8-339445 | 12/1996 |

OTHER PUBLICATIONS

"Real–Time Vission–Based Hand Gesture Estimation for Human–Computer Interfaces" by Ishibuchi et al., Publication of the Electronic Information Communication Society, Vo., J79–D–2, No. 7, pp. 1218–1229.

"Gesture Recognition Using colored Gloves" by Iwai et al., IEEE, 1996, pp. 662–666 (related document of AK).

"Spaced–Time Gestures" by Darrell et al., Perceptual Computing Group, MIT Media Laboratory, IEE, 1993, pp. 335–340.

* cited by examiner

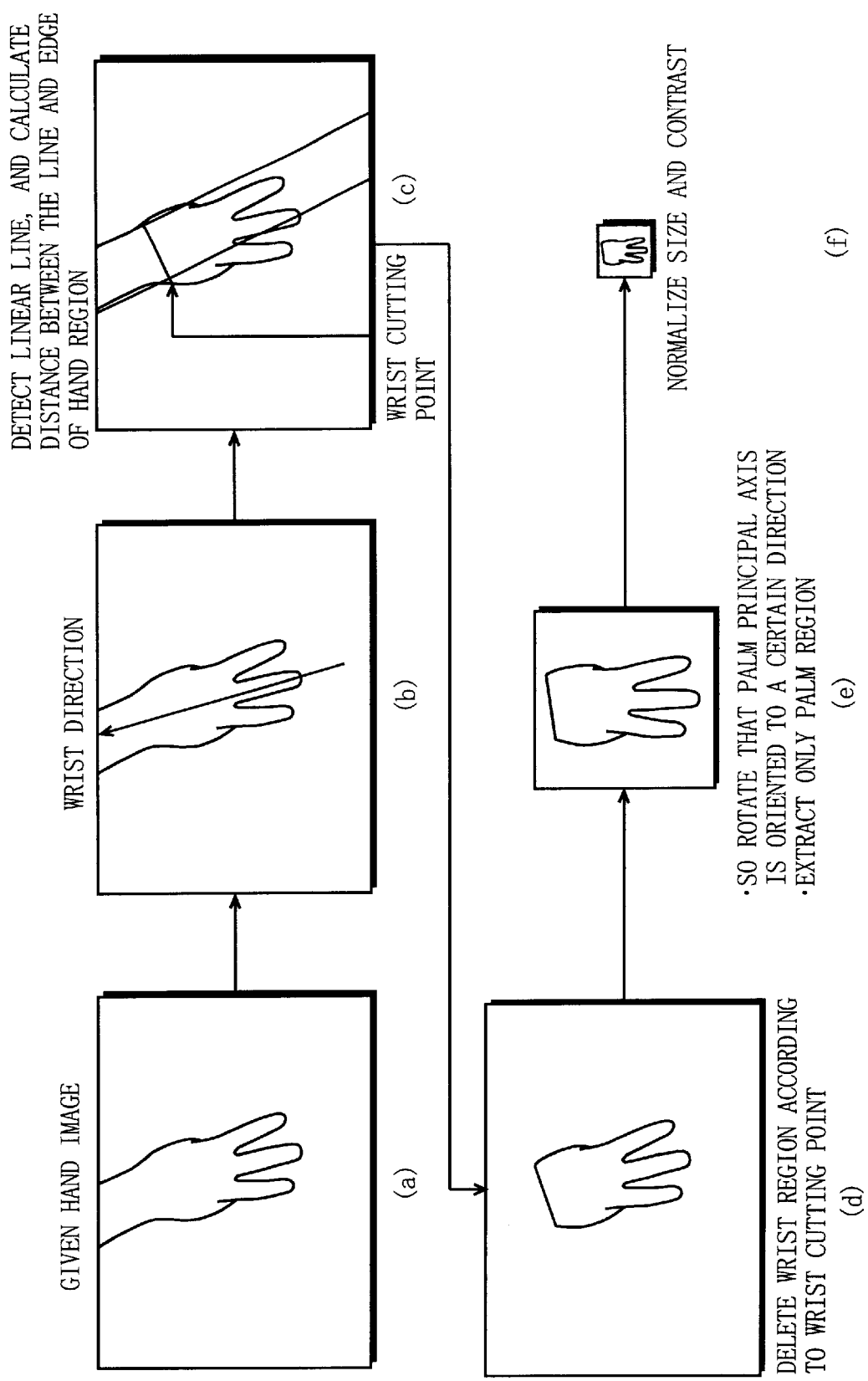

FIG. 3

| HAND SHAPE IMAGE | SHAPE INFORMATION | POSITION INFORMATION | EIGENSPACE PROJECTION COORDINATES |
|---|---|---|---|
| | FIVE EXTENDED FINGERS | PERPENDICULAR TO OPTICAL AXIS, WHICH DIRECTION PALM IS FACED: FRONT-FACING | |
| | FIVE EXTENDED FINGERS | PERPENDICULAR TO OPTICAL AXIS, WHICH DIRECTION PALM IS FACED: RIGHT TOWARD FRONT | |
| | FIVE EXTENDED FINGERS | PERPENDICULAR TO OPTICAL AXIS, WHICH DIRECTION PALM IS FACED: RIGHT-FACING | |
| | FIVE EXTENDED FINGERS | PERPENDICULAR TO OPTICAL AXIS, WHICH DIRECTION PALM IS FACED: RIGHT TOWARD REAR | |
| | FIVE EXTENDED FINGERS | PERPENDICULAR TO OPTICAL AXIS, WHICH DIRECTION PALM IS FACED: REAR-FACING | |
| ... | | | |
| | TWO EXTENDED FINGERS | PERPENDICULAR TO OPTICAL AXIS, WHICH DIRECTION PALM IS FACED: FRONT-FACING | |
| | TWO EXTENDED FINGERS | PERPENDICULAR TO OPTICAL AXIS, WHICH DIRECTION PALM IS FACED: RIGHT TOWARD FRONT | |
| | TWO EXTENDED FINGERS | PERPENDICULAR TO OPTICAL AXIS, WHICH DIRECTION PALM IS FACED: RIGHT-FACING | |
| ... | | | |

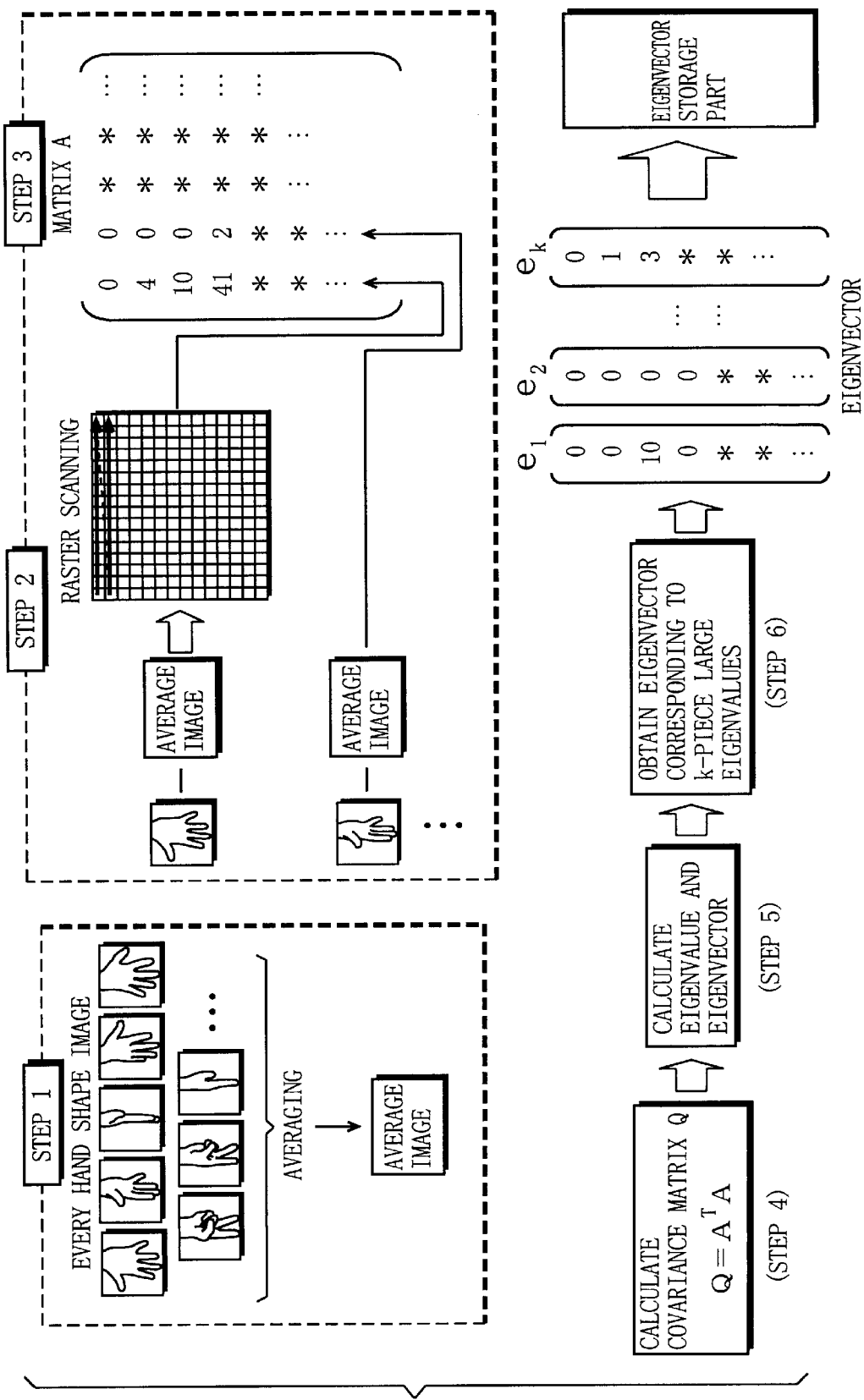
F I G. 4

FIG. 9

| HAND SHAPE IMAGE | SHAPE INFORMATION | POSITION INFORMATION | EIGENSPACE PROJECTION COORDINATES | CLUSTER ID |
|---|---|---|---|---|
| | FIVE EXTENDED FINGERS | PERPENDICULAR TO OPTICAL AXIS, WHICH DIRECTION PALM IS FACED:FRONT-FACING | | |
| | FIVE EXTENDED FINGERS | PERPENDICULAR TO OPTICAL AXIS, WHICH DIRECTION PALM IS FACED:RIGHT TOWARD FRONT | | |
| | FIVE EXTENDED FINGERS | PERPENDICULAR TO OPTICAL AXIS, WHICH DIRECTION PALM IS FACED:RIGHT-FACING | | |
| | FIVE EXTENDED FINGERS | PERPENDICULAR TO OPTICAL AXIS, WHICH DIRECTION PALM IS FACED:RIGHT TOWARD REAR | | |
| | FIVE EXTENDED FINGERS | PERPENDICULAR TO OPTICAL AXIS, WHICH DIRECTION PALM IS FACED:REAR-FACING | | |
| ... | | | | |
| | TWO EXTENDED FINGERS | PERPENDICULAR TO OPTICAL AXIS, WHICH DIRECTION PALM IS FACED:FRONT-FACING | | |
| | TWO EXTENDED FINGERS | PERPENDICULAR TO OPTICAL AXIS, WHICH DIRECTION PALM IS FACED:RIGHT TOWARD FRONT | | |
| | TWO EXTENDED FINGERS | PERPENDICULAR TO OPTICAL AXIS, WHICH DIRECTION PALM IS FACED:RIGHT-FACING | | |
| ... | | | | |

FIG. 13
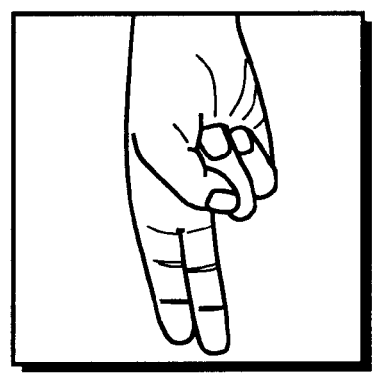 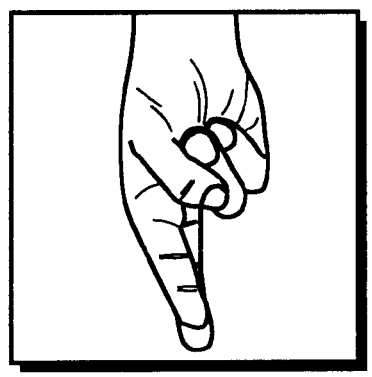

FIG. 19

| MEANING | CLUSTER SERIES |
|---------|----------------|
| LETTER | 1 5 2 |
| LETTER | 1 5 5 2 |
| ME | 3 3 4 2 |
| ME | 3 2 |
| ADDRESS | 2 3 2 |
| ⋮ | ⋮ |

FIG. 22

| HAND SHAPE IMAGE | HAND IMAGE SERIES | STEP | MEANING | EIGENSPACE PROJECTION COORDINATES | CLUSTER ID |
|---|---|---|---|---|---|
| 🖐 | | 1 | GOOD BYE | | |
| ... | | ... | | | |
| 🖐 | | 3 | | | |
| ✌ | | 1 | VICTORY SIGN | | |
| ... | | ... | | | |
| | | | | | |
| | | | | | |
| | | | | | |
| | | | | | |

F I G. 23

| SIGN LANGUAGE WORD: SAY | | | SIGN LANGUAGE WORD: PLEASE | | | SIGN LANGUAGE WORD: LIKE | | |
|---|---|---|---|---|---|---|---|---|
| | RIGHT HAND | | | RIGHT HAND | | | RIGHT HAND | |
| HAND SHAPE | [START] | [END] | HAND SHAPE | [START] | [END] | HAND SHAPE | [START] | [END] |
| HAND POSITION | FINGER POINTED UP PALM HORIZONTALLY ORIENTED | FINGER POINTED (DIAGONALLY) FORWARD PALM HORIZONTALLY ORIENTED | HAND POSITION | FINGER POINTED UP PALM HORIZONTALLY ORIENTED | FINGER POINTED (DIAGONALLY) FORWARD PALM HORIZONTALLY ORIENTED | HAND POSITION | FINGER POINTED UP PALM FACING SIGNER'S BODY | FINGER POINTED UP PALM UPWARDLY ORIENTED |
| LOCATION | FINGER CLOSE TO MOUTH PALM FACING NECK | | LOCATION | PALM FACING NECK | | LOCATION | FINGER BENEATH CHIN | |
| MOVEMENT | HAND PUSHED FORWARD OR OBLIQUELY-LOWERED | | MOVEMENT | HAND PUSHED FORWARD OR OBLIQUELY-LOWERED | | MOVEMENT | HAND PUSHED OBLIQUELY-LOWERED | |
| | LEFT HAND | | | LEFT HAND | | | LEFT HAND | |
| | [START] | [END] | | [START] | [END] | | [START] | [END] |
| | NONE | NONE | | NONE | NONE | | NONE | NONE |

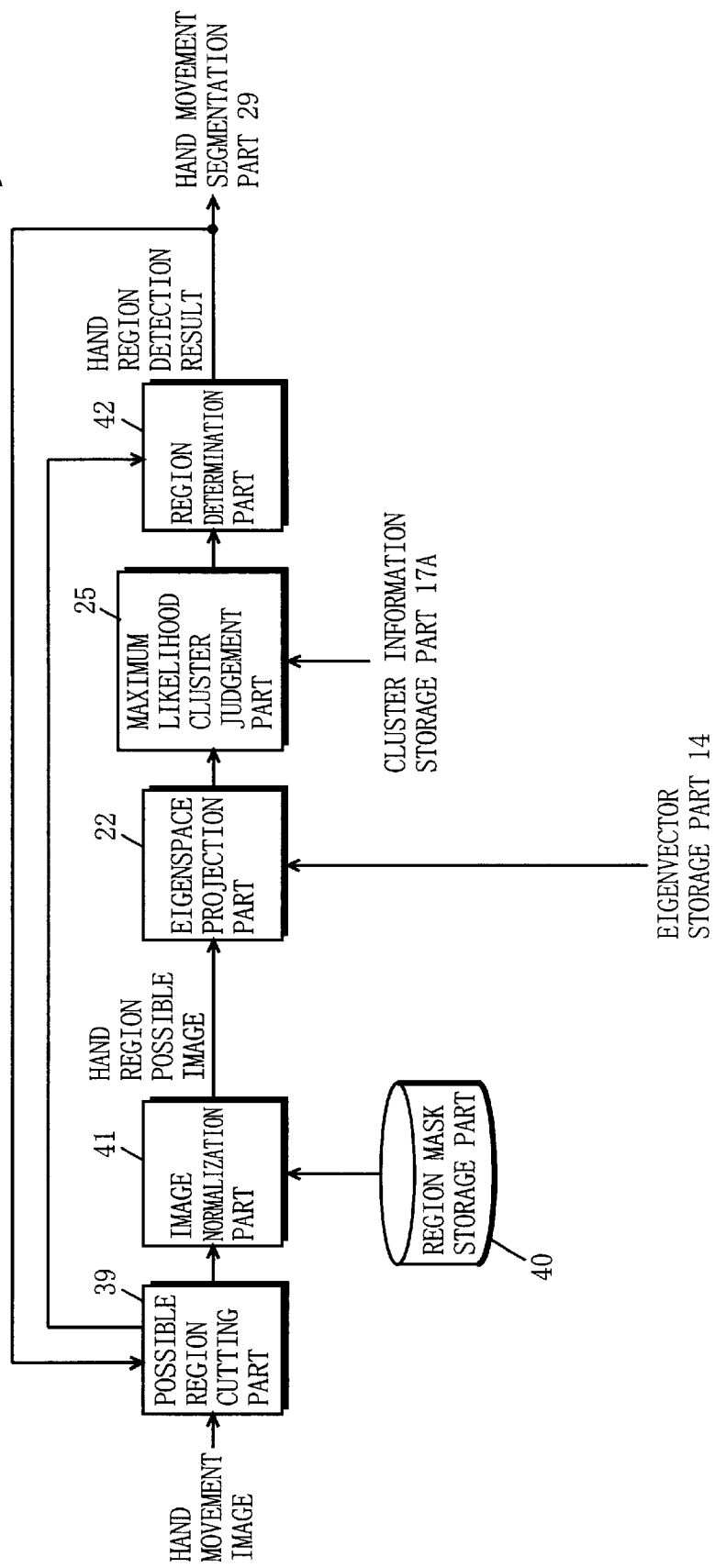
F I G. 2 5

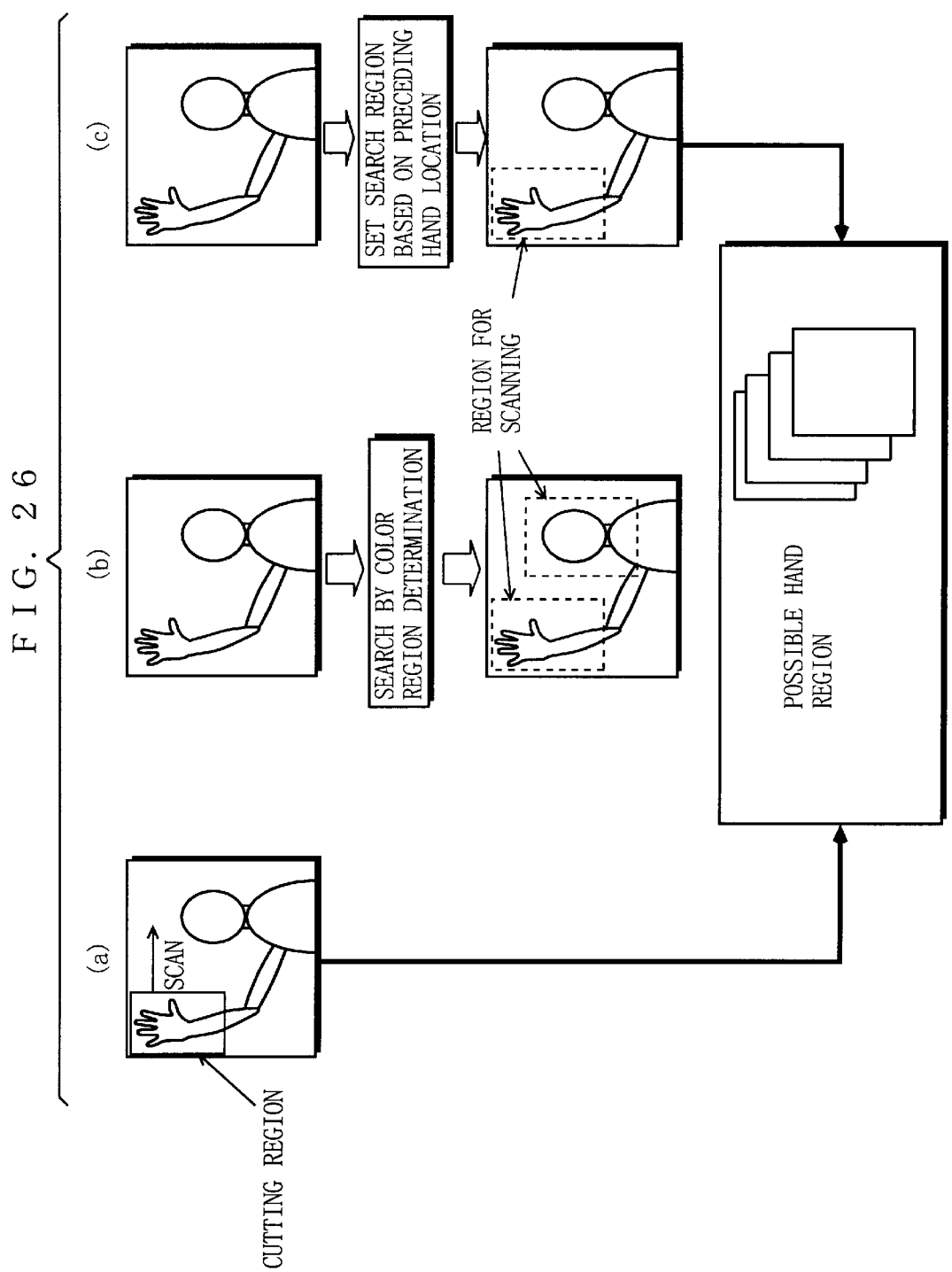

FIG. 31
| CLUSTER | REGION MASK |
|---|---|
| 1 | 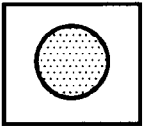 |
| ⋮ | |
| 3 | 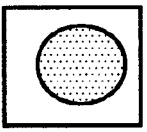 |
| 4 | 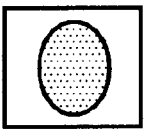 |
| 6 | 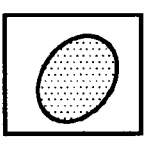 |
| 7 | 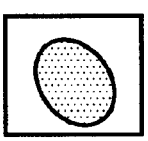 |
| 8 | 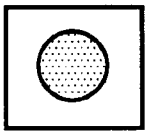 |
| ⋮ | |

FIG. 35
[EXAMPLE 3]
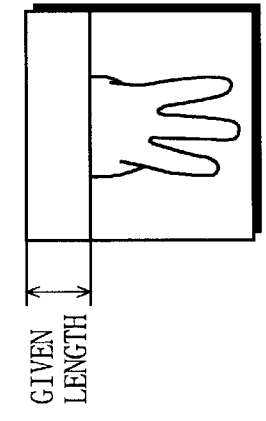
GIVEN LENGTH
· DELETE SEPARATED BY LINE HORIZONTALLY DRAWN FROM POINT HAVING GIVEN LENGTH FROM
[EXAMPLE 2]
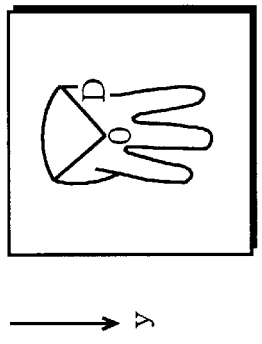
→ y
· DELETE REGION LOCATING FURTHER FROM REGION HAVING LENGTH OF D FROM CENTER OF IMAGE IN −y DIRECTION
[EXAMPLE 1]
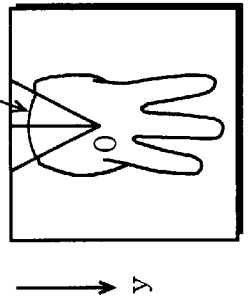
A DEGREE
→ y
· DELETE PART HAVING ±A DEGREE FROM CENTER POINT OF IMAGE IN −y DIRECTION
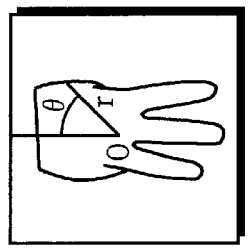
[EXAMPLE 4]
⇧ INDICATE POLAR-COORDINATES

DEVICE AND METHOD FOR RECOGNIZING HAND SHAPE AND POSITION, AND RECORDING MEDIUM HAVING PROGRAM FOR CARRYING OUT THE METHOD RECORDED THEREON

BACKGROUND OF THE INVENTION

1. Field of the Invention

The present invention relates to devices and methods for recognizing hand shape and position, and recording media each having a program for carrying out the methods recorded thereon, and more specifically to a device and a method for recognizing hand shape and position, without the help of an exemplary cable-connected data glove, in an applicable manner to man-machine interfaces and sign language recognition devices, for example, and to a recording medium having a program for carrying out the method recorded thereon.

2. Description of the Background Art

For a new human interface technique, currently, research and development of a device which recognizes human hand shape and grasps information conveyed thereby is actively conducted. Also, research for recognizing hand shape and position observed in sign language is also active to support communications between the hearing impaired and the able-bodied.

A general method for capturing human hand shape uses a sensor such as data glove to measure hand position and finger joint angles, and an exemplary well-known method is found in the document published by The Institute of Electrical Engineers of Japan, Instrumentation and Measurement (pp. 49 to 56, 1994) (hereinafter, referred to as first document). In the first document, the glove is provided with optical fibers along every finger, and finger joint angles are estimated by a change in light intensity.

A method for recognizing hand shape without the glove-type sensor as in the first document but with a camera is found in the document titled "Gesture Recognition Using Colored Gloves" by Watanabe, et al., (Publication of The Electronic Information Communications Society, Vol. J80-D-2, No. 10, pp. 2713 to 2722) (hereinafter, referred to as second document). In the second document, images are captured through a multicolored glove (marker) for hand shape recognition.

An exemplary method for recognizing hand shape and position without such marker but with only a camera is disclosed in the Japanese Patent Laying-Open No. 8-263629 (96-263629) titled "Object Shape/Position Detector" (hereinafter, referred to as third document). In the third document, hand shape recognition and hand position estimation are conducted through images captured by a camera placed in front of a hand. Herein, the method uses at least three cameras to photograph the hand, and the hand is taken in as a plane so as to determine to which camera the hand is facing.

Another method for recognizing hand shape from images captured by a front-facing camera is found in the document titled "Real-Time Vision-Based Hand Gesture Estimation For Human-Computing Interfaces" by Ishibuchi, et al., (Publication of The Electronic Information Communications Society, Vol. J79-D-2, No. 7, paragraphs 1218 to 1229) (hereinafter, referred to as fourth document). In the fourth document, from hand images captured by a plurality of cameras, a direction from wrist to middle finger (hereinafter, referred to as palm principal axis) is determined. And the position of each fingertip is also determined to count the number of extended fingers.

In recent years, to recognize object position and type of face or car, for example, an image recognition method, which is the combination of a dummy image method and an eigenspace method, has been in the spotlight. The dummy image method uses only previously-captured 2D dummy images of a 3D object to recognize the position and type thereof. The eigenspace method is the one conventionally applied, and uses an eigenspace structured by eigenvectors in a covariance matrix (or auto correlation matrix) obtained through an operation performed on a matrix being image data. In the eigenspace method, it is well-known to apply principal component analysis or KL expansion to images.

A technique for applying the principal component analysis to images is briefly described next below.

The principal component analysis is a statistical technique utilizing an eigenspace. This is popular as a technique in multivariate analysis, and is so carried out that featured points on a multidimensional space are represented on a space where the number of dimensions is reduced. This is done to make the featured points easier to see and handle. Fundamentally, featured points on a multidimensional space are linearly projected onto a less-dimensional orthogonal subspace where a distribution level is high.

In a case where the principal component analysis technique is applied to images, first, an image unit including p-piece images is expressed by $$\{U_1, U_2, U_3, \ldots, U_p\},$$

where U denotes a column vector obtained by subjecting images of n×m pixels to raster scanning.

Second, a component of average image c obtained from a plurality of images is deducted from the respective column vectors in the image unit. Assuming that an nm×p matrix structured by such column vectors is A, the matrix A is expressed by $$A = [U_1-c, U_2-c, \ldots, U_p-c],$$

and accordingly a covariance matrix Q is calculated by the following equation (1). Note that, a matrix $A^T$ indicates a matrix transposed from the matrix A.

$$Q = AA^T \qquad (1)$$

Thereafter, a characteristic equation (2) is solved by using the covariance matrix Q.

$$\lambda_i = Q e_i \qquad (2)$$

Herein, assuming that the number of dimensions of a to-be-structured subspace is k, the subspace can be structured by using eigenvectors which correspond to k-piece large eigenvalues $$e_1, e_2, \ldots, e_k (\lambda_1 \geq \lambda_2 \geq \ldots \geq \lambda_k \geq \ldots \geq \lambda_p)$$

as basis.

In this manner, according to the following equation (3), by linearly projecting a certain image x onto the subspace represented by the eigenvectors, the image in the n×m dimension can be represented by a kth dimension featured vector y in a less-dimensional space.

$$y = [e_1, e_2, \ldots, e_k]^T x \qquad (3)$$

An exemplary method for detecting and recognizing any multifeatured entity such as human face under principal component analysis or KL expansion is found in the Japanese Patent Laying-Open No. 8-339445 (96-339445) titled "Detection, Recognition and Coding of Complex Objects Using Probabilistic Eigenspace Analysis" (hereinafter, referred to as fifth document). The feature of the fifth document lies in a respect that the conventionally-known principal component analysis and KL expansion are applied to a multifeatured entity such as face. The fifth document exemplarily applies such techniques to recognize hand shape, and the method in the fifth document is described next below.

First, a plurality of hand images captured through hand movement or gesture are photographed with a black background. Second, the two-dimensional contour of the hand is extracted by using Canny's edge operator. Thereafter, the obtained edge images are subjected to the KL expansion to calculate a subspace. If an edge map in binary is used herein, however, the images may show little correlation with one another, and thus the number of dimensions k of the subspace needs to be increased to a considerable extent. By taking this into consideration, the example described in the fifth document proposes to calculate the subspace after blurring the edge images, on the edge map in binary, through distribution processing. In this manner, the number of dimensions of the subspace can be suppressed. Further, in the fifth document, the images are entirely searched on a predetermined size basis so as to find the hand location from an input image, and then recognition is carried out.

However, for hand shape recognition, wearing such data glove as in the first document may restrict hand movement due to codes connected thereto, and a user may feel uncomfortable about wearing the tight glove.

In a case where hand shape recognition is conducted by using a camera presumably together with a marker such as glove, as in the second document, the hand shape recognition cannot be achieved without the glove, and the problem of uncomfortableness is still left unsolved.

Further, in a case where hand shape and position recognition is conducted without the glove or marker but with a plurality of cameras, as in the third document, the hand is taken in as a plane so as to determine to which camera the hand is facing. In reality, however, the hand can be in a variety of shapes and some shapes cannot be judged as being closely analogous to the plane. Accordingly, the method can be applied to recognize simple shapes formed only by extending or bending fingers, for example, but not to rather complicated shapes (e.g., a circle formed by a thumb and an index finger).

Still further, in the method based on the conventional eigenspace analysis as described in the fourth document, it is not specified how to capture normalized images only of a hand. The importance for the method based on the eigenspace analysis lies in how an image region of an object is cut out before normalization. When being a simple unit, the object only needs to be subjected to normalization with respect only to size and contrast. On the other hand, when being complicated such as hand or face, the object needs to be subjected to cutting processing before normalization.

For example, when the method is applied to face recognition, popularly, eye and nose regions are first moved to a predetermined position, and then chin and hair regions are deleted. When the method is applied to hand recognition, a wrist region is first deleted in some manner, and then the hand is moved to a predetermined position for normalization. Without such processing, the method based on the eigenspace analysis may result in a low recognition rate for hand shape and position recognition.

Still further, in a case where the eigenspace analysis is applied to a human hand image as in the fifth document, it is required to extract the contour of the hand and blur an edge image. In this manner, it is impossible to distinguish between an image of one finger and an image of two fingers abutting to each other, therefore the method cannot be applied to rather complicated shapes.

SUMMARY OF THE INVENTION

Therefore, an object of the present invention is to provide a device and a method for recognizing hand shape and position even if a hand image to be provided for recognition is rather complicated in shape, and a recording medium having a program for carrying out the method recorded thereon. This is implemented by, under a method based on the eigenspace analysis, normalizing a plurality of prestored hand images varied in hand shape and position and the to-be-provided hand image after a wrist region is respectively deleted therefrom.

The present invention has the following features to attain the object above.

A first aspect of the present invention is directed to a device for recognizing hand shape and position of a hand image obtained by optical read means (hereinafter, referred to as input hand image). A device in accordance with the first aspect of the present invention comprises: a first hand image normalization part for receiving a plurality of hand images varied in hand shape and position, and after a wrist region is respectively deleted therefrom, subjecting the hand images to normalization in a predetermined manner (in hand orientation, image size, image contrast) to generate hand shape images; a hand shape image information storage part for storing the hand shape images together with shape information and position information about each of the hand shape images; an eigenspace calculation part for calculating an eigenvalue and an eigenvector from each of the hand shape images under analysis based on an eigenspace method; an eigenvector storage part for storing the eigenvectors; a first eigenspace projection part for calculating eigenspace projection coordinates respectively for the hand shape images by projecting the hand shape images onto an eigenspace having the eigenvectors as a basis, and storing the eigenspace projection coordinates into the hand shape image information storage part; a second hand image normalization part for receiving the input hand image, and after a wrist region is deleted therefrom, normalizing the input hand image to generate an input hand shape image being equivalent to the hand shape images; a second eigenspace projection part for calculating eigenspace projection coordinates for the input hand shape image by projecting the input hand shape image onto the eigenspace having the eigenvectors as the basis; a hand shape image selection part for comparing the eigenspace projection coordinates calculated by the second eigenspace projection part with the eigenspace projection coordinates stored in the hand shape image information storage part, and determining which of the hand shape images is closest to the input hand shape image; and a shape/position output part for obtaining, for output, the shape information and the position information on the closest hand shape image from the hand shape image information storage part.

As described above, in the first aspect, a plurality of hand images varied in hand shape and position and an input hand image for recognition are all subjected to wrist region deletion before normalization. Therefore, the hand images can be normalized with higher accuracy compared to a case where the hand images are simply subjected to normalization in size and contrast. Accordingly, under a method based on the eigenspace, the hand shape and position can be recognized with accuracy of a sufficient degree.

Further, by using the method based on the eigenspace, geometric characteristics such as the number of extended fingers can be recognized, whereby rather complicated hand shapes having little geometric characteristics can be correctly recognized.

A second aspect of the present invention is directed to a device for recognizing hand shape and position of a hand image obtained by optical read means (hereinafter, referred to as input hand image). A device in accordance with the second aspect of the present invention comprises: a first hand image normalization part for receiving a plurality of hand images varied in hand shape and position, and after a wrist region is respectively deleted therefrom, subjecting the hand images to normalization in a predetermined manner (in hand orientation, image size, image contrast) to generate hand shape images; a hand shape image information storage part for storing the hand shape images together with shape information and position information about each of the hand shape images; an eigenspace calculation part for calculating an eigenvalue and an eigenvector from each of the hand shape images under analysis based on an eigenspace method; an eigenvector storage part for storing the eigenvectors; a first eigenspace projection part for calculating eigenspace projection coordinates respectively for the hand shape images by projecting the hand shape images onto an eigenspace having the eigenvectors as a basis, and storing the eigenspace projection coordinates into the hand shape image information storage part; a cluster evaluation part for classifying, into clusters, the eigenspace projection coordinates under cluster evaluation, determining which of the hand shape images belongs to which cluster for storage into the hand shape image information storage part, and obtaining statistical information about each cluster; a cluster information storage part for storing each of the statistical information together with the cluster corresponding thereto; a second hand image normalization part for receiving the input hand image, and after a wrist region is deleted therefrom, normalizing the input hand image to generate an input hand shape image being equivalent to the hand shape images; a second eigenspace projection part for calculating eigenspace projection coordinates for the input hand shape image by projecting the input hand shape image onto the eigenspace having the eigenvectors as the basis; a maximum likelihood cluster judgement part for comparing the eigenspace projection coordinates calculated by the second eigenspace projection part with each of coordinates included in the statistical information stored in the cluster information storage part, and determining which cluster is the closest; an image comparison part for comparing the hand shape images included in the closest cluster with the input hand shape image, and determining which of the hand shape images is analogous most closely to the input hand shape image; and a shape/position output part for obtaining, for output, the shape information and the position information on the most analogous hand shape image from the hand shape image information storage part.

As described above, in the second aspect, the hand shape images stored in the hand shape image information storage part are classified into clusters, under cluster evaluation in the eigenspace. Thereafter, it is decided to which cluster an input hand image belongs, and then is decided which hand shape image in the cluster is the closest to the input hand image. In this manner, the frequency of comparison for matching can be reduced and the processing speed can be improved. Further, it is possible to accurately define each image by hand shape and position even if the images are analogous in hand position from a certain direction but different in hand shape.

According to a third aspect, in the second aspect, the image comparison part includes: an identical shape classification part for classifying, according to hand shape, the hand shape images included in the cluster determined by the maximum likelihood cluster judgement part into groups before comparing the hand shape images with the input hand shape image generated by the second hand image normalization part; a shape group statistic calculation part for calculating a statistic representing the groups; and a maximum likelihood shape judgement part for calculating a distance between the input hand shape image and the statistic, and outputting a hand shape included in the closest group.

As described above, in the third aspect, in a case where the hand shape images are enough to be defined only by hand shape, the hand shape can be recognized more accurate than a case where the hand shape and the hand position are both recognized.

According to a fourth aspect, in the second aspect, the cluster evaluation part obtains the hand shape images and the shape information for each cluster from the hand shape image information storage part, calculates a partial region respectively for the hand shape images for discrimination, and stores the partial regions into the cluster information storage part; and the image comparison part compares the hand shape images in the cluster determined by the maximum likelihood cluster judgement part with the input hand shape image generated by the second hand image normalization part only in the partial region corresponding to the cluster.

As described above, in the fourth aspect, a partial region is predetermined, and the comparison for matching between the hand shape images and the input hand shape image is done for the parts within the partial region. In this manner, the comparison for matching can be less frequent than the second aspect, and accordingly still higher-speed processing can be achieved with a higher degree of accuracy even if the images are analogous in hand position from a certain direction but different in hand shape.

According to a fifth aspect, in the second aspect, when the input hand image is plurally provided by photographing a hand from several directions, the second hand image normalization part generates the input hand shape image for each of the input hand images, the second eigenspace projection part calculates the eigenspace projection coordinates in the eigenspace respectively for the input hand shape images generated by the second hand image normalization part, the maximum likelihood cluster judgement part compares each of the eigenspace projection coordinates calculated by the second eigenspace projection part with the statistical information, and determines which cluster is the closest, and the image comparison part merges the closest clusters determined by the maximum likelihood cluster judgement part, and estimates hand shape and position consistent to the shape information and the position information about the hand shape images in each of the clusters.

As described above, in the fifth aspect, input hand images obtained from a plurality of cameras can be defined by hand shape and position by merging clusters, based on the closeness in distance thereamong, determined for each of the input hand images. In this manner, even a hand image which has been difficult to recognize from one direction (e.g., a hand image from the side) can be defined by hand shape and position with accuracy.

A sixth aspect of the present invention is directed to a device for recognizing a meaning of successive hand images (hereinafter, referred to as 66) obtained by optical read means. A device in accordance with the sixth aspect of the present invention comprises: a first hand image normalization part for receiving a plurality of hand images varied in hand shape and position, and after a wrist region is respectively deleted therefrom, subjecting the hand images to normalization in a predetermined manner (in hand orientation, image size, image contrast) to generate hand shape images; a hand shape image information storage part for storing the hand shape images together with shape information and position information about each of the hand shape images; an eigenspace calculation part for calculating an eigenvalue and an eigenvector from each of the hand shape images under analysis based on an eigenspace method; an eigenvector storage part for storing the eigenvectors; a first eigenspace projection part for calculating eigenspace projection coordinates respectively for the hand shape images by projecting the hand shape images onto an eigenspace having the eigenvectors as a basis, and storing the eigenspace projection coordinates into the hand shape image information storage part; a cluster evaluation part for classifying, into clusters, the eigenspace projection coordinates under cluster evaluation, determining which of the hand shape images belongs to which cluster for storage into the hand shape image information storage part, and obtaining statistical information about each cluster; a cluster information storage part for storing each of the statistical information together with the cluster corresponding thereto; a hand region detection part for receiving the hand movement image, and detecting a hand region respectively from the hand images structuring the hand movement image; a hand movement segmentation part for determining how the hand is moved in each of the detected hand regions, and finding any change point in hand movement according thereto; a hand image cutting part for cutting an image corresponding to the detected hand region respectively from the images including the change points; a second hand image normalization part for respectively normalizing one or more hand images (hereinafter, referred to as hand image series) cut from the hand movement image by the hand image cutting part, after a wrist region is each deleted therefrom, and generating input hand shape images being equivalent to the hand shape images; a second eigenspace projection part for calculating eigenspace projection coordinates for each of the input hand shape images by projecting the input hand shape images onto the eigenspace having the eigenvectors as the basis; a maximum likelihood cluster judgement part for comparing each of the eigenspace projection coordinates calculated by the second eigenspace projection part with the statistical information stored in the cluster information storage part, determining which cluster is the closest to each of the eigenspace projection coordinates, and outputting a symbol each specifying the clusters; a series registration part for registering, in a series identification dictionary part, the symbols (hereinafter, referred to symbol series) corresponding to the hand image series outputted by the maximum likelihood cluster judgement part together with a meaning of the hand movement image; the series identification dictionary part for storing the meaning of the hand movement image and the symbol series corresponding thereto; and an identification operation part for obtaining, for output, one of the meanings corresponding to the symbol series outputted by the maximum likelihood cluster judgement part from the series identification dictionary part.

As described above, in the sixth aspect, the meaning of the hand movement successively made to carry a meaning in gesture or sign language is previously stored together with a cluster series created from some images including the change points. Thereafter, at the time of recognizing the hand movement image, the cluster series is referred to for outputting the stored meaning. In this manner, the hand movement successively made to carry the meaning in gesture or sign language can be recognized with higher accuracy, and accordingly can be correctly caught in meaning.

According to a seventh aspect, in the sixth aspect, the device further comprises: a comprehensive movement recognition part for receiving the hand movement image, and outputting a possibility for meaning by judging how the hand is moved and where the hand is located in the hand movement image; and a restriction condition storage part for previously storing a restriction condition for restricting, according to the successive hand movement, the meaning of the provided hand movement image, wherein the identification operation part obtains, for output, while taking the restriction condition into consideration, a meaning corresponding to the symbol series outputted by the maximum likelihood cluster judgement part from the series identification dictionary part.

As described above, in the seventh aspect, the restriction conditions relevant to the comprehensive hand movement are additionally imposed, and the hand movement image is defined by meaning. In this manner, the hand movement image can be recognized with higher accuracy.

According to an eighth and a ninth aspects, in the sixth and the seventh aspects, the hand region detection part includes: a possible region cutting part for cutting a possible hand region from the hand images structuring the input hand movement image; a masking region storage part for storing a masking region used to extract only the possible hand region from an image of a rectangular region; a hand region image normalization part for superimposing the masking region on each of the possible hand regions cut from the images structuring the hand movement image, and normalizing each thereof to generate an image equivalent to the hand images used to calculate the eigenvectors; a hand region eigenspace projection part for calculating eigenspace projection coordinates for the normalized images by projecting the images onto the eigenspace having the eigenvectors as the basis; a hand region maximum likelihood cluster judgement part for comparing each of the eigenspace projection coordinates calculated by the hand region eigenspace projection part with the statistical information stored in the cluster information storage part, determining which cluster is the closest to each of the eigenspace projection coordinates, and outputting an estimate value indicating closeness between each of the symbols specifying the cluster and a cluster for reference; and a region determination part for outputting, according to the estimation values, position information on the possible hand region whose the estimation value is the highest and the cluster thereof.

As described above, in the eighth and ninth aspects, the hand region is detected by projecting the possible hand region onto the eigenspace and then selecting the appropriate cluster. In this manner, the hand region and the cluster therefor can be simultaneously determined. Accordingly, the hand region can be concurrently detected with the hand shape/position, or with the hand movement.

According to a tenth to a twelfth aspects, in the first, the second, and the sixth aspects, the first hand image normalization part and the second hand image normalization part respectively include: a color distribution storage part for previously storing a color distribution of the hand region to be extracted from the input hand image; a hand region extraction part for extracting the hand region from an input hand image according to the color distribution; a wrist region deletion part for finding which direction a wrist is oriented, and deleting a wrist region from the hand region according to the direction; a region displacement part for displacing the hand region from which the wrist region is deleted to a predetermined location on the image; a rotation angle calculation part for calculating a rotation angle in such a manner that the hand in the hand region is oriented to a predetermined direction; a region rotation part for rotating, according to the rotation angle, the hand region in such a manner that the hand therein is oriented to a direction; and a size normalization part for normalizing the rotated hand region to be in a predetermined size.

As described above, in the tenth to twelfth aspects, when normalizing the hand image, in addition to the deletion of the wrist region, the hand region is extracted based on color (beige). In this manner, the hand can be photographed with a non-artificial background, and from the image taken in thereby, the hand region can be extracted, and therefore the hand shape and position can be recognized with higher accuracy.

According to a thirteenth aspect, in the first aspect, the device further comprises: an instruction storage part for storing an instruction corresponding respectively to the shape information and the position information; and an instruction output part for receiving the shape information and the position information provided by the shape/position output part, and obtaining, for output, the instruction respectively corresponding to the shape information and the position information from the instruction storage part.

As described above, in the thirteenth aspect, the device in the first aspect can be used as an interface for other devices according to the hand shape and position.

A fourteenth aspect of the present invention is directed to a method for recognizing hand shape and position of a hand image obtained by optical read means (hereinafter, referred to as input hand image). A method in accordance with the fourteenth aspect of the present invention comprises: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; a second normalization step of receiving the input hand image, and after a wrist region is deleted therefrom, normalizing the input hand image to generate an input hand shape image being equivalent to the hand shape images; a second projection step of calculating eigenspace projection coordinates for the input hand shape image by projecting the input hand shape image onto the eigenspace having the eigenvectors as the basis; a comparison step of comparing the eigenspace projection coordinates calculated for the hand shape images with the eigenspace projection coordinates calculated for the input hand shape image, and determining which of the hand shape images is closest to the input hand shape image; and a step of outputting the shape information and the position information on the closest hand shape image.

As described above, in the fourteenth aspect, a plurality of hand images varied in hand shape and position and an input hand image for recognition are all subjected to wrist region deletion before normalization. Therefore, the hand images can be normalized with higher accuracy compared to a case where the hand images are simply subjected to normalization in size and contrast. Accordingly, under a method based on the eigenspace, the hand shape and position can be recognized with accuracy of a sufficient degree.

Further, by using the method based on the eigenspace, geometric characteristics such as the number of extended fingers can be recognized, whereby rather complicated hand shapes having little geometric characteristics can be correctly recognized.

A fifteenth aspect of the present invention is directed to a method for recognizing hand shape and position of a hand image obtained by optical read means (hereinafter, referred to as input hand image). A method in accordance with the fifteenth aspect of the present invention comprises: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; an evaluation step of classifying, under cluster evaluation, the eigenspace projection coordinates into clusters, determining which of the hand shape images belongs to which cluster, and obtaining statistical information about each of the clusters; a second normalization step of receiving the input hand image, and after a wrist region is deleted therefrom, normalizing the input hand image to generate an input hand shape image being equivalent to the hand shape images; a second projection step of calculating eigenspace projection coordinates for the input hand shape image by projecting the input hand shape image onto the eigenspace having the eigenvectors as the basis; a judgement step of comparing the eigenspace projection coordinates calculated for the input hand shape image with each of the statistical information, and determining the closest cluster; a comparison step of comparing each of the hand shape images included in the closest cluster with the input hand shape image, and determining which of the hand shape images is most analogous to the input hand shape image, and a step of outputting the shape information and the position information on the most analogous hand shape image.

As described above, in the fifteenth aspect, the hand shape images are classified into clusters, under cluster evaluation. Thereafter, it is decided to which cluster an input hand image belongs, and then is decided which hand shape image in the cluster is the closest to the input hand image. In this manner, the frequency of comparison for matching can be reduced and the processing speed can be improved. Further, it is possible to accurately define each image by hand shape and position even if the images are analogous in hand position from a certain direction but different in hand shape.

According to a sixteenth aspect, in the fifteenth aspect, the comparison step includes, a step of classifying, into clusters, the hand shape images included in the cluster determined in the judgement step before comparing the hand shape images with the input hand shape image generated in the second normalization step; a step of calculating a statistic representing the clusters; and a step of calculating a distance between the input hand shape image and the statistic, and outputting a hand shape included in the closest cluster.

As described above, in the sixteenth aspect, in a case where the hand shape images are enough to be defined only by hand shape, the hand shape can be recognized more accurate than a case where the hand shape and the hand position are both recognized.

According to a seventeenth aspect, in the fifteenth aspect, in the evaluation step, according to the hand shape images and the shape information, a partial region is calculated respectively for the hand shape images for discrimination, and in the comparison step, the hand shape images in the cluster determined in the judgement step are compared with the input hand shape image generated in the second normalization step only in the partial region corresponding to the cluster.

As described above, in the seventeenth aspect, a partial region is predetermined, and the comparison for matching between the hand shape images and the input hand shape image is done for the parts within the partial region. In this manner, the comparison for matching can be less frequent than the fifteenth aspect, and accordingly still higher-speed processing can be achieved with a higher degree of accuracy even if the images are analogous in hand position from a certain direction but different in hand shape.

According to an eighteenth aspect, in the fifteenth aspect, when the input hand image is plurally provided by photographing a hand from several directions, in the second normalization step, the input hand shape image is generated for each of the input hand images, in the second projection step, eigenspace projection coordinates in the eigenspace is calculated respectively for the input hand shape images generated in the second normalization step, in the judgement step, each of the eigenspace projection coordinates calculated in the second projection step is compared with the statistical information, and the closest cluster is determined, and in the comparison step, the closest clusters determined in the judgement step are merged, and hand shape and position consistent to the shape information and the position information about the hand shape images in each of the clusters is estimated.

As described above, in the eighteenth aspect, input hand images obtained from a plurality of cameras can be defined by hand shape and position by merging clusters, based on the closeness in distance thereamong, determined for each of the input hand images. In this manner, even a hand image which has been difficult to recognize from one direction (e.g., a hand image from the side) can be defined by hand shape and position with accuracy.

A nineteenth aspect of the present invention is directed to a method for recognizing a meaning of successive hand images (hereinafter, referred collectively to as hand movement image) obtained by optical read means. A method in accordance with the nineteenth aspect of the present invention comprises: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; an evaluation step of classifying, into clusters, the eigenspace projection coordinates under cluster evaluation, determining which of the hand shape images belongs to which cluster, and obtaining statistical information about each cluster; a detection step of receiving the hand movement image, and detecting a hand region respectively from the images structuring the hand movement image; a segmentation step of determining how the hand is moved in each of the detected hand regions, and finding any change point in hand movement according thereto; a cutting step of cutting an image corresponding to the detected hand region respectively from the images including the change points; a second normalization step of respectively normalizing one or more hand images (hereinafter, referred to as hand image series) cut from the hand movement image, after a wrist region is each deleted therefrom, and generating input hand shape images being equivalent to the hand shape images; a second projection step of calculating eigenspace projection coordinates for each of the input hand shape images by projecting the input hand shape images onto the eigenspace having the eigenvectors as the basis; a judgement step of comparing each of the eigenspace projection coordinates calculated for the input hand shape images with the statistical information, determining which cluster is the closest, and outputting a symbol each specifying the clusters; a step of storing the symbols (hereinafter, referred to symbol series) corresponding to the judged hand image series together with a meaning of the hand movement image; and an identification step of outputting, in order to identify the hand movement image, a meaning corresponding to the judged symbol series based on the stored symbol series and meaning.

As described above, in the nineteenth aspect, the meaning of the hand movement successively made to carry a meaning in gesture or sign language is previously stored together with a cluster series created from some images including the change points. Thereafter, at the time of recognizing the hand movement image, the cluster series is referred to for outputting the stored meaning. In this manner, the hand movement successively made to carry the meaning in gesture or sign language can be recognized with higher accuracy, and accordingly can be correctly caught in meaning.

According to a twentieth aspect, in the nineteenth aspect, the method further comprises: a recognition step of receiving the hand movement image, and outputting a possibility for meaning by judging how the hand is moved and where the hand is located in the hand movement image; and a storage step of previously storing a restriction condition for restricting, according to the successive hand movement, the meaning of the provided hand movement image, wherein the identification step of outputting, while taking the restriction condition into consideration, a meaning corresponding to the judged symbol series based on the stored symbol series and meaning.

As described above, in the twentieth aspect, the restriction conditions relevant to the comprehensive hand movement are additionally imposed, and the hand movement image is defined by meaning. In this manner, the hand movement image can be recognized with higher accuracy.

According to a twenty-first and a twenty-second aspects, in the nineteenth and the twentieth aspects, the detection step includes: a cutting step of cutting a possible hand region from each hand image structuring the input hand movement image; a storage step of storing a masking region used to extract only the possible hand region from an image of a rectangular region; a normalization step of superimposing the masking region on each of the possible hand regions cut from each hand image structuring the hand movement image, and normalizing each thereof to generate an image equivalent to the hand images used to calculate the eigenvectors; a projection step of calculating eigenspace projection coordinates for the normalized images by projecting the images onto the eigenspace having the eigenvectors as the basis; a judgement step of comparing each of the eigenspace projection coordinates with the statistical information, determining which cluster is the closest, and outputting an estimate value indicating closeness between each of the symbols specifying the cluster and a cluster for reference; and a determination step of outputting, according to the estimation values, position information on the possible hand region whose the estimation value is the highest and the cluster thereof.

As described above, in the twenty-first and the twenty-second aspects, the hand region is detected by projecting the possible hand region onto the eigenspace and then selecting the appropriate cluster. In this manner, the hand region and the cluster therefor can be simultaneously determined. Accordingly, the hand region can be concurrently detected with the hand shape/position, or with the hand movement.

According to a twenty-third to a twenty-fifth aspects, in the fourteenth, the fifteenth, and the nineteenth aspects, the first normalization step and the second normalization step respectively include: a color storage step of previously storing a color distribution of the hand region to be extracted from the input hand image; a step of extracting the hand region from an input hand image according to the color distribution; a step of finding which direction a wrist is oriented, and deleting a wrist region from the hand region according to the direction; a step of displacing the hand region from which the wrist region is deleted to a predetermined location on the image; a step of calculating a rotation angle in such a manner that the hand in the hand region is oriented to a predetermined direction; a step of rotating, according to the rotation angle, the hand region in such a manner that the hand therein is oriented to a direction; and a step of normalizing the rotated hand region to be in a predetermined size.

As described above, in the twenty-third to twenty-fifth aspects, when normalizing the hand image, in addition to the deletion of the wrist region, the hand region is extracted based on color (beige). In this manner, the hand can be photographed with a non-artificial background, and from the image taken in thereby, the hand shape and position can be recognized with higher accuracy.

According to a twenty-sixth aspect, in the fourteenth aspect, the method further comprises: an instruction storage step of storing an instruction corresponding respectively to the shape information and the position information; and a step of receiving the shape information and the position information outputted in the output step, and obtaining, for output, the instruction respectively corresponding to the shape information and the position information stored in the instruction storage step.

As described above, in the twenty-sixth aspect, the method in the fourteenth aspect can be used as an interface for other devices according to the hand shape and position.

A twenty-seventh aspect of the present invention is directed to a recording medium being stored a program to be executed on a computer device for carrying out a method for recognizing hand shape and position of a hand image obtained by optical read means (hereinafter, referred to as input hand image). A program in accordance with the twenty-seventh aspect of the present invention realizes an operational environment on the computer device including: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; a second normalization step of receiving the input hand image, and after a wrist region is deleted therefrom, normalizing the input hand image to generate an input hand shape image being equivalent to the hand shape images; a second projection step of calculating eigenspace projection coordinates for the input hand shape image by projecting the input hand shape image onto the eigenspace having the eigenvectors as the basis; a comparison step of comparing the eigenspace projection coordinates calculated for the hand shape images with the eigenspace projection coordinates calculated for the input hand shape image, and determining which of the hand shape images is closest to the input hand shape image; and a step of outputting the shape information and the position information on the closest hand shape image.

A twenty-eighth aspect of the present invention is directed to a recording medium being stored a program to be executed on a computer device for carrying out a method for recognizing hand shape and position of a hand image obtained by optical read means (hereinafter, referred to as input hand image. A program in accordance with the twenty-eighth aspect of the present invention realizes an operational environment on the computer device including: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; an evaluation step of classifying, into clusters, the eigenspace projection coordinates under cluster evaluation, determining which of the hand shape images belongs to which cluster, and obtaining statistical information about each cluster; a second normalization step of receiving the input hand image, and after a wrist region is deleted therefrom, normalizing the input hand image to generate an input hand shape image being equivalent to the hand shape images; a second projection step of calculating eigenspace projection coordinates for the input hand shape image by projecting the input hand shape image onto the eigenspace having the eigenvectors as the basis; a judgement step of comparing the eigenspace projection coordinates calculated for the input hand shape image with each of coordinates included in the statistical information, and determining which cluster is the closest; a comparison step of comparing the hand shape images included in the closest cluster with the input hand shape image, and determining which of the hand shape images is analogous most closely to the input hand shape image; and a step of outputting the shape information and the position information on the most analogous hand shape image.

A twenty-ninth aspect of the present invention is directed to the recording medium of the twenty-eighth aspect, wherein the comparison step includes: a step of classifying, into clusters, the hand shape images included in the cluster determined in the judgement step before comparing the hand shape images with the input hand shape image generated in the second normalization step; a step of calculating a statistic representing the clusters; and a step of calculating a distance between the input hand shape image and the statistic, and outputting a hand shape included in the closest cluster.

According to a thirtieth aspect, in the twenty-eighth aspect, in the evaluation step, according to the hand shape images and the shape information, a partial region is calculated respectively for the hand shape images for discrimination, and in the comparison step, the hand shape images in the cluster determined in the judgement step are compared with the input hand shape image generated in the second normalization step only in the partial region corresponding to the cluster.

According to a thirty-first aspect, in the twenty-eighth aspect, when the input hand image is plurally provided by photographing a hand from several directions, in the second normalization step, the input hand shape image is generated for each of the input hand images, in the second projection step, eigenspace projection coordinates in the eigenspace is calculated respectively for the input hand shape images generated in the second normalization step, in the judgement step, each of the eigenspace projection coordinates calculated in the second projection step is compared with the statistical information, and the closest cluster is determined, and in the comparison step, the closest clusters determined in the judgement step are merged, and hand shape and position consistent to the shape information and the position information about the hand shape images in each of the clusters is estimated.

A thirty-second aspect of the present invention is directed to a recording medium being stored a program to be executed on a computer device for carrying out a method for recognizing a meaning of successive hand images (hereinafter, referred collectively to as hand movement image) obtained by optical read means. A program in accordance with the thirty-second aspect of the present invention realizes an operational environment on the computer device including: a first normalization step of receiving a plurality of hand images varied in hand shape and position, and after a wrist region is respectively deleted therefrom, subjecting the hand images to normalization in a predetermined manner (in hand orientation, image size, image contrast) to generate hand shape images; an analysis step of calculating an eigenvalue and an eigenvector from each of the hand shape images under analysis based on an eigenspace method; a first projection step of calculating eigenspace projection coordinates respectively for the hand shape images by projecting the hand shape images onto an eigenspace having the eigenvectors as a basis; an evaluation step of classifying, into clusters, the eigenspace projection coordinates under cluster evaluation, determining which of the hand shape images belongs to which cluster, and obtaining statistical information about each cluster; a detection step of receiving the hand movement image, and detecting a hand region respectively from the hand images structuring the hand movement image; a segmentation step of determining how the hand is moved in each of the detected hand regions, and finding any change point in hand movement according thereto; a cutting step of cutting an image corresponding to the detected hand region respectively from the images including the change points; a second normalization step of respectively normalizing one or more hand images (hereinafter, referred to as hand image series) cut from the hand movement image, after a wrist region is each deleted therefrom, and generating input hand shape images being equivalent to the hand shape images; a second projection step of calculating eigenspace projection coordinates for each of the input hand shape images by projecting the input hand shape images onto the eigenspace having the eigenvectors as the basis; a judgement step of comparing each of the eigenspace projection coordinates calculated for the input hand shape images with the statistical information, determining which cluster is the closest, and outputting a symbol each specifying the clusters; a step of storing the symbols (hereinafter, referred to symbol series) corresponding to the judged hand image series together with a meaning of the hand movement image; and an identification step of outputting, in order to identify the hand movement image, a meaning corresponding to the judged symbol series based on the stored symbol series and meaning.

According to a thirty-third aspect, in the thirty-second aspect, the method further comprises: a recognition step of receiving the hand movement image, and outputting a possibility for meaning by judging how the hand is moved and where the hand is located in the hand movement image; and a storage step of previously storing a restriction condition for restricting, according to the successive hand movement, the meaning of the provided hand movement image, wherein the identification step of outputting, while taking the restriction condition into consideration, a meaning corresponding to the judged symbol series based on the stored symbol series and meaning.

According to a thirty-fourth and a thirty-fifth aspect, in the thirty-second and the thirty-third aspects, the detection step includes: a cutting step of cutting a possible hand region from the hand images structuring the input hand movement image; a storage step of storing a masking region used to extract only the possible hand region from an image of a rectangular region; a normalization step of superimposing the masking region on each of the possible hand regions cut from each hand image structuring the hand movement image, and normalizing each thereof to generate an image equivalent to the hand images used to calculate the eigenvectors; a projection step of calculating eigenspace projection coordinates for the normalized images by projecting the images onto the eigenspace having the eigenvectors as the basis; a judgement step of comparing each of the eigenspace projection coordinates with the statistical information, determining which cluster is the closest, and outputting an estimate value indicating closeness between each of the symbols specifying the cluster and a cluster for reference; and a determination step of outputting, according to the estimation values, position information on the possible hand region whose the estimation value is the highest and the cluster thereof.

According to a thirty-sixth to a thirty-eighth aspects, in the twenty-seventh, the twenty-eighth, and the thirty-second aspects, the first normalization step and the second normalization step respectively include: a color storage step of previously storing a color distribution of the hand region to be extracted from the input hand image; a step of extracting the hand region from an input hand image according to the color distribution; a step of finding which direction a wrist is oriented, and deleting a wrist region from the hand region according to the direction; a step of displacing the hand region from which the wrist region is deleted to a predetermined location on the image; a step of calculating a rotation angle in such a manner that the hand in the hand region is oriented to a predetermined direction; a step of rotating, according to the rotation angle, the hand region in such a manner that the hand therein is oriented to a direction; and a step of normalizing the rotated hand region to be in a predetermined size.

According to a thirty-ninth aspect, in the thirtieth aspect, the recording medium further comprises: an instruction storage step of storing an instruction corresponding respectively to the shape information and the position information; and a step of receiving the shape information and the position information outputted in the output step, and obtaining, for output, the instruction respectively corresponding to the shape information and the position information stored in the instruction storage step.

As described above, in the twenty-seventh to thirty-ninth aspects, the program for carrying out the method for recognizing hand shape and position in the fourteenth to twenty-sixth aspects is recorded on the recording medium. This is to supply the method in a form of software.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows the outline of the processing carried out by a hand shape image normalization part 11 in FIG. 1;

FIG. 3 is an exemplary storage table provided in a hand shape image information storage part 12A in FIG. 1;

FIG. 4 shows the outline of an exemplary method for calculating an eigenspace in an eigenspace calculation part 13 in FIG. 1;

FIG. 9 is an exemplary storage table provided in a hand shape image information storage part 12B in FIG. 8;

FIG. 13 shows exemplary images judged as being analogous and classified into the same cluster by the cluster evaluation part 16 in FIG. 8;

FIG. 19 shows an exemplary storage format of series identification dictionary 32 in FIG. 16;

FIG. 22 is an exemplary storage table provided in a hand shape image information storage part 12C in FIG. 21;

FIG. 23 shows the outline of an exemplary method for defining hand position;

FIG. 25 is a block diagram showing the detailed structure of a hand region detection part provided in a device for recognizing hand shape and position according to an eighth embodiment of the present invention FIG. 26 shows exemplary processing carried out by a possible region cutting part 39 in FIG. 25;

FIG. 31 exemplarily shows masking regions stored in a masking region storage part 45 in FIG. 29;

FIG. 35 shows exemplary processing carried out by a finger characteristic emphasizing part 68 in FIG. 32;

DESCRIPTION OF THE PREFERRED EMBODIMENTS

Prior to describing embodiments of the present invention, words of "hand shape" and "hand position" to be used in the description are defined.

Hand movement made by a human being may include some meaning such as gesture or sign language. In this case, such hand movement may be carried out in two manners: one is by bending one or more fingers, to some degree or completely, against his/her palm to form a certain hand shape; the other is by orienting his/her hand to a certain direction with his/her wrist and arm joints. The shape made by the former movement is referred to as "hand shape", and the hand orientation determined by the latter is referred to as "hand position".

Figure 37:
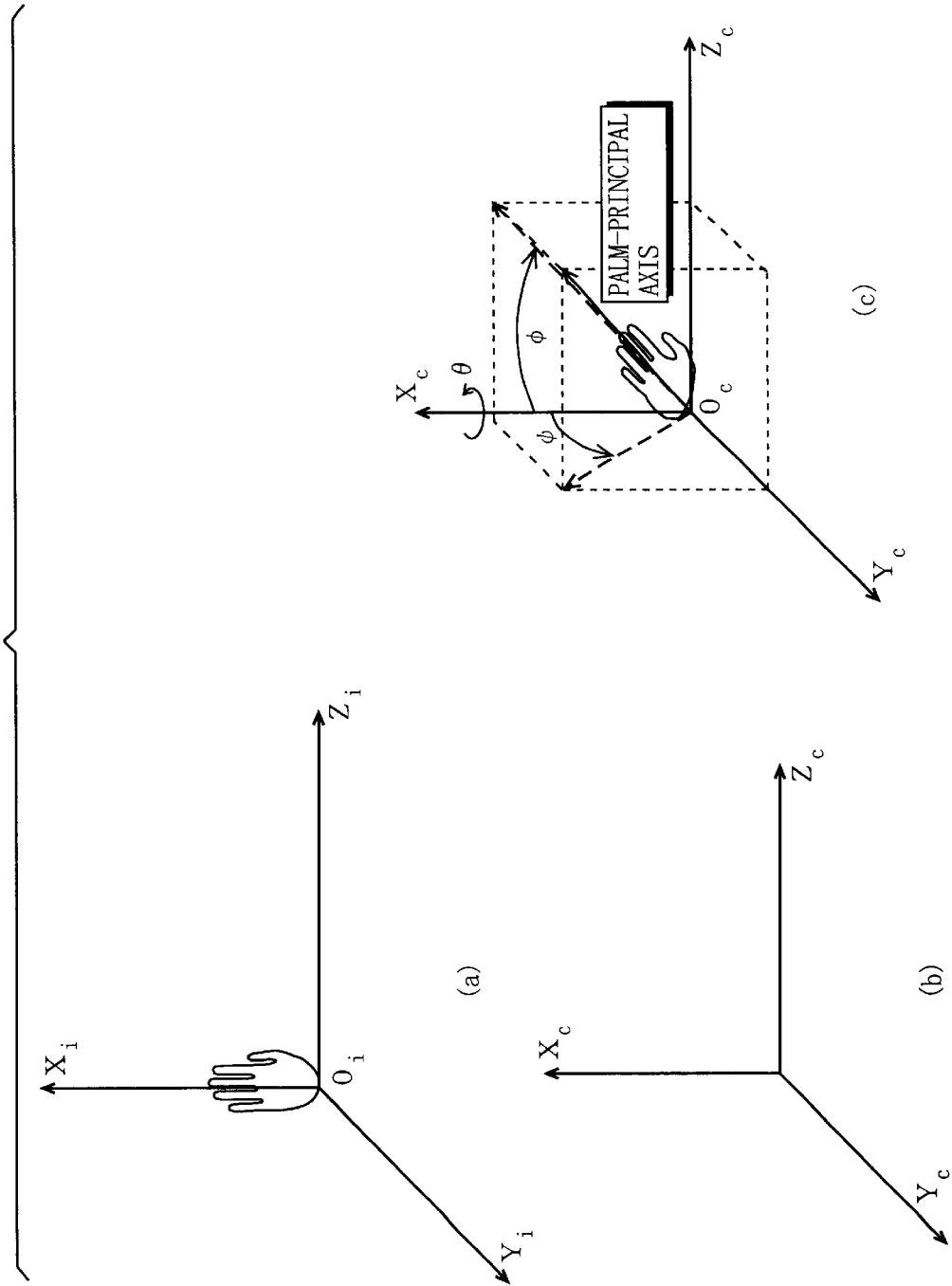
FIG. 37 shows the outline of an exemplary method for defining hand position.

See FIG. 37 for more strict definition of the hand position.

First, in a three-dimensional space where a hand in a certain shape is observed, a local coordinates system i is defined, where a direction from the cross-sectional center of the wrist to the fingertip of the middle finger is an Xi axis (palm principal axis); a direction orthogonal to the Xi axis and perpendicular to the palm is a Yi axis; and a direction orthogonal to both the Xi and Yi axes is a Zi axis (a in FIG. 37). A camera coordinates system c ($X_c$, $Y_c$, and $Z_c$ axes; the axes are orthogonal to one another) onto which hand images taken from a camera are projected is also set in advance (b in FIG. 37). Hereinafter, the $Z_c$ axis in the camera coordinates system c is referred to as an optical axis.

Further, with respect to the hand image projected on the camera coordinates system c, differences between the axes in the local coordinates system i and the axes in the camera coordinates system c are each defined as follows (c in FIG. 37):

θ: rotation angle to the $X_c$ axis

φ: rotation angle to an $X_c$ axis–$Z_c$ axis plane

φ: rotation angle to an $X_c$ axis–$Y_c$ axis plane

The hand position is defined by these rotation angles of θ, φ and φ.

Although the hand position can be strictly defined in such manner, it is also possible to qualitatively define, with respect to the camera, how the palm is oriented as "vertically or tilted toward left" and which direction the palm is facing as "front-facing or left-facing". In the present invention, both definitions are adaptable. For the sake of clarity in the following embodiments, however, the qualitative definition is exemplarily adapted for hand position.

By referring to accompanying drawings, the embodiments of the present invention are described in detail.

(First Embodiment)

A first embodiment of the present invention provides a device and a method for recognizing hand shape and position even if a hand image to be provided for recognition is rather complicated in shape. This is implemented by a method based on the eigenspace method, in which, specifically, a plurality of prestored hand images varied in hand shape and position and the to-be-provided hand image are all subjected to normalization after a wrist region is respectively deleted therefrom.

Figure 1:
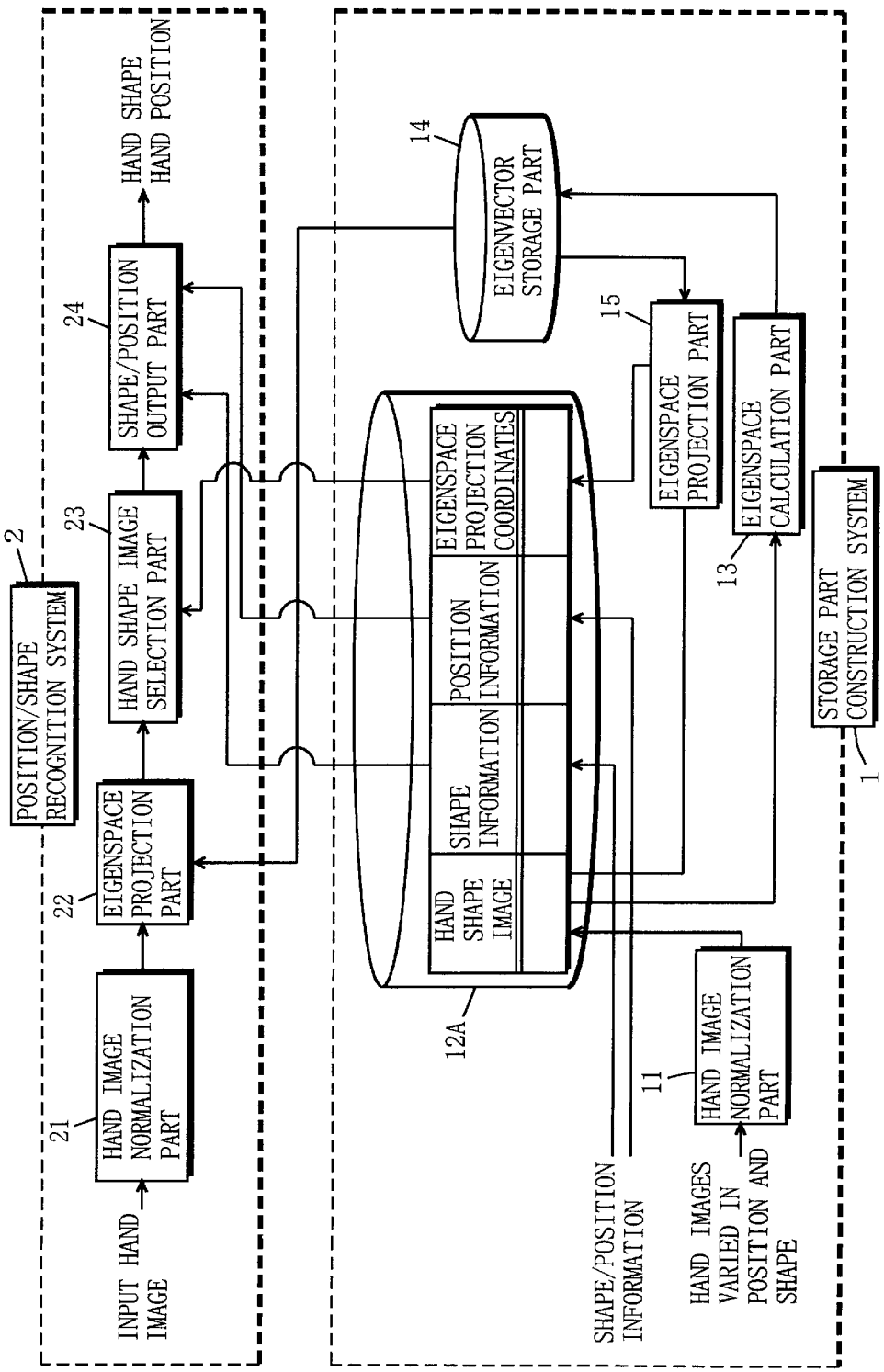
FIG. 1 is a block diagram showing the structure of a device for recognizing hand shape and position according to a first embodiment of the present invention.

FIG. 1 is a block diagram showing the structure of the device for recognizing hand shape and position of the first embodiment. In FIG. 1, the device is structured by a storage part construction system 1 and a shape/position recognition system 2.

The storage part construction system 1 constructs, in advance, information necessary for recognizing a to-be-inputted hand image (hereinafter, referred to as input hand image) according to a plurality of hand shape images varied in hand shape and position, and shape information and position information on the hand shape images. The shape/position recognition system 2 determines hand shape and hand position of the input hand image by utilizing the information constructed by the storage part construction system 1. The information is stored in a storage part in the storage part construction system 1.

First, the storage part construction system 1 and the shape/position recognition system 2 are structurally described, respectively. In FIG. 1, the storage part construction system 1 includes a hand image normalization part 11, a hand shape image information storage part 12A, an eigenspace calculation part 13, an eigenvector storage part 14, and an eigenspace projection part 15, while the shape/position recognition system 2 includes a hand image normalization part 21, an eigenspace projection part 22, a hand shape image selection part 23, and a shape/position output part 24.

The hand image normalization part 11 receives a plurality of hand images varied in hand shape and position, deletes a wrist region from each of the hand images before normalization, and then generates hand shape images. The hand shape images are stored in the hand shape image information storage part 12A together with separately-provided shape information and position information on the hand shape images, and eigenspace projection coordinates each obtained by projecting the hand shape images onto an eigenspace. The eigenspace calculation part 13 calculates eigenvalues and eigenvectors, under eigenspace analysis, from each of the hand shape images stored in the hand shape image information storage part 12A. Herein, the eigenspace analysis carried out by the eigenspace calculation part 13 is varied in manner, and exemplarily includes a technique for calculating an eigenspace by subjecting the hand shape images stored in the hand shape image information storage part 12A to principal component analysis, or a technique for calculating a hand shape judgement space by carrying out a judgement analysis on the hand shape images and shape information stored in the hand shape image information storage part 12A. In the first embodiment, the former technique is applied to describe the following operation. The eigenvector storage part 14 stores the eigenvectors calculated by the eigenspace calculation part 13. The eigenspace projection part 15 projects the hand shape images stored in the hand shape image information storage part 12A onto an eigenspace where the eigenvectors stored in the eigenvector storage part 14 are used as a basis, and then calculates projection coordinates in the eigenspace. The calculated projection coordinates are stored in the hand shape image information storage part 12A.

The hand image normalization part 21 receives an input hand image, deletes a wrist region therefrom before normalization in a predetermined manner, and then generates an input hand shape image. This is carried out in a similar manner to the hand shape images stored in the hand shape image information storage part 12A. The eigenspace projection part 22 projects the generated input hand shape image onto the eigenspace where some eigenvector stored in the eigenvector storage part 14 is used as the basis, and then calculates projection coordinates in the eigenspace. The hand shape image selection part 23 compares the projection coordinates calculated by the eigenspace projection part 22 with the eigenspace projection coordinates stored in the hand shape image information storage part 12A, and then determines which hand shape image is the closest to the input hand shape image. The shape/position output part 24 outputs shape information and position information on the hand shape image determined as being the closest by the hand shape image selection part 23.

Figure 5:
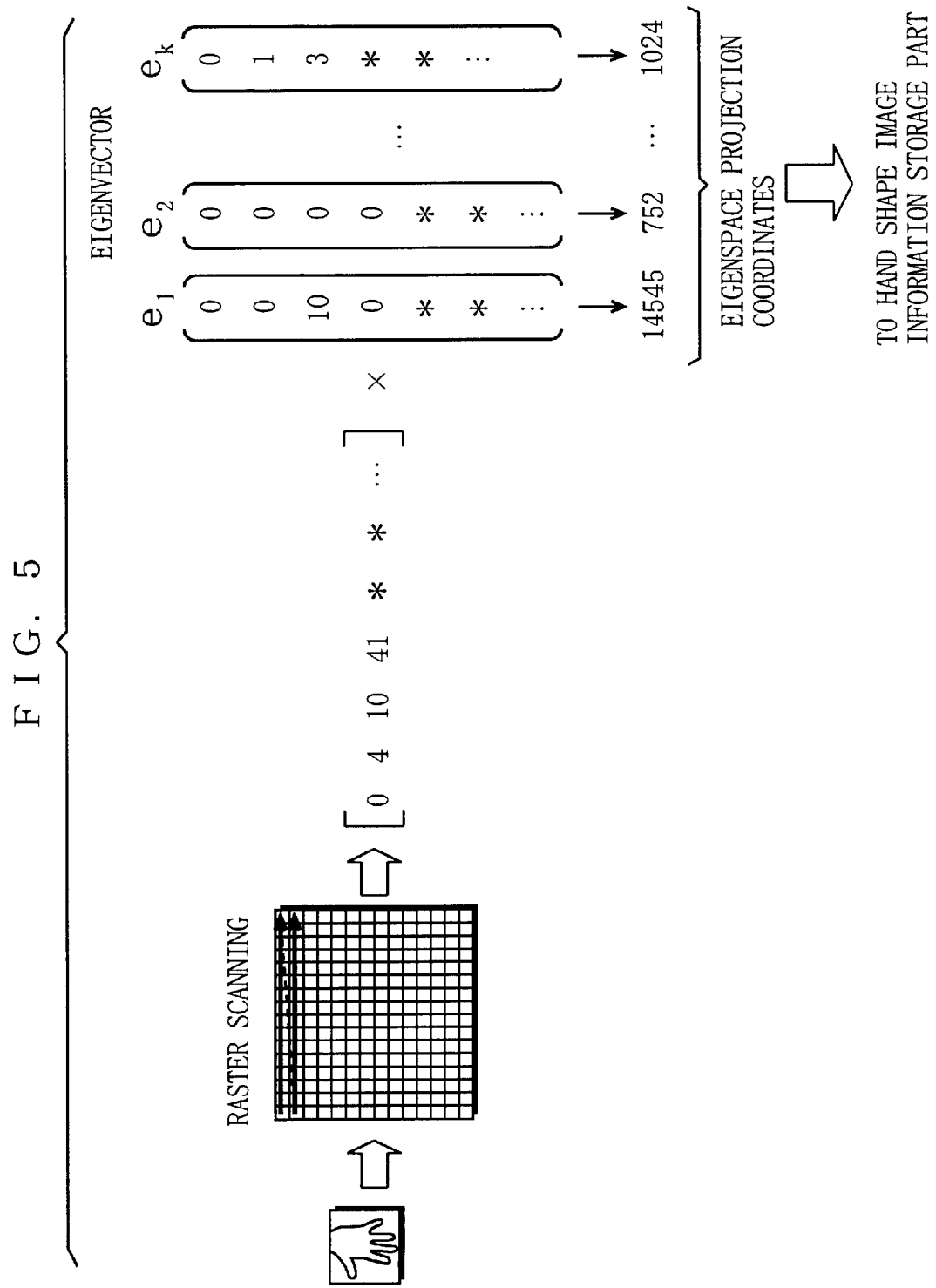
FIG. 5 shows the outline of the processing carried out by an eigenspace projection part 15 in FIG. 1.

Next, by referring to FIGS. 2 to 5, the method for recognizing hand shape and position is described stepwise. FIG. 2 shows the outline of the processing carried out by the hand image normalization part 11 in FIG. 1. FIG. 3 is an exemplary storage table provided in the hand shape image information storage part 12A in FIG. 1. FIG. 4 shows the outline of an exemplary method for calculating an eigenspace in the eigenspace calculation part 13 in FIG. 1. The method exemplarily illustrated in FIG. 4 is the above-described technique for applying principal component analysis. FIG. 5 shows the outline of an exemplary method for calculating eigenspace projection coordinates in the eigenspace projection part 15 in FIG. 1.

First, it is described how the storage part construction system 1 is operated to process.

As described in the foregoing, from a plurality of hand images varied in hand shape and position, the storage part construction system 1 generates, in advance, hand shape images for comparison with an input hand image provided to the shape/position recognition system 2. At this point in time, the storage part construction system 1 normalizes the hand images so as to calculate an eigenspace for the hand shape images.

Refer to FIG. 2. The hand image normalization part 11 first determines the orientation of a predetermined hand image (which direction the wrist is oriented) (b in FIG. 2). Thereafter, the hand image normalization part 11 draws two linear lines, each along the boundary between the wrist and background, from the end of the wrist towards the palm. Then, the hand image normalization part 11 determines, as an end point of the wrist (wrist cut point), a point where a distance from the line to the hand contour is equal to a predetermined threshold value or more (c in FIG. 2). The hand image normalization point 11 then draws a line, perpendicular to the linear line, from the wrist cut point. In this manner, the hand is divided into two regions: a wrist region and a hand region, and the wrist region is deleted from the hand image (d in FIG. 2). Thereafter, the hand image normalization part 11 rotates the hand region in such a manner that the palm principal axis thereof is oriented to a certain direction (e in FIG. 2). In this embodiment, the direction is presumed to be downward. The hand image normalization part 11 then normalizes the rotated hand image in such a manner that the size and contrast thereof each satisfies a predetermined value, and then generates a hand shape image (f in FIG. 2). The generated hand shape image is stored in the hand shape image information storage part 12A together with shape information indicating finger extension/bending of the hand shape image (in FIG. 2, 3 extended fingers) and position information indicating which direction the palm thereof is facing (in FIG. 2, rear-facing). Note that, the position information may be represented by an angle with respect to the optical axis. The hand image normalization part 11 subjects such normalization processing respectively to a plurality of hand images varied in hand shape and position, and then as shown in FIG. 3, stores hand shape images generated therethrough in the hand shape image information storage part 12A. At this point in time, the eigenspace projection coordinates are not stored in the hand shape image information storage part 12A. This is because, the eigenspace projection coordinates are later calculated and stored by the eigenspace projection part 15.

Thereafter, the eigenspace calculation part 13 calculates an eigenspace for the hand shape images stored in the hand shape image information storage part 12A.

Refer to FIG. 4. The eigenspace calculation part 13 first calculates an average image c obtained from the hand shape images stored in the hand shape image information storage part 12A (step S1). Thereafter, the eigenspace calculation part 13 deducts the average image c from each of the hand shape images, and then subjects the images to raster scanning so as to represent the images by one-dimensional vectors (step S2). Then, a matrix A having the one-dimensional vectors lined as column vectors is determined (step S3). The eigenspace calculation part 13 then calculates a covariance matrix a from the matrix A (step S4), and then calculates an eigenvalue and an eigenvector of the covariance matrix Q (step S5). Finally, the eigenspace calculation part 13 calculates an eigenspace where the calculated eigenvector $(e_1, e_2, \ldots, e_k)$ corresponding to the separately-defined k-piece-large eigenvalue is used as a basis (step S6).

With such processing, the eigenspace calculation part 13 calculates an eigenspace basis, and then stores a plurality of eigenvectors into the eigenvector storage part 14.

Thereafter, the eigenspace projection part 15 calculates, for every hand shape image stored in the hand shape image information storage part 12A, eigenspace projection coordinates obtained by projecting the hand shape images onto the eigenspace.

Refer to FIG. 5. The eigenspace projection part 15 subjects every hand shape image stored in the hand shape image information storage part 12A to raster scanning so as to represent the image by an one-dimensional vector. Thereafter, the one-dimensional vector is multiplied by the respective eigenvector stored in the eigenvector storage part 14 so as to obtain the eigenspace projection coordinates. The eigenspace projection part 15 then stores the eigenspace projection coordinates into the hand shape image information storage part 12A.

This is the end of the processing carried out in advance in the storage part construction system 1, and by then, every information would have been stored in the hand shape image information storage part 12A and the eigenvector storage part 14.

Next, it is described how the shape/position recognition system 2 is operated to process.

An input hand image is provided to the hand image normalization part 21. The hand image normalization part 21 subjects the input hand image to normalization in a similar manner to the hand image normalization part 11 for the purpose of generating an input hand shape image. In a similar manner to the eigenspace projection part 15, the eigenspace projection part 22 calculates eigenspace projection coordinates for the input hand shape image by using the eigenvectors stored in the eigenvector storage part 14. The hand shape image selection part 23 then calculates a distance (e.g., Euclidean distance) between the eigenspace projection coordinates of the input hand shape image and each of the eigenspace projection coordinates stored in the hand shape image information storage part 12A. Thereafter, the hand shape image selection part 23 selects one hand shape image closest to the input hand shape image. Thereafter, the shape/position output part 24 outputs shape information and position information on the hand shape image judged as being the closest to the input hand shape image.

In this manner, the hand shape and position of the input hand image can be simultaneously determined.

Figure 6:
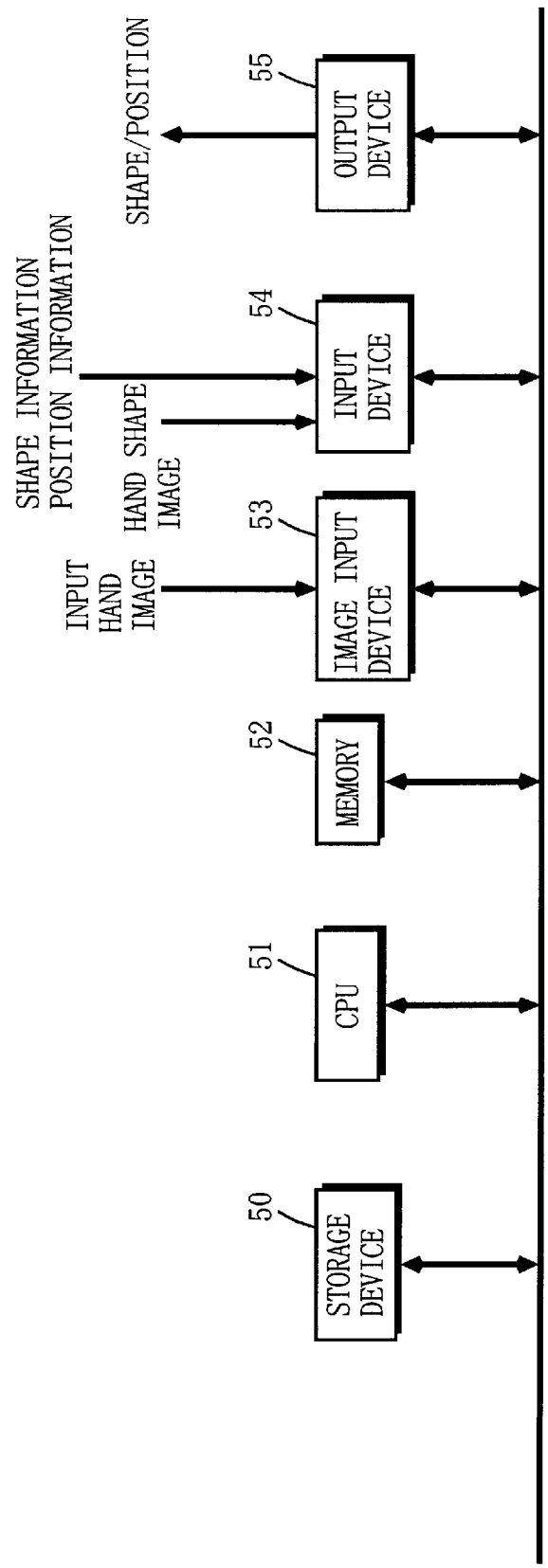
FIG. 6 is a diagram showing an exemplary hardware structure which implements the device for recognizing hand shape and position of the first embodiment.

In a typical hardware environment, the device of the first embodiment is structured by a storage device (e.g., ROM, RAM, hard disk) on which predetermined program data is recorded, a CPU, and input/output devices. FIG. 6 shows an exemplary structure of a hardware which implements the device of the first embodiment. In FIG. 6, a storage device 50 is exemplarily a hard disk, and operates as the hand shape image information storage part 12A and the eigenvector storage part 14. A CPU 51 is a central processing unit where other constituents are controlled in operation. A memory 52 temporarily stores data when the constituents are operated. An image input device 53 is exemplarily a video capture card, and receives input hand images for recognition. An input device 54 receives a plurality of hand shape images varied in hand shape and position, and shape information and position information on the hand shape images. An output device 55 outputs data indicating any recognized hand shape and hand position. With such hardware structure, the device of the first embodiment can be realized. In such case, each processing carried out by the device of the first embodiment is provided, separately, in the form of program data. The program data may be installed via a recording medium such as CR-ROM and floppy disk.

Figure 7:
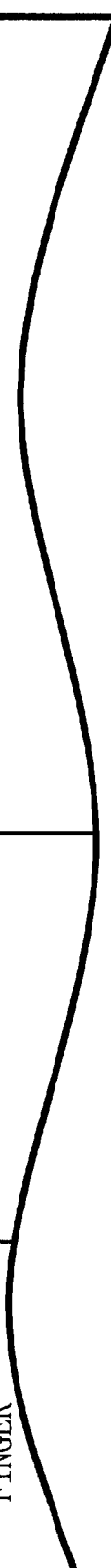
FIG. 7 shows an exemplary case where an instruction storage part which stores any instruction relevant to shape information and position information is stored with instructions to an audio device.

When the device of the first embodiment is used as an interface for other devices, the following constituents may be provided: an instruction storage part capable of storing instructions relevant to shape information and position information; and an instruction output part capable of outputting such instructions. The instruction storage part exemplarily stores, as shown in FIG. 7, instructions relevant to the shape information and position information to other devices. FIG. 7 shows an exemplary case where instructions to an audio device are stored. The instruction output part outputs, according to the shape information and position information outputted from the shape/position output part 24, instructions corresponding thereto to other devices. In FIG. 7, for example, when the shape/position output part 24 outputs the shape information indicating "five-extended fingers" and the position information indicating "every direction", the instruction output part outputs an instruction to the audio device to "start". In this manner, the device of the first embodiment can be used as an interface for other devices.

As is known from the above, according to the device and method for recognizing hand shape and position of the first embodiment, a plurality of hand images varied in hand shape and position and an input hand image are all subjected to wrist-region-cut-process before normalization. In this manner, the hand images can be more accurately normalized than a case where the size and contrast thereof are simply normalized. Accordingly, the accuracy in recognition can be sufficiently high even if the method based on the eigenspace is applied to recognize hand shape and position.

Further, by using the method based on the eigenspace, geometric characteristics such as the number of extended fingers can be recognized, whereby rather complicated hand shapes having little geometric characteristics can be correctly recognized.

Further, when a comparison is made between an input hand shape image and a plurality of hand shape images for matching, volume of images may become enormous. In the first embodiment, however, hand images are projected onto an eigenspace, after normalization, to calculate eigenspace projection coordinates, and then the coordinates are compared with those of the input hand shape image in the eigenspace. In this manner, the calculation load is eased compared with a case where the comparison is made between images, thereby rendering the speed of processing increased. As is obvious from this, the method based on the eigenspace is very practical when the volume of hand shape images is supposedly enormous.

In the first embodiment, human hand images are supposedly stored as hand shape images varied in hand shape and position for recognition. The problem herein is, such real images cannot be taken in from some directions since a human hand cannot be put on a turn table, or a human being cannot be still enough to be in a certain posture with considerable accuracy. There has to be a special equipment for taking in hand images from every directions. To get around such problem, a 3D hand model popular in CAD and CG may be used, and images thereof can be taken in from several directions. In this manner, a hand shape image can be defined by hand shape and position with a high degree of accuracy. A mannequin hand is also a possibility. In the first embodiment, both the 3D hand model image and real hand image can be realized under the same structure and method.

Further, in the first embodiment, hand shape and hand position are each supposedly limited to one for output. However, due to image resolution, for example, some images may look identical in hand shape or hand position in some cases. If this is the case, the number of hand shapes or hand positions for output may be plural each as a possibility. Even if so, it can be realized under the same structure and method as the first embodiment. Still further, in the first embodiment, both the hand shape image and input hand shape image are supposedly contrast images. However, the images may be silhouette images or color images, and are realized under the same structure and method as in the first embodiment.

(Second Embodiment)

In a case where a plurality of hand images varied in hand shape and position are classified, the classification may be made according to hand shape or hand position. If this is the case, however, some hand images are not distinguishable when being analogous in hand position from a certain direction but different in hand shape, e.g., it cannot clearly tell from the side how many fingers are extended, or when being analogous in hand shape but different in hand position, e.g., it cannot clearly tell to which direction a fist is oriented. Therefore, such classification may not work out well enough for hand shape/position recognition.

Accordingly, relevant to the device and the method for recognizing hand shape and position under the eigenspace method described in the first embodiment, in the second embodiment, the frequency of comparison for matching can be reduced and the processing speed can be improved. This is implemented by, under cluster evaluation, automatically classifying, into clusters, the eigenspace projection coordinates obtained for every hand shape image stored in the hand shape image information storage part 12A. Thereafter, it is decided to which cluster an input hand image belongs, and then is decided which hand shape image in the cluster is the closest to the input hand image.

Figure 8:
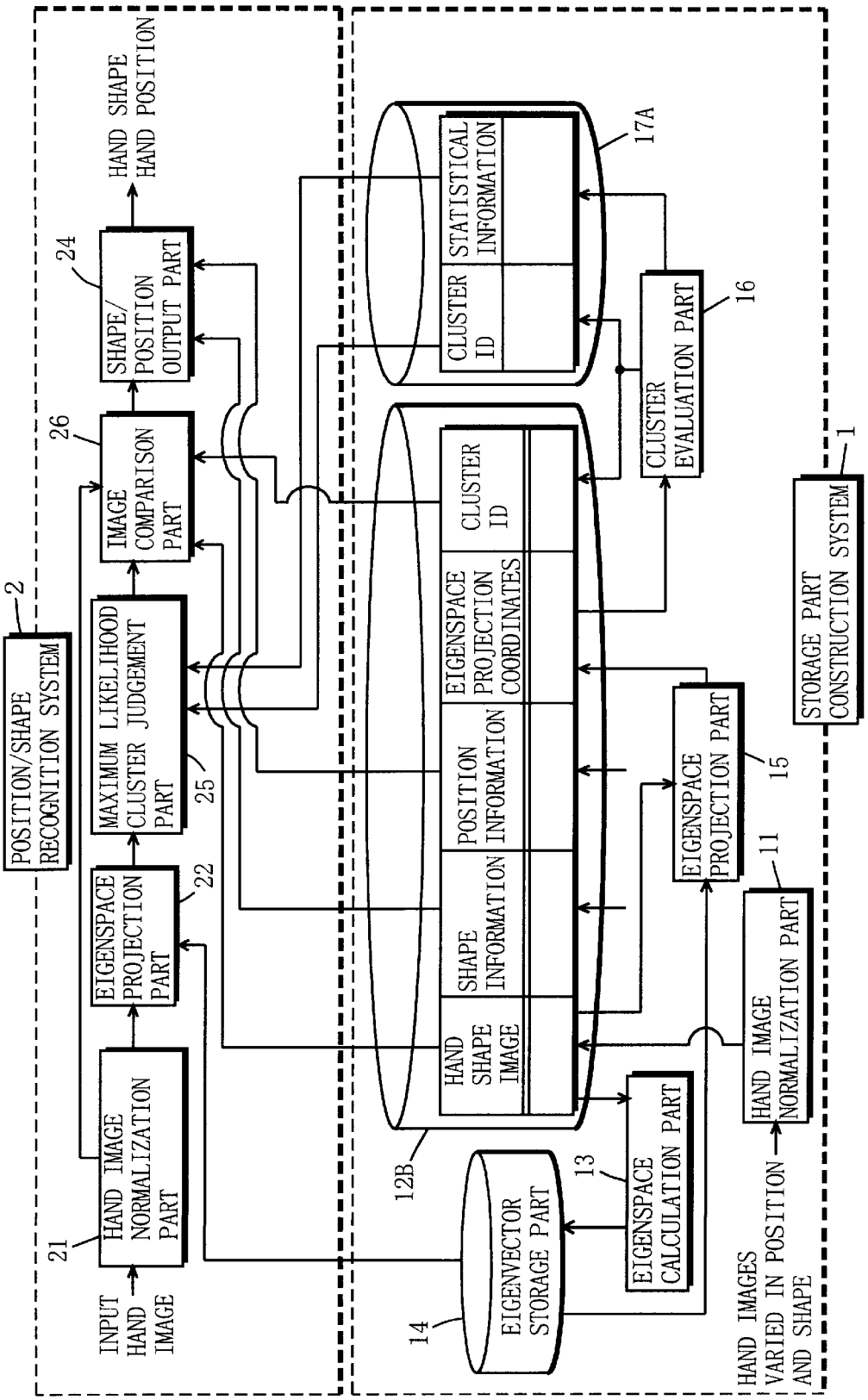
FIG. 8 is a block diagram showing the structure of a device for recognizing hand shape and position according to a second embodiment of the present invention.

FIG. 8 is a block diagram showing the structure of a device for recognizing hand shape and position of the second embodiment. In FIG. 8, the device is structured by, similarly to the device of the first embodiment, the storage part construction system 1 and the shape/position recognition system 2.

In FIG. 8, the storage part construction system 1 is provided with the hand image normalization part 11, a hand shape image information storage part 12B, the eigenspace calculation part 13, the eigenvector storage part 14, the eigenspace projection part 15, a cluster evaluation part 16, and a cluster information storage part 17A, while the shape/position recognition system 2 is provided with the hand image normalization part 21, the eigenspace projection part 22, a maximum likelihood cluster judgement part 25, an image comparison part 26, and the shape/position output part 24.

As shown in FIG. 8, the device of the second embodiment is provided, in the storage part construction system 1, with the hand shape image information storage part 12B as an alternative to the hand shape image information storage part 12A in the device of the first embodiment, and further includes the cluster evaluation part 16 and the cluster information storage part 17A, while in the shape/position recognition system 2, the maximum likelihood cluster judgement part 25 and the image comparison part 26 are provided as alternatives to the hand shape image selection part 23.

Other constituents in the device of the second embodiment are the same as those in the device of the first embodiment, and are denoted by the same reference numerals and not described again.

First, the storage part construction system 1 and the shape/position recognition system 2 in the second embodiment are structurally described, more focused on the constituents differ from those in the device of the first embodiment.

The hand shape image information storage part 12B stores a plurality of hand shape images generated by the hand image normalization part 11. Together therewith, the hand shape image information storage part 12B also stores shape information and position information on the hand shape images, and eigenspace projection coordinates obtained by projecting the hand shape images onto an eigenspace. Unlike the hand shape image information storage part 12A in the first embodiment, the hand shape image information storage part 12B stores cluster indexes (hereinafter, referred to as cluster IDs) obtained through clustering automatically carried out on the hand shape images. The cluster evaluation part 16 classifies, under cluster evaluation, the hand shape images stored in the hand shape image information storage part 12B into clusters, and then determines which hand shape image goes to which cluster. Thereafter, the cluster evaluation part 16 stores cluster IDs, which identify the clusters, into the hand shape image information storage part 12B, and then obtains statistical information relevant to each cluster. The cluster information storage part 17A stores the cluster IDs and the statistical information obtained by the cluster evaluation part 16.

The maximum likelihood cluster judgement part 25 determines a cluster including the projection coordinates being closest to the eigenspace projection coordinates calculated by the eigenspace projection coordinates 22. The image comparison part 26 then refers to the hand shape image information storage part 12B for the hand shape images included in the determined cluster, and therefrom, selects one hand shape image being analogous most closely to the input hand shape image generated by the hand image normalization part 21.

Figure 10:
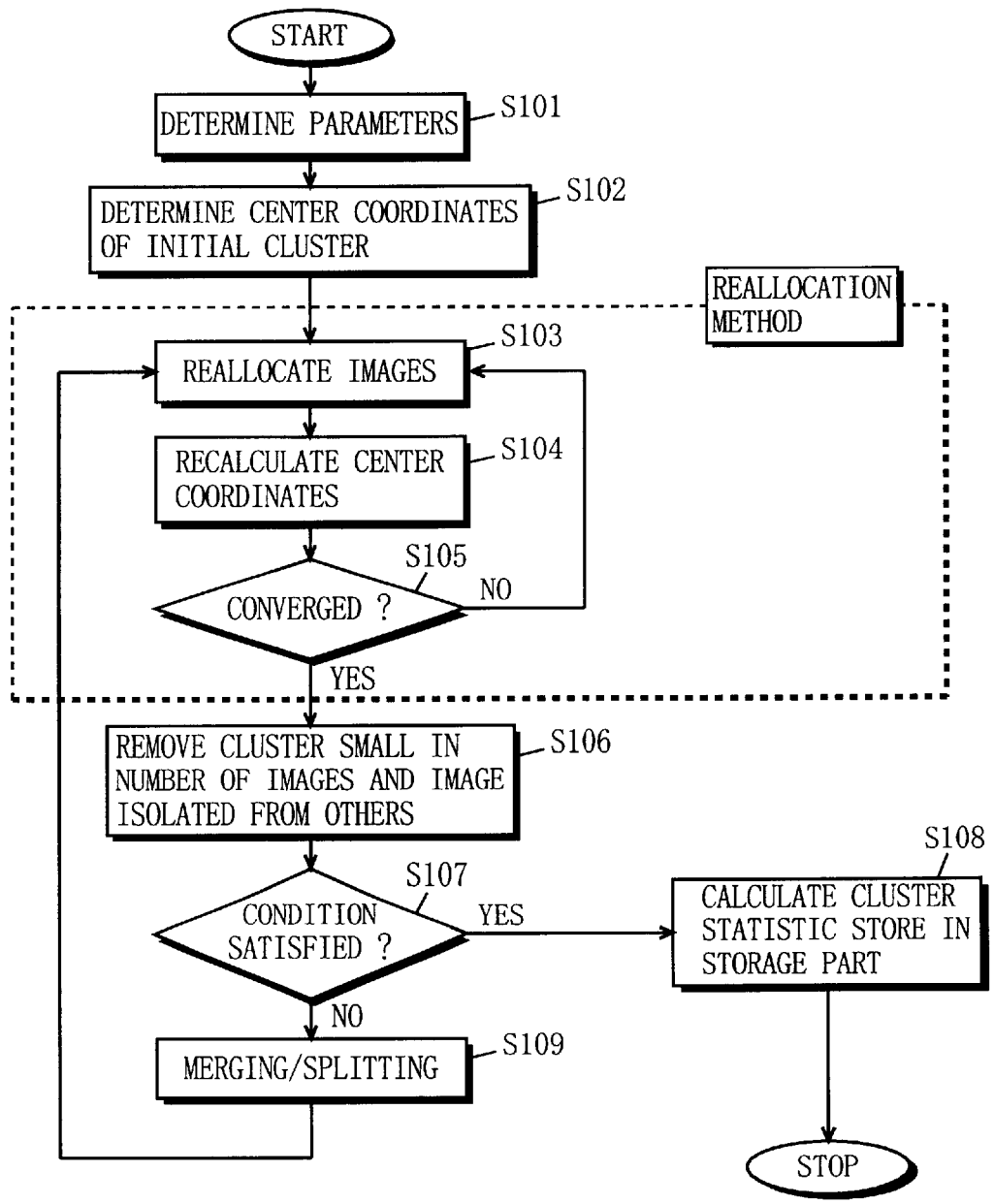
FIG. 10 is a flowchart exemplarily showing the processing carried out by a cluster evaluation part 16 in FIG. 8.
Figure 11:
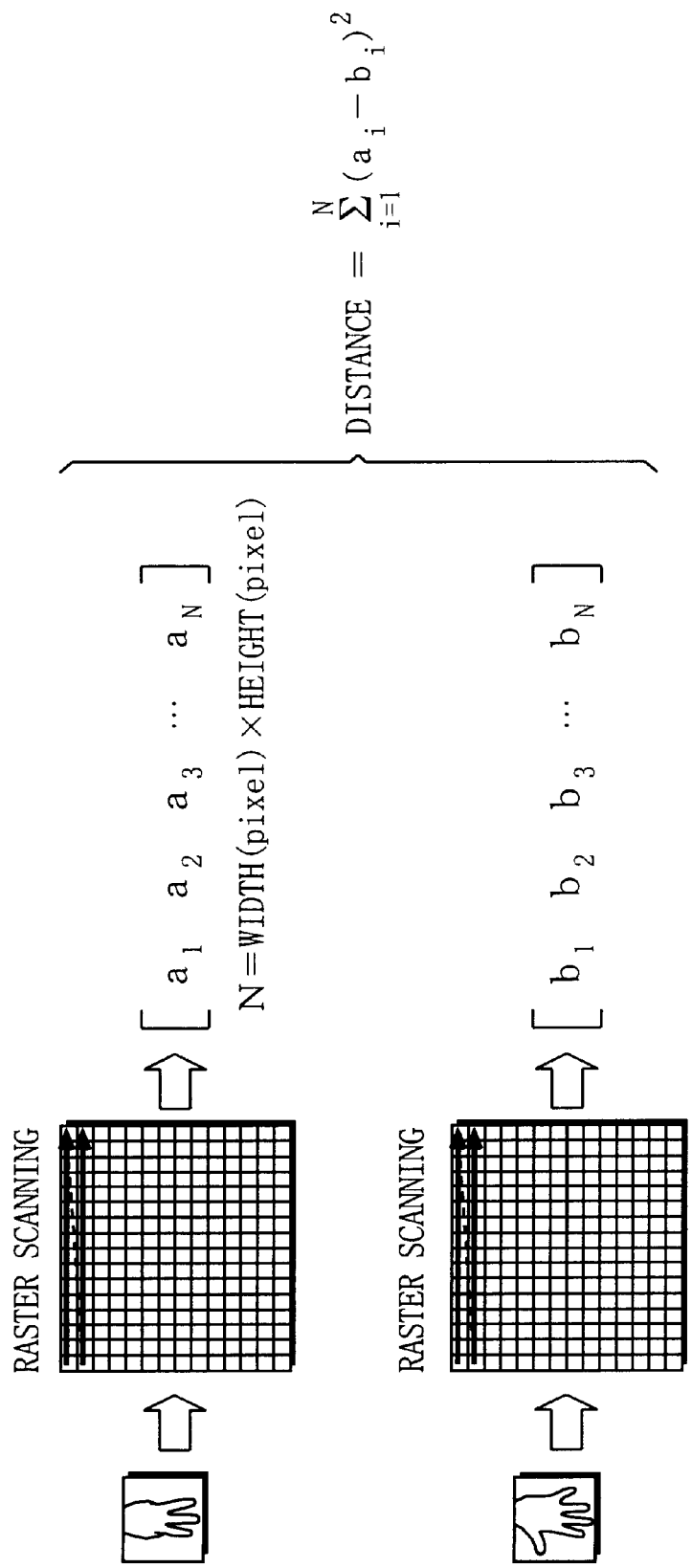
FIG. 11 shows the outline of an exemplary concept of a comparison technique carried out by an image comparison part 26 in FIG. 8.

Next, by referring to FIGS. 9 to 11, the method for recognizing hand shape and position carried out by the device of the second embodiment is described stepwise. FIG. 9 is an exemplary storage table in the hand shape image information storage part 12B in FIG. 8. FIG. 10 is a flowchart exemplarily showing the operation of the cluster evaluation part 16 in FIG. 8. The exemplary case shown in FIG. 10 applies ISODATA method which is a technique in cluster evaluation. FIG. 11 is a diagram exemplarily showing a concept of a comparison technique carried out by the image comparison part 26 in FIG. 8. The comparison technique shown in FIG. 11 exemplarily applies a simple pattern matching.

First, it is described how the storage part construction system 1 is operated to process.

In a similar manner to the first embodiment, before normalization, the hand image normalization part 11 deletes a wrist region each from a plurality of hand images varied in hand position, and then generates hand shape images. The generated hand shape images are stored into the hand shape image information storage part 12B together with shape information and position information thereon, as shown in FIG. 9. At this point in time, the cluster IDs and the eigenspace projection coordinates are not yet stored in the hand shape image information storage part 12B. This is because, the cluster IDs and the eigenspace projection coordinates are later obtained and calculated respectively by the eigenspace projection part 15 and the cluster evaluation part 16.

Thereafter, an eigenspace is calculated under the eigenspace method, in a similar manner to the first embodiment, by the eigenspace calculation part 13, the eigenvector storage part 14, and the eigenspace projection part 15. Onto the eigenspace, the hand shape images stored in the hand shape image information storage part 12B are projected. Then, the eigenspace projection coordinates obtained thereby are stored into the hand shape image information storage part 12B.

The cluster evaluation part 16 performs cluster evaluation with respect to the eigenspace projection coordinates stored in the hand shape image information storage part 12B, and then classifies these hand shape images into clusters according to the distance thereamong. Such cluster evaluation carried out in the cluster evaluation part 16 is varied in manner such as a simple reallocation method (k-means method) or ISODATA method. Herein, an exemplary clustering technique applying ISODATA method is described.

ISODATA method is typical for non-hierarchical clustering, and is a combination of clustering under the reallocation method and a process of cluster splitting and merging.

By referring to FIG. 10, the cluster evaluation part 16 first sets initial parameters (step S101). The initial parameters may include the eventual number of clusters, a convergence condition for reallocation, a judgement condition for a cluster very small in number of hand shape images or for isolated data, a condition for cluster splitting and merging, or a termination condition for repetitive calculation. Then, the cluster evaluation part 16 selects some of the clusters as a reference for clustering (initial clusters) (step S102). The coordinates of the initial clusters are arbitrarily determined by referring to the projection coordinates of each of the hand shape images.

Then, the cluster evaluation part 16 performs clustering under the reallocation method. First of all, the cluster evaluation part 16 calculates each distance between the eigenspace projection coordinates of the hand shape images and the center coordinates of the initial clusters in the eigenspace, and then reallocates the hand shape images respectively into the closest cluster (step S103). The cluster evaluation part 16 then recalculates the center coordinates of each cluster according to the eigenspace projection coordinates of the reallocated hand shape images (step S104). The cluster evaluation part 16 judges whether the number of reallocated hand shape images is a predetermined threshold value or smaller (clustering is converged) (step S105). If the number of reallocated images is judged as being the threshold value or smaller in step S105, the cluster evaluation part 16 terminates the clustering processing under the reallocation method. If not, the procedure returns to step S103 to repeat the procedure.

If the clustering is judged as being converged in step S105, the cluster evaluation part 16 then removes any cluster very small in number of hand shape images and any hand shape image being apparently isolated from others (step S106). Next, the cluster evaluation part 16 determines whether the current number of clusters falls within a predetermined range of the eventual number of clusters, and whether the minimum value for a distance between the center coordinates of each clusters is a predetermined threshold value or smaller (step S107). If the minimum value for the distance is judged as being the threshold value or smaller in step S107, the cluster evaluation part 16 determines that the clustering is converged, and then stores information on each cluster (e.g., statistical information such as cluster IDs, an average value of the coordinates in the eigenspace, or distribution) into the cluster information storage part 17A, and the cluster IDs indicating which hand shape image belongs to which cluster into the hand shape image information storage part 12B (step S108). If the minimum value for the distance is not judged as being the threshold value or smaller in step S107, on the other hand, the cluster evaluation part 16 carries out cluster splitting or merging (step S109). In step S109, when the current number of clusters is too large to fall within the predetermined range, the cluster evaluation part 16 carries out cluster splitting, and when the number is too small to fall within the predetermined range, the cluster evaluation part 16 carries out cluster merging. When the number falls within the range, the cluster evaluation part 16 carries out cluster merging or splitting depending on how many times the processing was repeated; an even number for merging and an odd number for splitting.

In cluster merging, with a condition that the minimum distance is the threshold value or smaller, the cluster evaluation part 16 merges the two clusters having the minimum distance therebetween into one, and finds a new center coordinates thereof. Then, the cluster evaluation part 16 again calculates the distance, and keeps performing cluster merging until the minimum distance is equalized to the threshold value or larger.

In cluster splitting, when a maximum value for distribution in one cluster is a predetermined threshold value or larger, the cluster evaluation part 16 splits the cluster into two according to a first component, and then calculates a new center coordinates and a distribution value for each of the split clusters. The cluster splitting is repeated until the maximum value for distribution becomes the threshold value or smaller.

After the cluster splitting and merging in step S109 being through, the procedure returns to step S103 for the same processing.

With such processing, the cluster evaluation is completed, and the cluster information storage part 17A is stored with the information on the respective clusters such as the statistical information including the cluster IDs, the average value of the coordinates in the eigenspace, or distribution. Also the hand shape image information storage part 12B is stored with the cluster IDs indicating which hand shape image belongs to which cluster. Such parameters may be optimally and appropriately selected by experiment, for example, or it may possible to designate the eventual number of clusters and a criterion for cluster splitting and merging according to a certain criterion for information content (e.g., AIC, MDL). Although the cluster evaluation under ISODATA is described in this embodiment, cluster evaluation under the simple reallocation method may carry the same effects as ISODATA method by properly setting parameters such as threshold value.

This is the end of the processing carried out in advance in the storage part construction system 1, and by then, every information would have been stored in the hand shape image information storage part 12B, the eigenvector storage part 14, and the cluster information storage part 17A.

Next, it is described how the shape/position recognition system 2 is operated to process.

An input hand image for recognition is provided to the hand image normalization part 21. In a similar manner to the first embodiment, the input hand image is normalized by the hand image normalization part 21 and then is represented by the eigenspace projection coordinates by the eigenspace projection part 22. The maximum likelihood cluster judgement part 25 calculates a distance between the eigenspace projection coordinates and each of coordinates of the cluster information stored in the cluster information storage part 17A, and then determines which cluster includes the hand shape image located closest to the input hand shape image. A method therefor may include a technique applying Euclidean distance for the clusters, a technique applying Maharanobis distance for the clusters, or a technique for determining likelihood for every cluster under maximum likelihood method, and then finding one cluster whose likelihood is the highest. Herein, the technique for finding the closest cluster under the maximum likelihood method is exemplarliy described.

First of all, the maximum likelihood cluster judgement part 25 finds, as the statistical information on the clusters, an average $\mu$ from the eigenspace projection coordinates u of the images included in the clusters stored in the cluster information storage part 17A, and regards the average $\mu$ as cluster center coordinates. Further, the cluster maximum likelihood cluster judgement part 25 obtains a covariance matrix $\Sigma$ from the eigenspace projection coordinates u of the respective images and the cluster center coordinates. With these values, a likelihood function $G_i(u)$ relevant to a cluster i can be defined by the following equation 4, where $x^2$ indicates a Maharanobis distance between the eigenspace projection coordinates u and the cluster i.

$$G_i(u) = -\tfrac{1}{2}ln|\Sigma_i| - \tfrac{1}{2}x^2(u; \mu_i, \Sigma_i) \quad (4)$$

With this maximum likelihood function $G_i(u)$, the cluster having the highest likelihood is found.

Note that, if the registered hand shape are small in number, the above described technique (the technique applying Euclidean distance or Maharanobis distance) can be similarly effective.

Then, the image comparison part 26 refers to the cluster IDs stored in the hand shape image information storage part 12B so as to find one hand shape image most closely analogous to the input hand shape image. This is done by comparing the hand shape images included only in the cluster selected by the maximum likelihood cluster judgement part 25 with the input hand shape image generated by the hand image normalization part 21. Herein, although the comparison can be done in various manners, a simple pattern matching will do. Thereafter, the shape/position output part 24 outputs shape information and position information on the hand shape image selected by the image comparison part 26.

As is known from the above, according to the device and the method for recognizing hand shape and position of the second embodiment, first in the storage part construction system 1, a plurality of hand shape images stored in the hand shape image information storage part 12B are classified, in an eigenspace, into clusters under cluster evaluation. And in the shape/position recognition system 2, it is first decided to which cluster an input hand image belongs, and to which hand shape image in the cluster the input hand image is most analogous. In this manner, the frequency of image comparison is reduced, and accordingly higher-speed processing can be achieved.

Further, the images are not classified according to hand shape or hand position, but according to the distance in the eigenspace, in other words, according to analogousness in image. In this manner, it is possible to accurately define each image by hand shape and position even if the images are analogous in hand position from a certain direction but different in hand shape.

In the second embodiment, human hand images are supposedly stored as hand shape images varied in hand shape and position. However, as in the first embodiment, a 3D hand model popular in CAD and CG may be used, and images thereof can be taken in from several directions. In this manner, the images can be defined by hand position with a high degree of accuracy. A mannequin hand is also a possibility.

Further, in the second embodiment, hand shape and hand position are each supposedly limited to one for output. However, due to image resolution, for example, some images may look not-distinguishably identical in hand shape or hand position in some cases. If this is the case, it is possible that the number of hand shapes or hand positions for output may each be plural. Even if so, it can be realized under the same structure and method as the second embodiment. Still further, in the second embodiment, the image comparison part 26 is utilized to group analogous images. However, for some cases, the images are enough to be defined only by hand shape. If this is the case, for every hand shape in the cluster selected by the maximum likelihood cluster judgement part 25, a statistic of the average image or distributed image is referred to for determining the hand shape images. Then, the input hand image is compared therewith. In order to implement the device of the second embodiment with a hardware, the device can be structured similarly to the one shown in FIG. 6.

Still further, the image comparison part 26 in the device of the second embodiment may be differently structured for comparing the hand shape images included in the cluster selected by the maximum likelihood cluster judgement part 25 with the input hand shape image generated by the hand image normalization part 21. In detail, as alternatives to the image comparison part 26, it is possible to provide an identical shape classification part for classifying the hand shape images included in the same cluster according to hand shape; a shape group statistic calculation part for calculating a statistic representing each classified cluster; and a maximum likelihood shape judgement part for calculating a distance between the input hand shape image and the statistic calculated by the shape group statistic calculation part, and then outputting one hand shape included in the closest cluster. With such structure, the frequency of comparison for matching is decreased to a greater degree, and accordingly still higher-speed processing can be achieved.

(Third Embodiment)

As is described in the second embodiment, after cluster evaluation, each cluster includes images analogous to one another. Therefore, as shown in FIG. 13, a hand image of two fingers abutting to each other and a hand image of one finger overlying another are classified into the same cluster. In sign language, however, such difference in hand shape needs to be discriminated. For such discrimination, unlike such manner in the second embodiment that an image is discriminated in its entirety, the image needs to be partially discriminated only for a differed part.

Accordingly, instead of extensively comparing the input hand shape image with the hand shape images by pattern matching, in a third embodiment of the present invention, a discrimination frame is provided for every cluster in advance, and then hand shape is discriminated within the frame.

Figure 12:
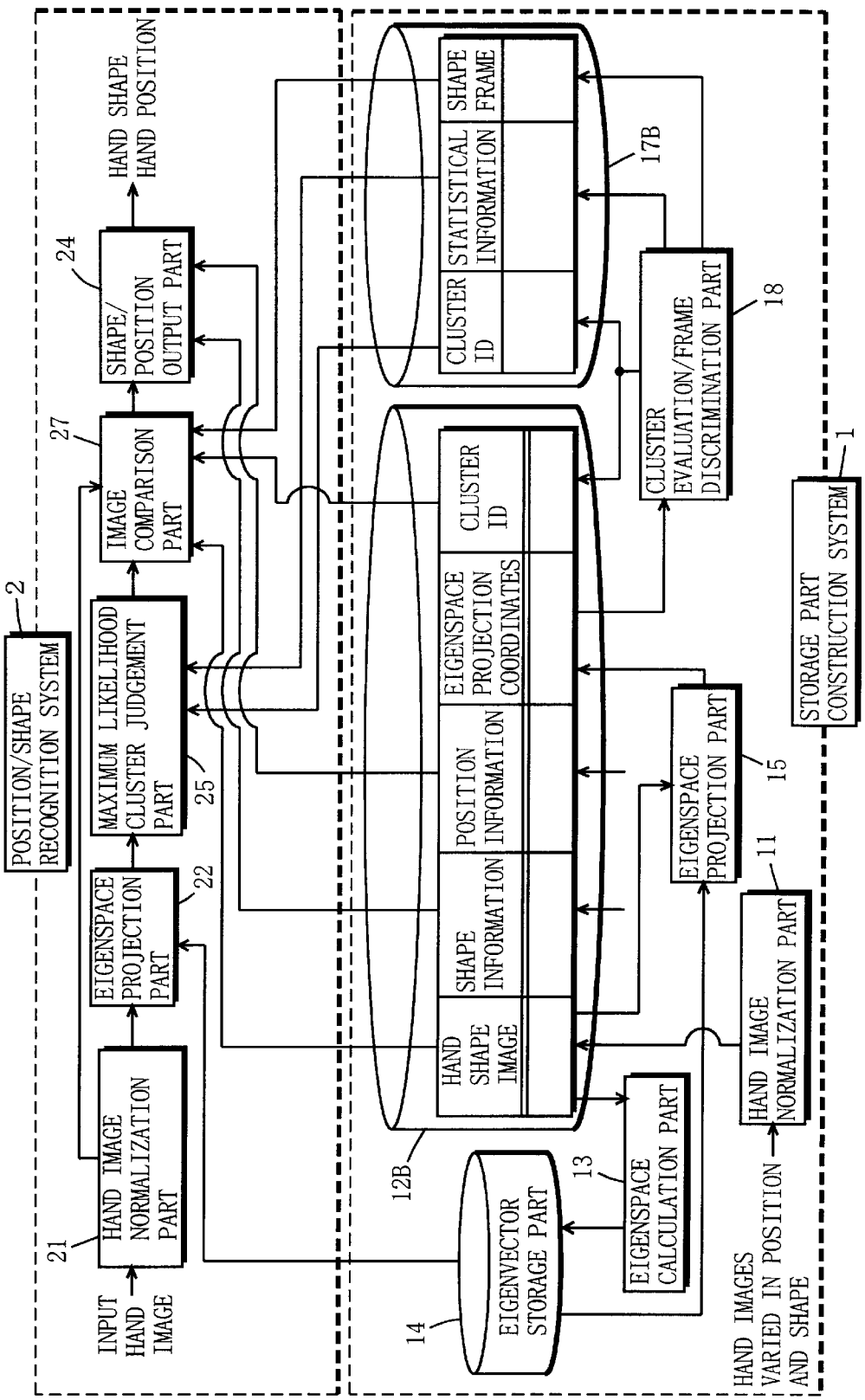
FIG. 12 is a block diagram showing a device for recognizing hand shape and position according to a third embodiment of the present invention.

FIG. 12 is a block diagram showing the structure of a device for recognizing hand shape and position of the third embodiment. In FIG. 12, the device of the third embodiment is structured, similarly to the device of the second embodiment, by the storage part construction system 1 and the shape/position recognition system 2.

In FIG. 12, the storage part construction system 1 is provided with the hand image normalization part 11, the hand shape image information storage part 12B, the eigenspace calculation part 13, the eigenvector storage part 14, the eigenspace projection part 15, a cluster evaluation/frame discrimination part 18, and a cluster information storage part 17B, while the shape/position recognition system 2 is provided with the hand image normalization part 21, the eigenspace projection part 22, the maximum likelihood cluster judgement part 25, an image comparison part 27, and the shape/position output part 24.

As shown in FIG. 12, the device of the third embodiment is, in the storage part construction system 1, provided with the cluster evaluation/frame discrimination part 18 and the cluster information storage part 17B as alternatives to the cluster evaluation part 16 and the cluster information storage part 17A, respectively, in the device of the second embodiment. Similarly, in the shape/position recognition system 2, the image comparison part 27 is provided as an alternative to the image comparison part 26.

Other constituents in the device of the third embodiment are similar to those in the device of the second embodiment, and are denoted by the same reference numerals and not described again.

Figure 14:
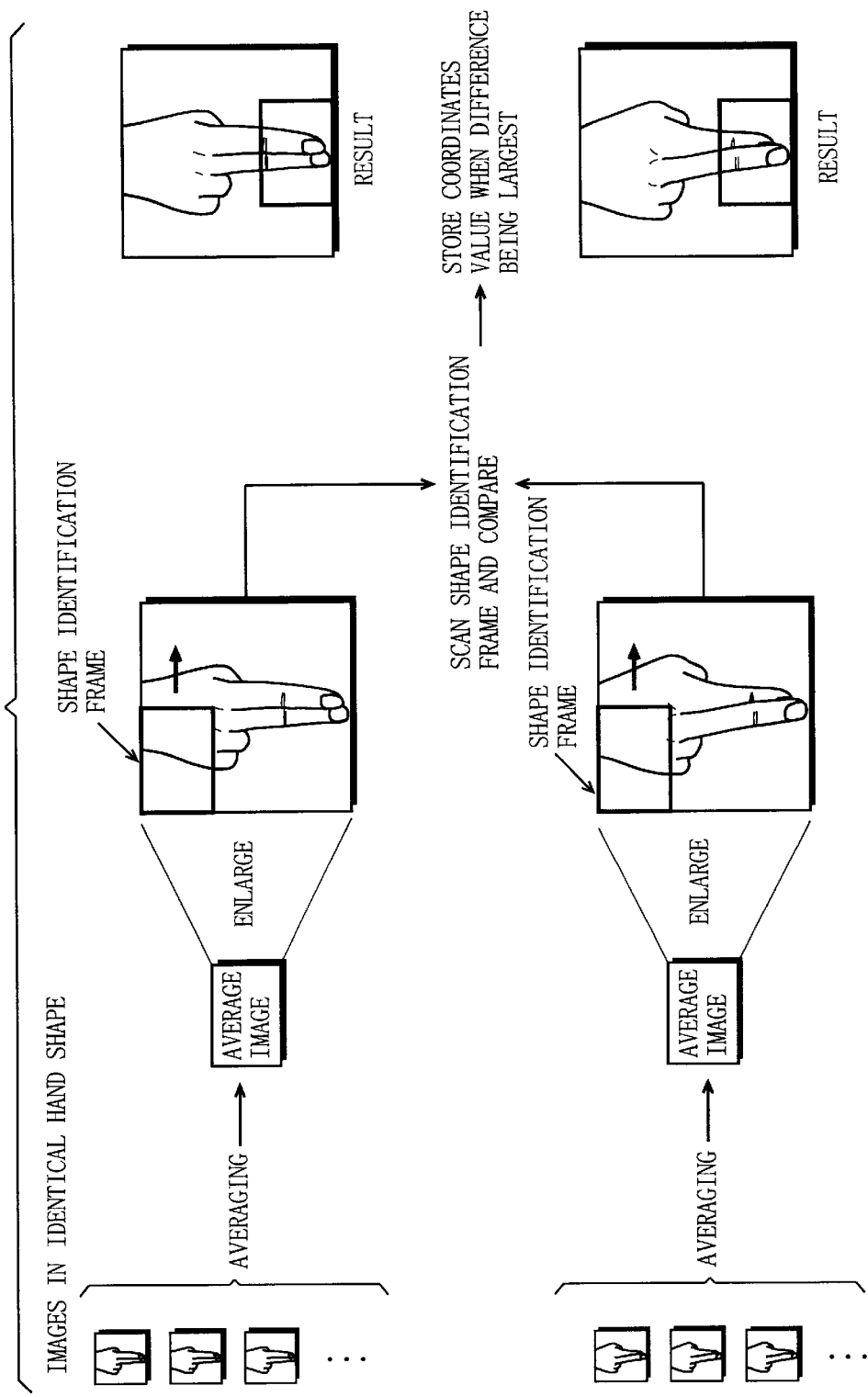
FIG. 14 shows an exemplary concept of processing carried out by a cluster evaluation/frame discrimination part 18 in FIG. 12.

By referring to FIGS. 12 and 14, the storage part construction system 1 and the shape/position recognition system 2 in the third embodiment are structurally and operationally described, more focused on the constituents differ from those in the device of the second embodiment. FIG. 14 is a diagram exemplarily showing how the location of the shape discrimination frames is calculated by the cluster evaluation/frame discrimination part 18 in FIG. 12.

The cluster evaluation/frame discrimination part 18 first performs cluster evaluation for the eigenspace projection coordinates stored in the hand shape image information storage part 12B, and then classifies the hand shape images according to the closeness in distance. This is carried out in a similar manner to the cluster evaluation part 16 in the first embodiment.

Next, the cluster evaluation/frame discrimination part 18 calculates the location of the shape discrimination frame for every cluster. Refer to FIG. 14. From each cluster, the cluster evaluation/frame discrimination part 18 plurally extracts the hand shape images being identical in hand shape for averaging, and accordingly an average image for the hand shape is obtained therefrom. Thereafter, the cluster evaluation/frame discrimination part 18 moves a predetermined frame fixed in form (the form thereof is arbitrary, exemplarily square in FIG. 14) on each average image, and finds a difference among images in the frames. The shape discrimination frame is then each set on the part showing the largest difference. Then, the cluster evaluation/frame discrimination part 18 stores the location of the shape discrimination frame into the cluster information storage part 17B.

The image comparison part 27 first refers to the cluster IDs stored in the hand shape image information storage part 12B, and obtains the hand shape images included in the cluster selected by the maximum likelihood cluster judgement part 25 and the input hand shape image generated by the hand image normalization part 21. The image comparison part 27 also obtains the location of the shape discrimination frame for the cluster selected by the maximum likelihood cluster judgement part 25 from the cluster information storage part 17B. The image comparison part 27 then compares the obtained hand shape images and the input hand shape image only for the parts within the shape discrimination frame, and determines which hand shape image is analogous most closely to the input hand shape image.

As is known from the above, according to the device and the method for recognizing hand shape and posit ion of the third embodiment, the location of the shape discrimination frame is predetermined, and then the comparison for matching between the hand shape images and the input hand shape image is done for the parts within the frame. In this manner, the comparison for matching can be less frequent than the second embodiment, and accordingly still higher-speed processing can be achieved with a higher degree of accuracy.

(Fourth Embodiment)

In the second embodiment, the image comparison part 26 directly compares the input hand shape image with the hand shape images in the cluster selected by the maximum likelihood cluster judgement part 25 for the purpose of defining the input hand image by hand shape and position. In a fourth embodiment of the present invention, instead, the hand shape and the hand position are determined by first photographing a hand in a certain shape and position from several directions with a plurality of cameras, secondly by determining each obtained image to the appropriate cluster by the maximum likelihood cluster judgement part 25, and finally by combining the relevant shape information and the position information in each of the clusters.

Figure 15:
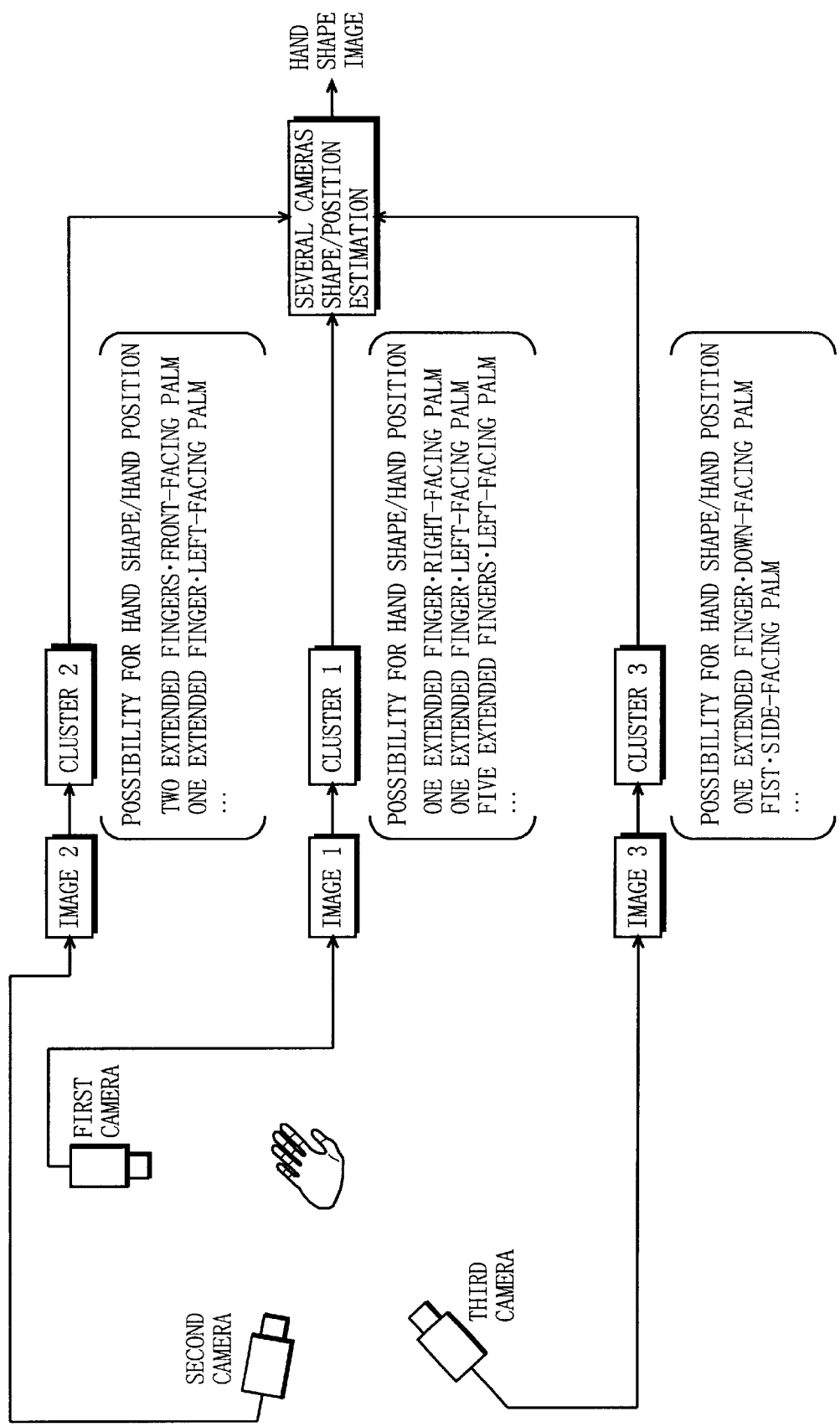
FIG. 15 shows an exemplary concept of determining, in a device for recognizing hand shape and position according to a fourth embodiment of the present invention, a hand shape image from input hand images obtained from a plurality of cameras.

Since the device of the fourth embodiment is structurally similar to the device in the second embodiment, no drawing is provided therefor. The shape/position recognition system 2 in the fourth embodiment is structurally and operationally described, more focused on the constituents differ from those in the device of the second embodiment by referring to FIGS. 8 and 15. FIG. 15 shows an exemplary concept of determining, in the device of the fourth embodiment, one hand shape image from input hand images obtained from several cameras. FIG. 15 exemplarily shows a case where three cameras are used.

First of all, as shown in FIG. 15, a hand in a certain shape and position is supposedly photographed from three different directions by using three cameras. Accordingly, three input hand images are acquired. These three input hand images are processed respectively in the hand image normalization part 21, the eigenspace photographing part 22, and the maximum likelihood cluster judgement part 25, and then are each determined to the appropriate clusters. Thereafter, by referring to these three clusters for shape information and position information included therein, the image comparison part 26 finds one hand shape image analogous most closely to these three input hand shape images under the following conditions (1) and (2).

(1) Be identical in hand shape.
(2) Hand position should correspond to camera location.

In detail, according to the condition (1), the image comparison part 26 first extracts any hand shape found in all of the clusters (in the example shown in FIG. 15, one extended finger). Then, according to the condition (2), the image comparison part 26 finds the hand position corresponding both to the extracted hand shape and camera location for the respective input hand images, and eventually one hand shape image is determined. In the example shown in FIG. 15, if an image of the back of the hand is selected for the first camera, for consistency, an image of the down-facing palm and an image of front-facing hand are supposedly selected for the second and the third cameras, respectively.

In this manner, one hand shape image which most sufficiently satisfies the conditions is selected for the input hand images obtained from the cameras, and accordingly the input hand images can be defined by hand shape and position.

As is known from the above, according to the device and method for recognizing hand shape and position of the fourth embodiment, input hand images obtained from a plurality of cameras can be defined by hand shape and position by combining, with consideration for camera location, shape information and position information in the clusters determined for each of the input hand images. In this manner, even a hand image which has been difficult to recognize from one direction (e.g., a hand image from the side) can be defined by hand shape and position with accuracy.

Note that, in the fourth embodiment, the shape information and the position information relevant to the input hand images from every camera is combined with consistency. However, it may not always be necessary to apply information from every camera for most-highly possible hand shape and position. Further, although three cameras are exemplarily used in the fourth embodiment, the number of cameras is not restrictive thereto.

(Fifth Embodiment)

The input hand image for recognition in the second embodiment is supposed to be a static image (e.g., indicating "one" by extending an index finger). However, in gesture and sign language, the hand may be successively moved to indicate one meaning, and the input hand image therefor is supposed to be a time-varying image (e.g., to show directions, extending one's arm and then pointing the direction with his/her index finger). As to such hand movement being time-varying image, the device of the second embodiment is not capable enough of recognizing what the hand movement means.

Therefore, a device for recognizing hand shape and position of a fifth embodiment is a type corresponding to a case where the input hand image is such time-varying image obtained by photographing a hand successively moved to indicate a meaning (hereinafter, hand movement image). The device of the fifth embodiment provides a method for catching the meaning of such hand movement. Therein, featured points are first extracted respectively for various hand movements, and are stored together with meanings thereof. Thereafter, featured points of the input hand movement image are compared with the already-stored featured points so as to find the meaning.

In the fifth embodiment, the input hand movement image supposedly includes not only a signer's hand but his/her upper or whole-body. The signer may be photographed from various directions, e.g., from the front, obliquely-above, or the side, and the device of the fifth embodiment can be effective for images photographed from any direction.

Figure 16:
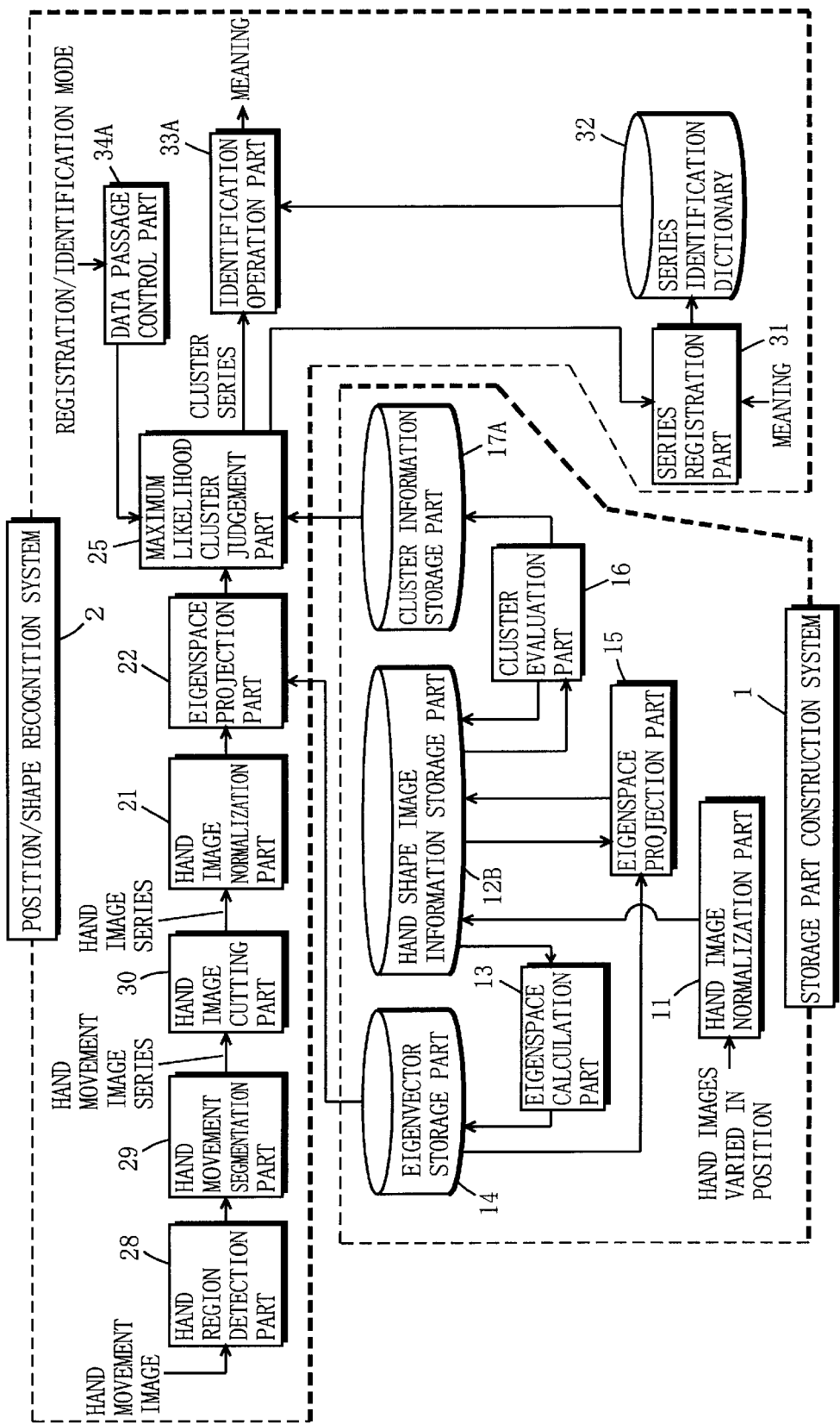
FIG. 16 is a block diagram showing the structure of a device for recognizing hand shape and position according to a fifth embodiment of the present invention.

FIG. 16 is a block diagram showing the structure of the device for recognizing hand shape and position of the fifth embodiment. In FIG. 16, the device of the fifth embodiment is structured, similarly to the device of the second embodiment, by the storage part construction system 1 and the shape/position recognition system 2.

In FIG. 16, the storage part construction system 1 is provided with the hand image normalization part 11, the eigenvector storage part 14, the eigenspace calculation part 13, the hand shape image information storage part 12B, the eigenspace projection part 15, the cluster information storage part 17A, and the cluster evaluation part 16, while the shape/position recognition system 2 is provided with a hand region detection part 28, a hand movement segmentation part 29, a hand image cutting part 30, the hand image normalization part 21, the eigenspace projection part 22, the maximum likelihood cluster judgement part 25, an identification operation part 33A, a series registration part 31, a series identification dictionary 32, and a data passage control part 34A.

As shown in FIG. 16, the device of the fifth embodiment is provided with, in the shape/position recognition system 2, the hand region detection part 28, the hand movement segmentation part 29, and the hand image cutting part 30 in the preceding stage to the hand image normalization part 21, and the series registration part 31, the series identification dictionary 32, the identification operation part 33A, and the data passage control part 34A as alternatives to the image comparison part 26 in the device of the second embodiment.

Other constituents in the device of the fifth embodiment are the same as those in the device of the second embodiment, and are denoted by the same reference numerals and not described again.

Herein, the storage part construction system 1 in the fifth embodiment is the storage part construction system 1 found in the device of the second embodiment, and is structured without the series identification dictionary 32. Note that, the constituents under the name of "storage part construction system 1" and "shape/position recognition system 2" in the fifth embodiment are provided only to show relevancy to the second embodiment, and are not restrictive to create the dictionary (series identification dictionary 32) in the actual internal processing, exemplarily in the recognition/shape recognition system 2.

The shape/position recognition system 2 in the fifth embodiment is structurally described, more focused on the constituents differ from those in the device of the second embodiment.

The hand region detection part 28 receives the hand movement image, and detects a hand region respectively therefrom. The hand movement segmentation part 29 finds any change point in hand shape and hand position for the hand movement image, and then creates a hand movement image structured by one or more images including the change points. From the hand movement image, the hand image cutting part 30 cuts any peripheral region where the hand is observed, and creates a hand image series for output to the hand image normalization part 21. The maximum likelihood cluster judgement part 25 outputs a cluster series corresponding to the hand image series to the series registration part 31. The series registration part 31 then registers, in the series identification dictionary 32, the cluster series together with a meaning of the hand movement image (hand movement image). The identification operation part 33A identifies what the hand movement image means by comparing the cluster series provided by the maximum likelihood cluster judgement part 25 with the cluster series registered in the series identification dictionary 32. The data passage control part 34A so controls that, for registration, the cluster series from the maximum likelihood cluster judgement part 25 is forwarded to the series registration part 31, and for recognition, to the identification operation part 33A.

Figure 17:
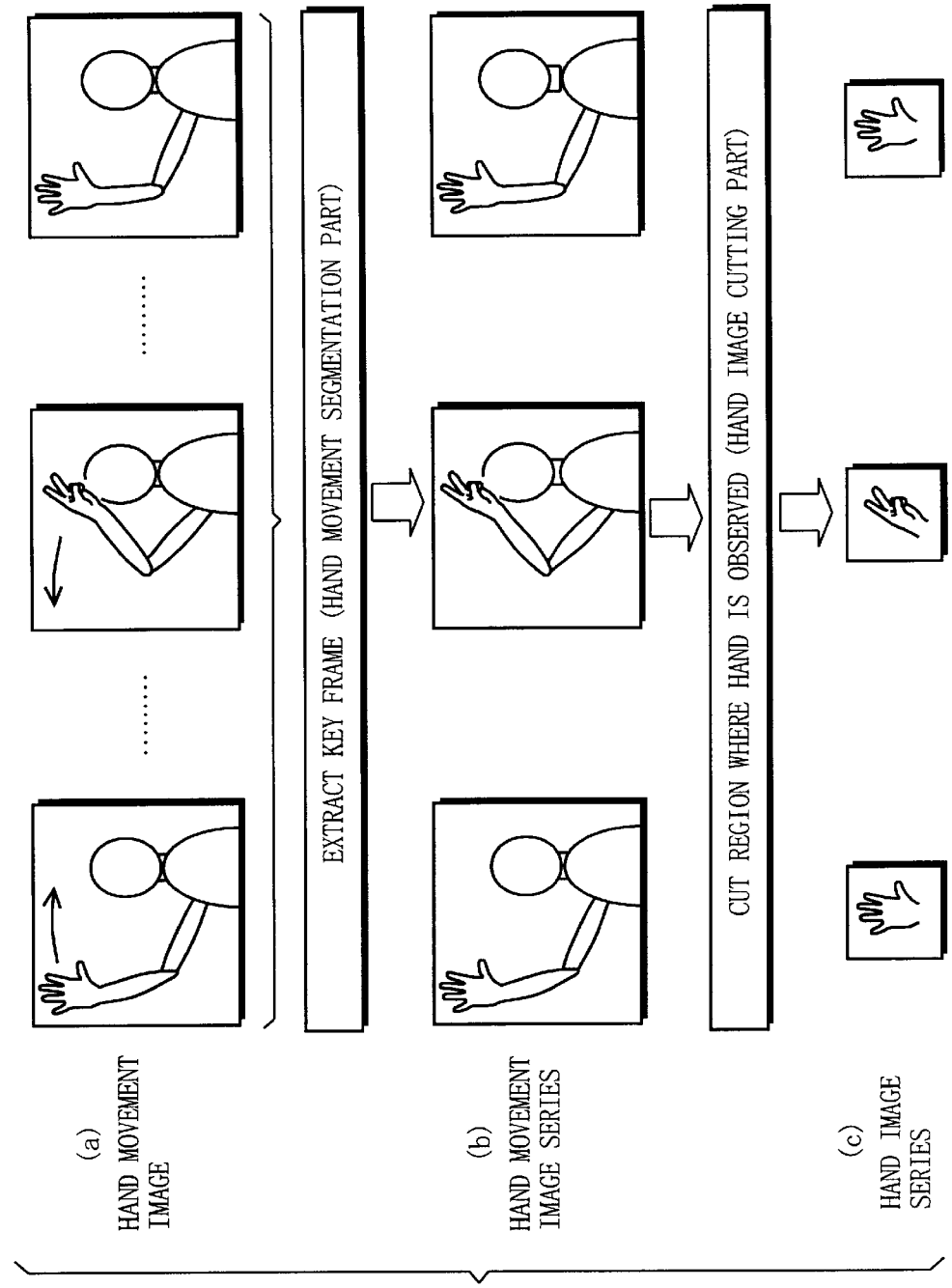
FIG. 17 shows a concept of processing carried out by a hand region detection part 28, a hand movement segmentation part 29, and a hand image cutting part 30 in FIG. 16.
Figure 18:
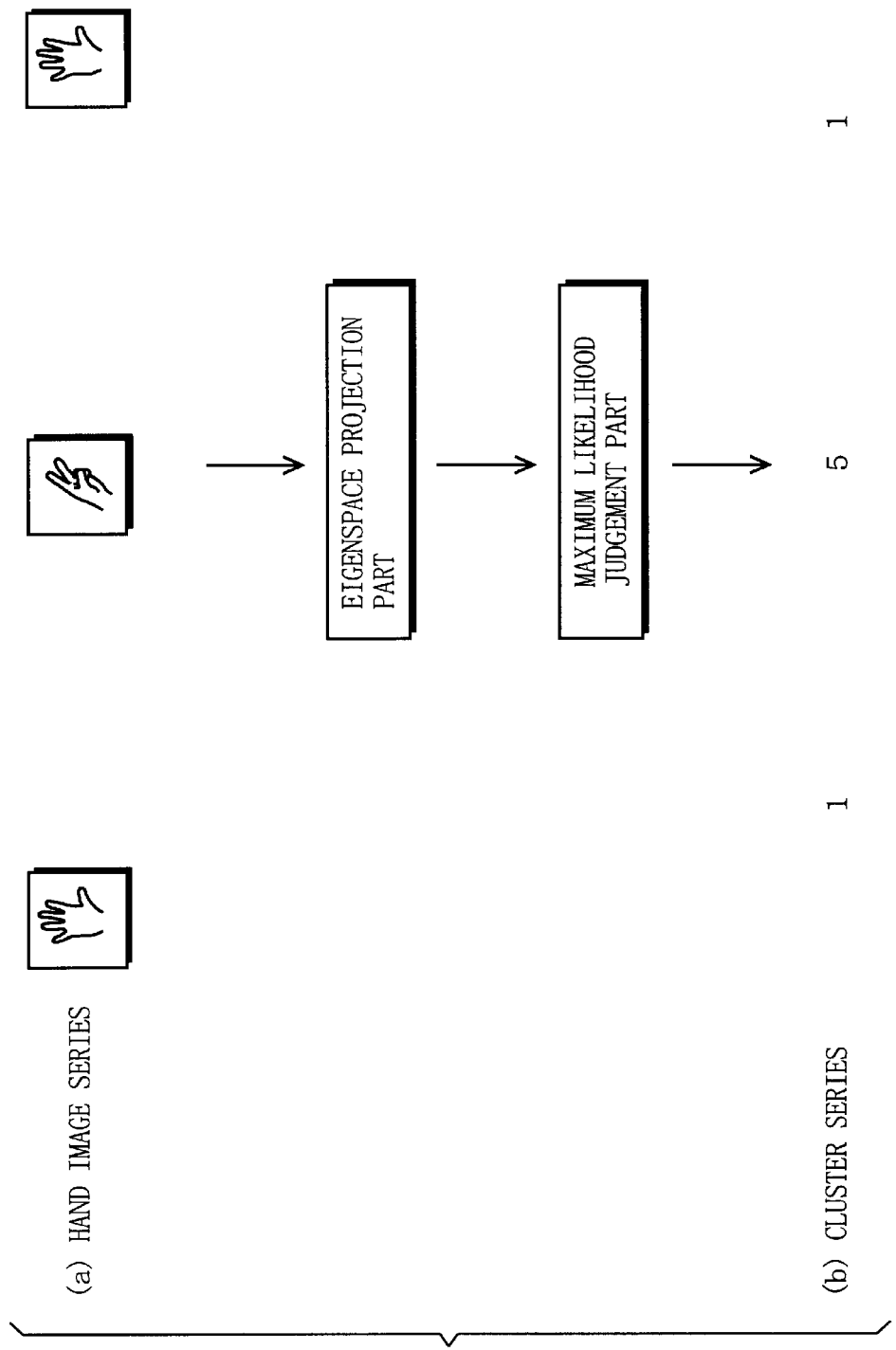
FIG. 18 shows a hand image series in FIG. 16 and an exemplary cluster series obtained therefrom.
Figure 20:
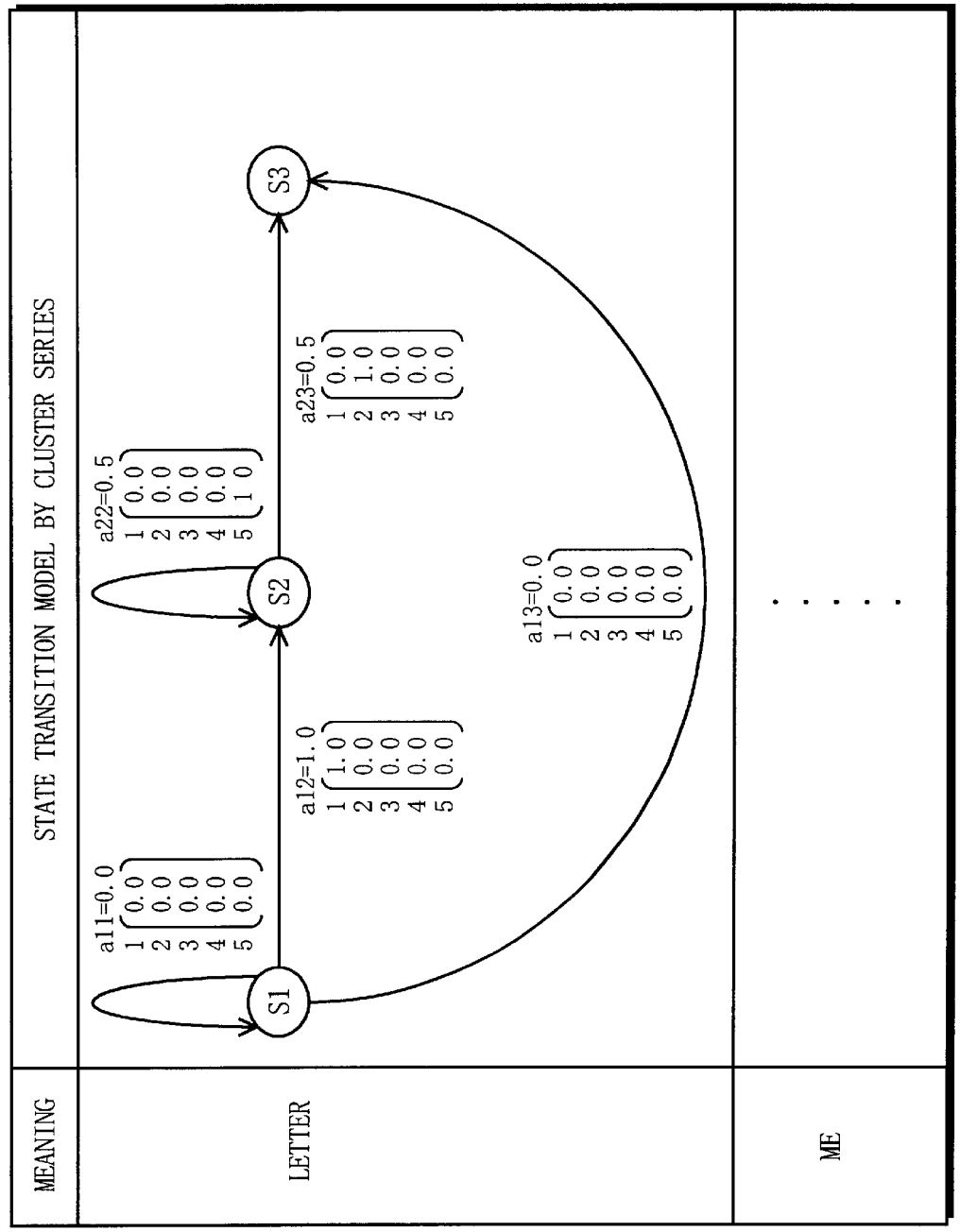
FIG. 20 shows an exemplary storage format of the series identification dictionary 32 in FIG. 16.

Next, by referring to FIGS. 17 to 20, the method for recognizing hand shape and position carried out by the device of the fifth embodiment is operationally described stepwise. FIG. 17 shows a concept of the processing carried out by the hand region detection part 28, the hand movement segmentation part 29, and the hand image cutting part 30 in FIG. 16. FIG. 18 shows the hand image series in FIG. 16 and an exemplary cluster series obtained therefrom. FIGS. 19 and 20 each show an exemplary storage format of the series identification dictionary 32 in FIG. 16. FIG. 19 shows an exemplary simple storage format in a table, and FIG. 20 shows an exemplary storage format based on a hidden Markov model.

In the fifth embodiment, the storage part construction system 1 operates similarly to the one in the device of the second embodiment, and is not described again.

The shape/position recognition system 2 operates in the following two modes:

1. Registration mode (first registration mode)

This is a mode of registering, in the series identification dictionary 32, the cluster series obtained from the input hand movement image together with the meaning of the input hand movement image.

2. Identification mode

This is a mode of identifying what the input hand movement image means according to the cluster series obtained therefrom. The identification mode is equivalent to the hand shape/position recognition carried out in the second embodiment, and the meaning of the hand movement is recognized through the eigenvector storage part 14, the cluster information storage part 17A, and the series identification dictionary 32.

As to mode selection, the data passage control part 34A is controlled which mode to select. Each mode is operationally described stepwise next below.

First, it is described how the hand region detection part 28, the hand movement segmentation part 29, and the hand image cutting part 30 operate. Such operation is common to both modes.

The hand movement image (a in FIG. 17) is provided to the hand region detection part 28. The hand region detection part 28 then detects a region where the hand is observed (hand region) for every image. Supposedly, the hand region is easily isolated from the background. Therefore, herein, each image is simply converted in binary so that a region whose area size is closer to the region where the hand is observed is detected as a hand region.

The hand movement segmentation part 29 finds, for the hand movement image provided from the hand region detection part 28, an image(s) vital for hand shape and position (hereinafter, key frame). The key frame herein should be an image in which hand shape and position is perceivable for a human being. The human being generally cannot perceive hand shape and position of the hand movement image due to afterimage. By taking this into consideration, the key frame to be found in the hand movement segmentation part 29 should be relatively small in hand movement. In this manner, the hand movement segmentation part 29 finds one or more key frames, and the key frames are forwarded to the hand image cutting part 30 as the hand movement image (b in FIG. 17).

In order to find the frame relatively small in hand movement, the hand regions of the respective hand images structuring the hand movement image may be referred to for any difference in area or change thereamong, the location of the hand in the hand region may be traced so as to find a point where the hand is relatively still (any frame in which a curvature of the hand trace is relatively large is included), or the point where the hand is relatively still is found by utilizing information on a time difference image obtained from the hand movement image. Or, every image included in the hand movement image may be the key frame.

Respectively from the key frame(s) found for the hand movement image by the hand movement segmentation part 29, the hand image cutting part 30 cuts the hand region detected by the hand region detection part 28, and then creates the hand image series (c in FIG. 17 and a in FIG. 18). The images structuring the hand image series are each equivalent to the hand images in the second embodiment. The hand image series created by the hand image cutting part 30 is forwarded to the hand image normalization part 21.

Thereafter, in a similar manner to the second embodiment, the hand image normalization part 21, the eigenspace projection part 22, and the maximum likelihood cluster judgement part 25 each perform processing to the key frame(s) of the hand image series. Accordingly, the key frame(s) are each determined to the appropriate clusters, and are outputted as the cluster series (b in FIG. 18).

Such processing is common to the both modes and is carried out to find the cluster series corresponding to the hand movement image.

Next, the processing not common to the both modes is described.

First of all, the processing in the registration mode is described.

In the registration mode, the cluster series to be outputted from the maximum likelihood cluster judgement part 25 is defined as to be a series which characterizes the hand movement, and is registered (stored) in the identification dictionary 32 together with the meaning of the hand movement.

Also the data passage control part 34A so controls that the cluster series provided by the maximum likelihood cluster judgement part 25 is forwarded to the series registration part 31.

The series registration part 31 then registers, in the series identification dictionary 32, the cluster series together with the meaning of the hand movement corresponding thereto. Although the storage format of the series identification dictionary 32 is varied in type, the two storage formats shown in FIGS. 19 and 20 are exemplarily adapted for description.

FIG. 19 shows a storage format in which the cluster series obtained by the maximum likelihood cluster judgement part 25 is registered, as it is, together with the meaning of the hand movement. As is known from FIG. 19, one meaning is not limited by one cluster series. This is because, the hand movement may slightly vary in speed and shape depending on who the signer is. The storage format of this type is created after the registration processing is repeated for several times for one hand movement.

FIG. 20 shows a storage format based on the hidden Markov model (HMM) exemplarily as a state transition model. The hidden Markov model is a technique popular for speech recognition, in which, as shown in FIG. 19, the cluster series plurally applicable to one meaning is integrally represented in one state transition model. The technical details of the hidden Markov model are found, for example, in a technical document, Nakagawa, "Speech Recognition by Established Model" published by Korona sha (phonetically written) and edited by The Electronic Information Communications Society. The storage format in FIG. 20 is created according to the document. Note that, in FIG. 20, scalar values each indicate a probability of the state transition for S1 to S3, while vector values each indicate a probability of output under conditions of the state transition in the clusters 1 to 5.

To create the series identification dictionary 32, it is popular to register the hand shape and position obtained from the images without any change. If this is the case, however, as described in the second embodiment, some hand images are not distinguishable when being analogous in hand position from a certain direction but different in hand shape, or when being analogous in hand shape but different in hand position. Therefore, for correct recognition, the images need to be compared with one another for matching as in the third embodiment or to be obtained from several cameras as in the fourth embodiment.

Therefore, instead, in the fifth embodiment, the cluster series is structured by the clusters, images in which are classified according to analogousness, and such cluster series is registered in the series identification dictionary 32. In this manner, the hand shape and position recognition can be done with higher accuracy.

Next, the processing in the identification mode is described.

In the identification mode, the series identification dictionary 32 is used to catch the meaning of the input hand movement image.

In this mode, the data passage control part 34A so controls that the cluster series provided by the maximum likelihood cluster judgement part 25 is forwarded to the identification operation part 33A.

The identification operation part 33A compares the cluster series provided by the maximum likelihood cluster judgement part 25 with the several cluster series registered in the series identification dictionary 32, and determines which registered cluster series is identical or similar thereto. Thereafter, the identification operation part 33A extracts the meaning corresponding to the determined cluster series from the series identification dictionary 32 for output.

As is known from the above, according to the device for recognizing hand shape and position of the fifth embodiment, before using cluster information similar to the one in the second embodiment, the meaning of the hand movement successively made to carry a meaning in gesture or sign language is previously stored together with the cluster series. Thereafter, at the time of recognizing the hand movement image, the cluster series is referred to for outputting the stored meaning.

In this manner, the hand movement successively made to carry the meaning in gesture or sign language can be recognized with higher accuracy, and accordingly can be correctly caught in meaning.

Note that, although the method for recognizing hand images by using the key frame(s) is described in the fifth embodiment, it is not restrictive but can be effectively applied to a case where every image is regarded as the key frame, a case where images sampled at a constant interval are regarded as the key frames, or a case where images only at the start and the end of the hand movement are regarded as the key frames.

(Sixth Embodiment)

In a sixth embodiment of the present invention, in the storage part construction system 1 in the fifth embodiment, the hand image series obtained from the hand movement image is stored with the meaning thereof instead of storing the hand images varied in hand shape and position in the hand shape image information storage part 12B.

Figure 21:
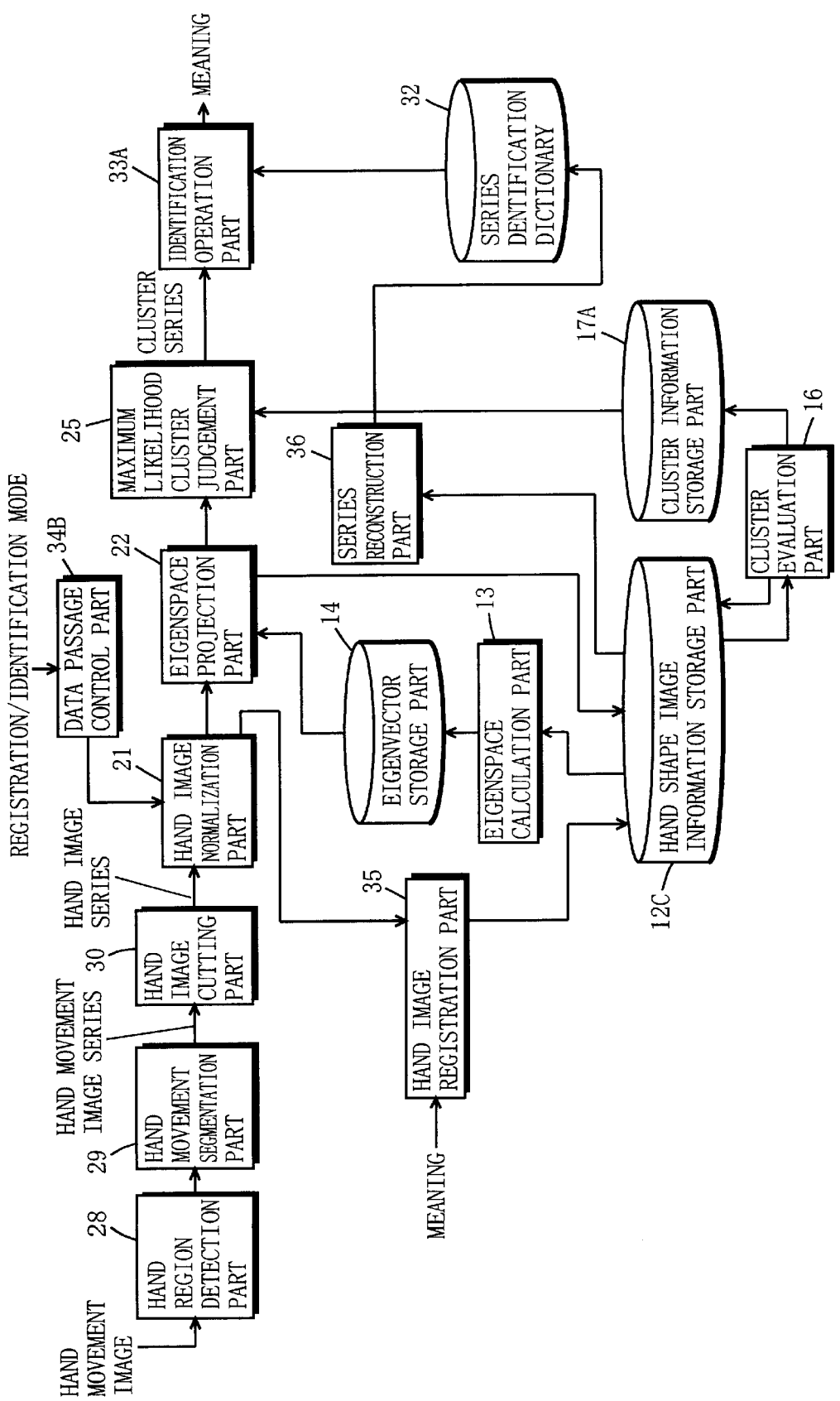
FIG. 21 is a block diagram showing the structure of a device for recognizing hand shape and position according to a sixth embodiment of the present invention.

FIG. 21 is a block diagram showing the structure of the device for recognizing hand shape and position of the sixth embodiment. As is known from FIG. 21, unlike the device of the fifth embodiment where the storage part construction system 1 and the shape/position recognition system 2 are separately provided, the device of the sixth embodiment is one integrated unit.

In FIG. 21, the device of the sixth embodiment is provided with the hand region detection part 28, the hand movement segmentation part 29, the hand image cutting part 30, the hand image normalization part 21, the eigenspace projection part 22, the maximum likelihood cluster judgement part 25, the identification operation part 33A, the series identification dictionary 32, a data passage control part 34B, a hand image registration part 35, a series reconstruction part 36, the eigenspace calculation part 13, the eigenvector storage part 14, a hand shape image information storage part 12C, the cluster evaluation part 16, and the cluster information storage part 17A.

As shown in FIG. 21, unlike the device of the fifth embodiment, the device of the sixth embodiment is one unit where the storage part construction system 1 and the shape/position recognition system 2 are integrated. Therefore, the hand image normalization 11 and the hand image normalization part 21, and the eigenspace projection part 15 and the eigenspace projection part 22 are respectively integrated therein, and the hand shape image information storage part 12C is provided as an alternative to the hand shape image information storage part 12B, the data passage control part 34B as the data passage control part 34A, and the hand image registration part 35 and the series reconstruction part 36 as the series registration part 31.

Other constituents in the device of the sixth embodiment are the same as those in the device of the fifth embodiment, and are denoted by the same reference numerals and not described again.

First, the device of the sixth embodiment is structurally described, more focused on the constituents differ from those in the device of the fifth embodiment. The hand image registration part 35 registers, in the hand shape image information storage part 12C, the hand image series corresponding to the hand movement image provided by the hand image normalization part 21 together with the meaning of the hand image series. The hand shape image information storage part 12C stores the hand shape image series (hand image series) corresponding to the registered hand movement image therein together with the meaning of the hand shape image series. The hand shape image information storage part 12C also stores, in a similar manner to the hand shape image information storage part 12B in the fifth embodiment, the projection coordinates obtained by projecting the hand shape images onto the eigenspace and the cluster IDs. Based on the information stored in the hand shape image information storage part 12C, the series reconstruction part 36 registers the cluster series each corresponding to the stored hand shape image series and the meaning thereof in the identification dictionary 32. The data passage control part 34B then so controls that, for registration, the hand image series from the hand image normalization part 21 is forwarded to the hand image registration part 35, and for recognition, to the eigenspace projection part 22.

Then, by referring to FIG. 22, the method for recognizing hand shape and position carried out by the device of the sixth embodiment is operationally described stepwise next below. FIG. 22 is an exemplary storage table provided in the hand shape image information storage part 12C in FIG. 21.

The device of the sixth embodiment operates in the following two modes:

1. Registration mode (second registration mode)

This is a mode of registering, in the series identification dictionary 32, the cluster series obtained from the input hand movement image together with the meaning of the images. In the registration mode, information for storage is stored in the hand shape image information storage part 12C, the eigenvector storage part 14, and the cluster information storage part 17A, and the processing therein is equivalent to the storage part construction system 1 in the second embodiment. In detail, in the hand shape image information storage part 12C, the hand image series (hand shape image series) obtained from the input hand movement image is stored together with the meaning of the images, and eigenspace calculation and cluster evaluation are performed according to the stored hand shape images. Thereafter, the obtained cluster series and the meaning of the images are registered in the series identification dictionary 32.

2. Identification mode: hand movement identification

This is a mode of identifying what the input hand movement image means according to the cluster series obtained therefrom. The identification mode is also equivalent to the hand shape/position recognition carried out in the second embodiment, and the meaning of the hand movement is recognized through the eigenvector storage part 14, the cluster information storage part 17A, and the series identification dictionary 32.

As to mode selection, the data passage control part 34B is controlled which mode to select. Each mode is operationally described stepwise next below.

First, the processing in the registration mode is described.

As described in the forgoing, the hand movement image is processed, in a similar manner to the fifth embodiment, in the hand region detection part 28, the hand movement segmentation part 29, the hand image cutting part 30, and the hand image normalization part 21. The hand image series corresponding to the input hand movement image is thus outputted from the hand image normalization part 21. The data passage control part 34B so controls that the hand image is forwarded to the hand image registration part 35.

Next, the hand image registration part 35 stores, in the hand shape image information storage part 12C, the hand image series provided by the hand image normalization part 21 together with the meaning of the hand movement corresponding to the hand image series. FIG. 22 shows an exemplary storage table provided in the hand shape image information storage part 12C. As shown in FIG. 22, the hand shape image information storage part 12C is stored with, unlike the hand shape image information storage part 12B in the second embodiment being stored with the shape information and the position information, information (steps) such as a number of the hand image series, the meaning of the hand movement image corresponding to the hand image series, and an ordinal rank of the hand shape image included in the series. In a case where both hands are abutting to each other in an image, such image is registered as one hand shape image.

With respect to the hand shape images stored in the hand shape image information storage part 12C, the eigenspace calculation part 13, the eigenvector storage part 14, the eigenspace projection part 22, and the cluster evaluation part 16 all operate in a similar manner to the second embodiment. Thereafter, the eigenvector storage part 14 stores eigenvectors corresponding to the hand shape images and the cluster information storage part 17A stores cluster information. The hand shape image information storage part 12C is stored with the eigenspace projection coordinates and the cluster IDs.

After the information storage into the hand shape image information storage part 12C is completed, the series reconstruction part 36 registers the cluster series of each stored hand image series and the corresponding meaning to the series identification dictionary 32.

Next, the operation in the identification mode is described.

In the identification mode, the identification operation part 33A compares the cluster series provided by the maximum likelihood cluster judgement part 25 with a plurality of cluster series registered in the series identification dictionary 32, and then determines which of the registered cluster series is identical or similar thereto. Thereafter, the identification operation part 33A extracts, for output, from the series identification dictionary 32, the meaning of the cluster series determined to be identical or similar.

As described in the foregoing, according to the device for recognizing hand shape and position of the sixth embodiment, the images can surely be photographed under the same environment, and accordingly there is no more need to newly acquire images for recognition. Consequently, the images can be recognized with higher accuracy.

Further, the device of the sixth embodiment can be further provided with both the series registration part 31 and the data passage control part 34A in the fifth embodiment, and the registration of the cluster series and the corresponding meaning in the series identification dictionary 32 may be done in both the first and the second registration modes.

With such structure, even if the hand shape image information storage part 12C is provided as a fixed data base, it becomes possible to register new hand movement image (updating of the series identification dictionary 32) in the first registration mode.

(Seventh Embodiment)

A seventh embodiment of the present invention provides a method of catching the meaning of the hand movement when the input hand image is obtained by photographing the hand successively moving to convey a meaning in gesture or sign language. This can be implemented by using the device of the fifth or sixth embodiment as a module for a device for recognizing gesture or sign language.

Herein, the present invention is exemplarily applied to recognize sign language. In sign language, the meaning is conveyed through many elements including the spatial location of the hand, the hand movement, the hand shape and position, for example. As to the hand shape, it may also be concerned with the hand shape at the start and at the end of the sign language (right hand or left hand only, or both). FIG. 23 exemplarily shows some sign language words described with such elements. In FIG. 23, for a sign language word having the meaning of "say", the index finger of the right hand is pointed up and is brought to the mouth. Thereafter, the index finger is pushed forward. For another sign language word having the meaning of "like", the thumb and the index finger of the right hand are both extended and then are brought to the chin part. Thereafter, the both fingers are downwardly moved while being closed.

Therefore, in the device of the seventh embodiment, the successive hand movement is restricted by some comprehensive characteristics, e.g., the spatial location and the hand movement in order to recognize hand images with higher accuracy.

Figure 24:
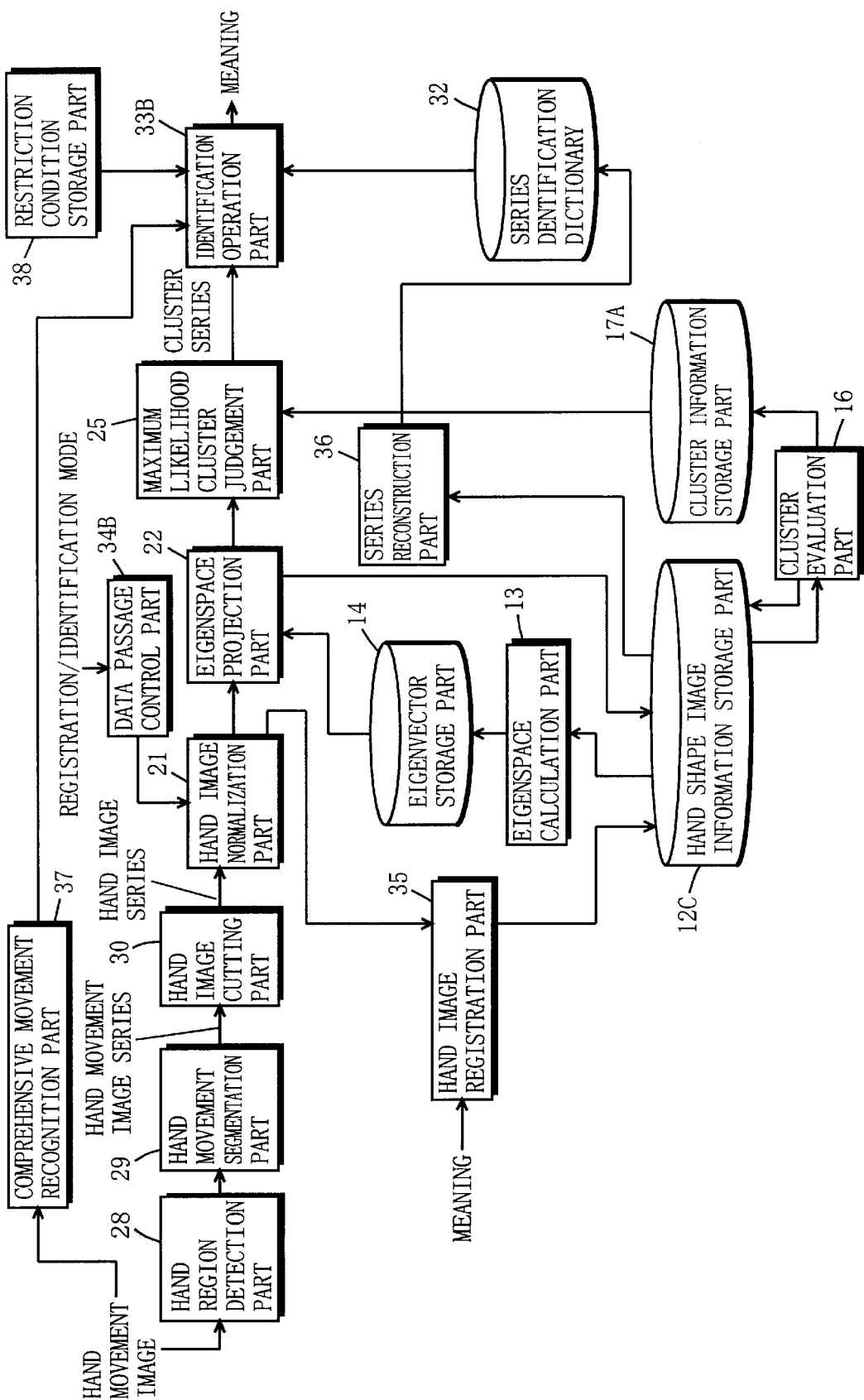
FIG. 24 is a block diagram showing the structure of a device for recognizing hand shape and position according to a seventh embodiment of the present invention.

FIG. 24 is a block diagram showing the structure of the device for recognizing hand shape and position according to a seventh embodiment. In FIG. 24, the device of the seventh embodiment is provided with the hand image registration part 35, the eigenvector storage part 14, the eigenspace calculation part 13, the hand shape image information storage part 12C, the cluster information storage part 17A, the cluster evaluation part 16, the series reconstruction part 36, the hand region detection part 28, the hand movement segmentation part 29, the hand image cutting part 30, the hand image normalization part 21, the eigenspace projection part 22, the maximum likelihood cluster judgement part 25, an identification operation part 33B, the series identification dictionary 32, the data passage control part 34B, a comprehensive movement recognition part 37, and a restriction condition storage part 38.

The device of the seventh embodiment shown in FIG. 24 is further provided with the comprehensive movement recognition part 37 and the restriction condition storage part 38 compared with the device of the sixth embodiment, and is provided with the identification operation part 33B as an alternative to the identification operation part 33A.

Other constituents in the device of the seventh embodiment are the same as those in the device of the sixth embodiment, and are denoted by the same reference numerals and not described again.

First, the restriction condition storage part 38 is prestored with restriction conditions for restricting the hand shape and position according to the hand movement carrying a meaning such as sign language words. As shown in FIG. 23, by taking the sign language word having the meaning of "say" as an example, the index finger should be pointed up at the start and the end, and hand position, the spatial hand location, and the hand movement should be as described in the foregoing. Herein, the sign language word "say" is signed only with the right hand, therefore in FIG. 23, no description is made for the left hand.

The hand movement image is forwarded to both the comprehensive movement recognition part 37 and the hand region detection part 28. The comprehensive movement recognition part 37 extracts, in a similar manner to the hand region detection part 28, the hand region from each of the images structuring the input hand movement image. Thereafter, the comprehensive movement recognition part 37 traces the hand movement in the hand regions and determines the hand location with respect to the body. The information on the hand trace and location is forwarded to the identification operation part 33B. The comprehensive movement recognition part 37, exemplarily, traces the hand and determines the hand location in a manner disclosed in "Hand Movement Recognition Device" (11-174948/99-174948) applied by the applicant of the present invention.

The hand movement image provided to the hand region detection part 28 is processed, in a similar manner to the sixth embodiment, in the hand movement segmentation part 29, the hand image cutting part 30, the hand image normalization part 21, the eigenspace projection part 22, and the maximum likelihood cluster judgement part 25, and then the cluster series corresponding to the hand movement image is provided from the maximum likelihood cluster judgement part 25 to the identification operation part 33B.

From the data stored in the restriction condition storage part 38, the identification operation part 33B first extracts one or more sign language/gesture word matching to the hand movement recognition result (information on the hand trace and location) provided by the comprehensive movement recognition part 37. Then, the identification operation part 33B compares the cluster series provided by the maximum likelihood cluster judgement part 25 with the several cluster series registered in the series identification dictionary 32, and determined which of the registered cluster series is identical or similar thereto. Thereafter, the identification operation part 33B extracts the meaning(s) of the determined cluster series from the series identification dictionary 32. By referring to the extracted sign language/gesture word(s) and the meaning(s), the identification operation part 33B outputs one meaning being closest to the input hand movement image.

As is known from the above, according to the device for recognizing hand shape and position of the seventh embodiment, the restriction conditions relevant to the comprehensive hand movement are additionally imposed, and the hand movement image is defined by meaning.

In this manner, the hand movement image can be recognized with higher accuracy.

Note that, in the seventh embodiment, the comprehensive movement recognition part 37, the restriction condition storage part 38, and the identification operation part 33B are provided to the device of the sixth embodiment. However, these constituents may be provided to the device of the fifth embodiment, or to a device being a combination of the devices of the fifth and sixth embodiments.

(Eighth Embodiment)

An eighth embodiment of the present invention provides a method for detecting a hand region with higher accuracy by utilizing the cluster information also to the hand region in the hand region detection part 28 in the fifth to seventh embodiments.

FIG. 25 is a block diagram showing the detailed structure of hand region detection part provided in the device of the eighth embodiment. In FIG. 25, a hand region detection part 48 in the eighth embodiment is provided with a possible region cutting part 39, a masking region storage part 40, an image normalization part 41, the eigenspace projection part 22, the maximum likelihood cluster judgement part 25, and a region determination part 42.

Other constituents in the device of the eighth embodiment are the same as those in the devices of the fifth to seventh embodiments, and are denoted by the same reference numerals and not described again.

First, the hand region detection part 48 in the device of the eighth embodiment is structurally described.

The possible region cutting part 39 cuts, from each of the images structuring input hand movement image, a region where is a possibility for a hand region. The possible region cutting part 39 then forwards, to the region determination part 42, information about the location of the possible hand regions. The masking region storage part 40 stores a masking region used to extract only a predetermined region from each of the possible hand regions cut by the possible region cutting part 39. The image normalization part 41 normalizes, in size, the possible hand regions cut by the possible region cutting part 39, and thereon, superimposes the masking region stored in the masking region storage part 40 for normalization in contrast. The possible hand region images are thus acquired. The eigenspace projection part 22 projects, as in the fifth to seventh embodiments, the possible hand region images onto the eigenspace. The maximum likelihood cluster judgement part 25 determines, as in the fifth to seventh embodiments, the cluster closest to each of the eigenspace projection coordinates obtained by the eigenspace projection part 22. The region determination part 42 applies the likelihood of the clusters to every possible hand region image, and then outputs the location of the possible hand region image having the highest likelihood and an index thereof.

Figure 27:
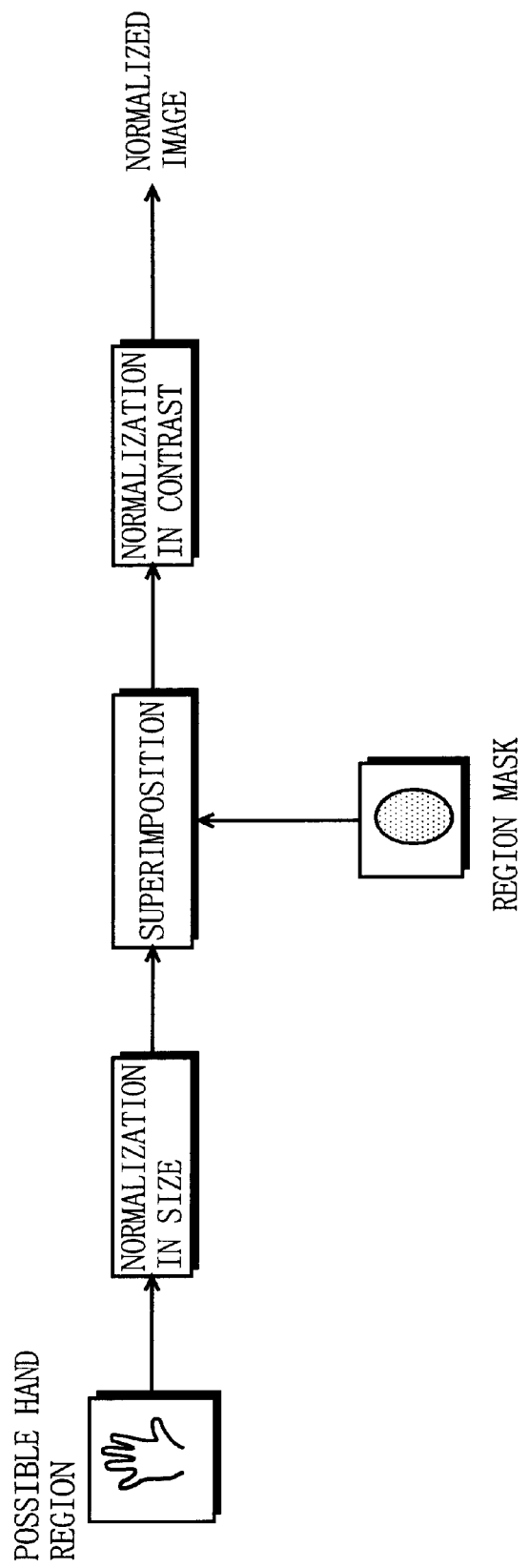
FIG. 27 is a schematic diagram showing the processing carried out by an image normalization part 41 in FIG. 25.
Figure 28:
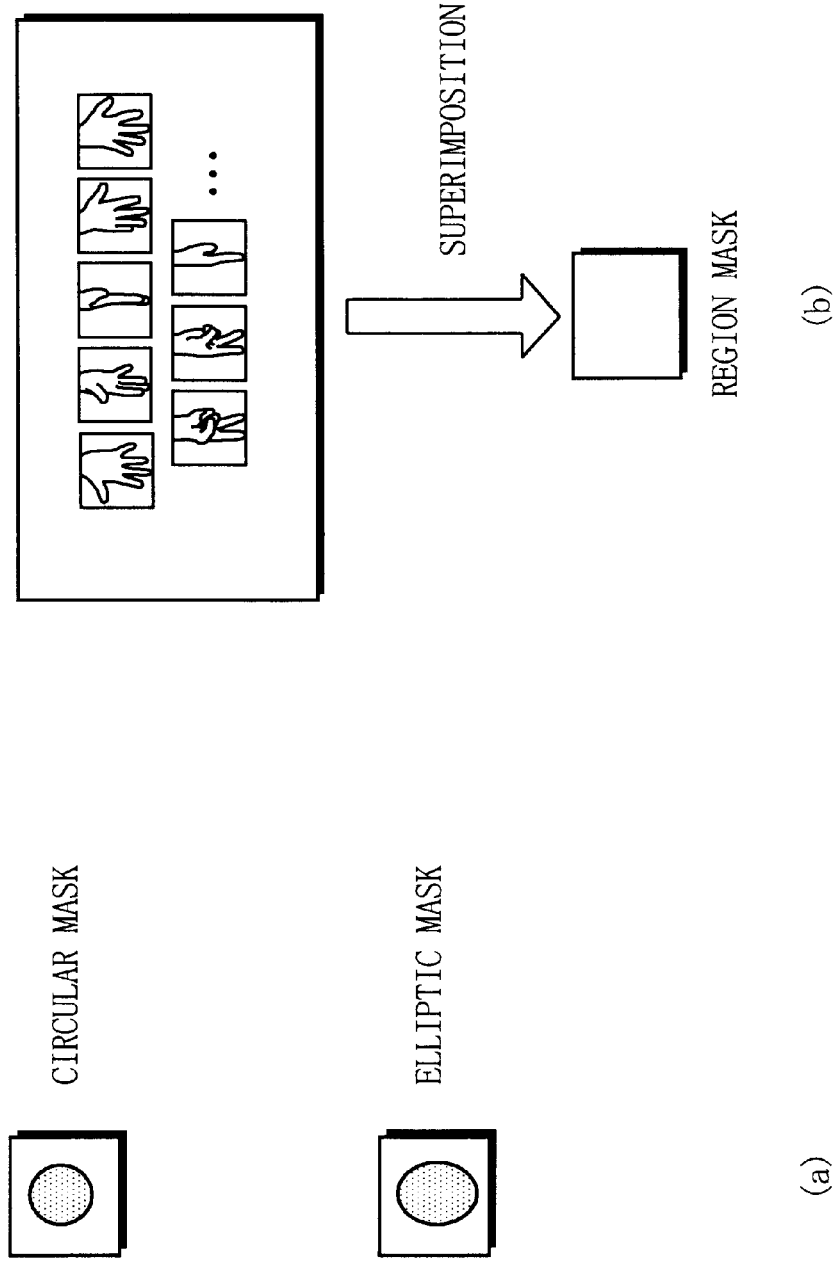
FIG. 28 shows an exemplary mask region stored in a masking region storage part 40 in FIG. 25.

By referring to FIGS. 26 to 28, it is now described stepwise how the hand region detection part 48 in the device of the eighth embodiment detects the hand region. FIG. 26 shows an exemplary technique, carried out by the possible region cutting part 39 in FIG. 25, for determining a possible hand region. FIG. 26 shows three techniques: a technique for simple scanning; a technique for cutting a possible hand region based on color information etc.; and a technique for cutting a hand region by estimating the current location of the hand region based on the preceding location thereof. FIG. 27 is a schematic diagram showing the processing carried out by the image normalization part 41 in FIG. 25. FIG. 28 shows an exemplary masking region stored in the masking region storage part 40 in FIG. 25.

First, the possible region cutting part 39 obtains a possible hand region from the input hand movement image, and then cuts a rectangular region corresponding to the possible hand region. In order to obtain the possible hand region, it may be possible to apply three techniques shown in FIG. 26.

In a first technique being the simplest, a size for the possible hand region is predetermined. A rectangular region is cut and scanned on the hand movement image, and every region obtained thereby is regarded as the possible hand region (a in FIG. 26). In this technique, the size for scanning may be varied depending on the size of the hand on the hand movement image.

In a second technique, by utilizing the color information (e.g., beige information), only a rectangular region peripheral to the hand image in the color of the color information is cut for scanning. In this technique, by using the beige information, only the images peripheral to the hand and face can be cut for the possible hand region (b in FIG. 26).

In a third technique, the current location of the hand region is estimated based on information about the preceding location of the hand region (information fed back from the region determination part 42). Then, the estimated hand region is peripherally scanned to cut the possible hand region. Such technique may be varied in manner. For example, the preceding hand speed is added to the preceding hand location to estimate the current location of the hand region, or a Kalman filter is used to determine the hand location (c in FIG. 26).

Thereafter, as shown in FIG. 27, the image normalization part 41 normalizes, in size, the possible hand region cut by the possible region cutting part 39. Thereon, the masking region stored in the masking region storage part 40 is then superimposed for normalization in contrast. The reason for superimposing the masking region on the possible hand region is that the processing is carried out on such shape as palm or face which cannot be represented in a rectangular region. By taking this into consideration, for the masking region stored in the masking region storage part 40, it may be preferable a geometric mask (mask in a simple geometric pattern (e.g., circular, elliptic)) as a in FIG. 28 or a mask created from learning images (mask obtained after OR operation subjected to a pile of learning images) as b in FIG. 28.

As is known from this, the image normalization part 41 generates the possible hand region image by first superimposing the masking region on the possible hand region image, and then by normalizing the image in contrast.

Thereafter, in a similar manner to the fifth to seventh embodiments, the eigenspace projection part 22 projects, under the control of the eigenvector storage part 14, the possible hand region images provided by the image normalization part 41 onto the eigenspace, and then calculates the projection coordinates. Then, the maximum likelihood cluster judgement part 25 determines which projection coordinates belong to which cluster stored in the cluster information storage part 17A, and then forwards, for every possible hand region image, the cluster and the likelihood thereof to the region determination part 42.

Thereafter, the region determination part 42 selects the possible hand region having the highest likelihood, and then the location (provided by the possible region cutting part 39) and the size of the hand region is outputted to the hand movement segmentation part 29 as a hand region detection result.

As is described in the foregoing, according to the device and the method for recognizing hand shape and position of the eighth embodiment, the hand region is detected by projecting the possible hand region onto the eigenspace and then selecting the appropriate cluster.

In this manner, the hand region and the cluster therefor can be simultaneously determined. Accordingly, the hand region can be concurrently detected with the hand shape/position, or with the hand movement.

Note that, although the above-described technique is applied to the hand movement image in this embodiment, it may also be effectively applied to detect any general moving object from general time-varying images.

(Ninth Embodiment)

A ninth embodiment of the present invention provides a method for detecting the current hand region with higher accuracy in the image normalization part 41 and the region determination part 42 in the hand region detection part 48 in the eighth embodiment. This is implemented by utilizing the cluster information at the preceding time.

Figure 29:
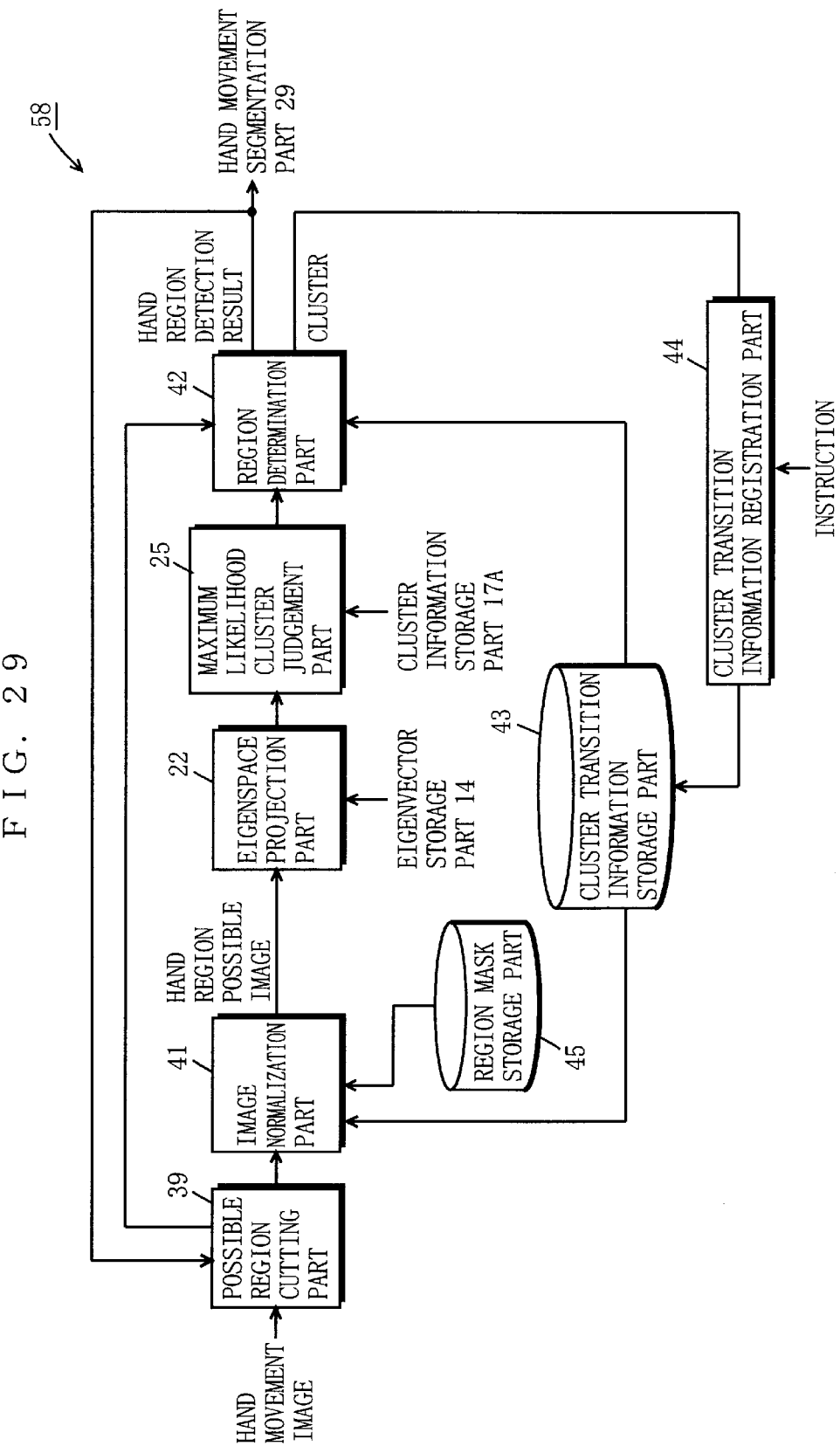
FIG. 29 is a block diagram showing the detailed structure of a hand region detection part provided in a device for recognizing hand shape and position according to a ninth embodiment of the present invention.

FIG. 29 is a block diagram showing the detailed structure of a hand region detection part 58 in the device for recognizing hand shape and position of the ninth embodiment. In FIG. 29, the hand region detection part 58 in the device of the ninth embodiment is provided with the possible region cutting part 39, a masking region storage part 45, the image normalization part 41, the eigenspace projection part 22, the maximum likelihood cluster judgement part 25, the region determination part 42, a cluster transition information storage part 43, and a cluster transition information registration part 44.

As shown in FIG. 29, the hand region detection part 58 in the device of the ninth embodiment is further provided with the cluster transition information storage part 43 and the cluster transition information registration part 44 to the hand region detection part 48 in the device of the eighth embodiment, and is provided with the masking region storage part 45 as an alternative to the masking region storage part 40.

Other constituents in the device of the ninth embodiment are the same as those in the device of the eighth embodiment, and are denoted by the same reference numerals and not described again.

Figure 30:
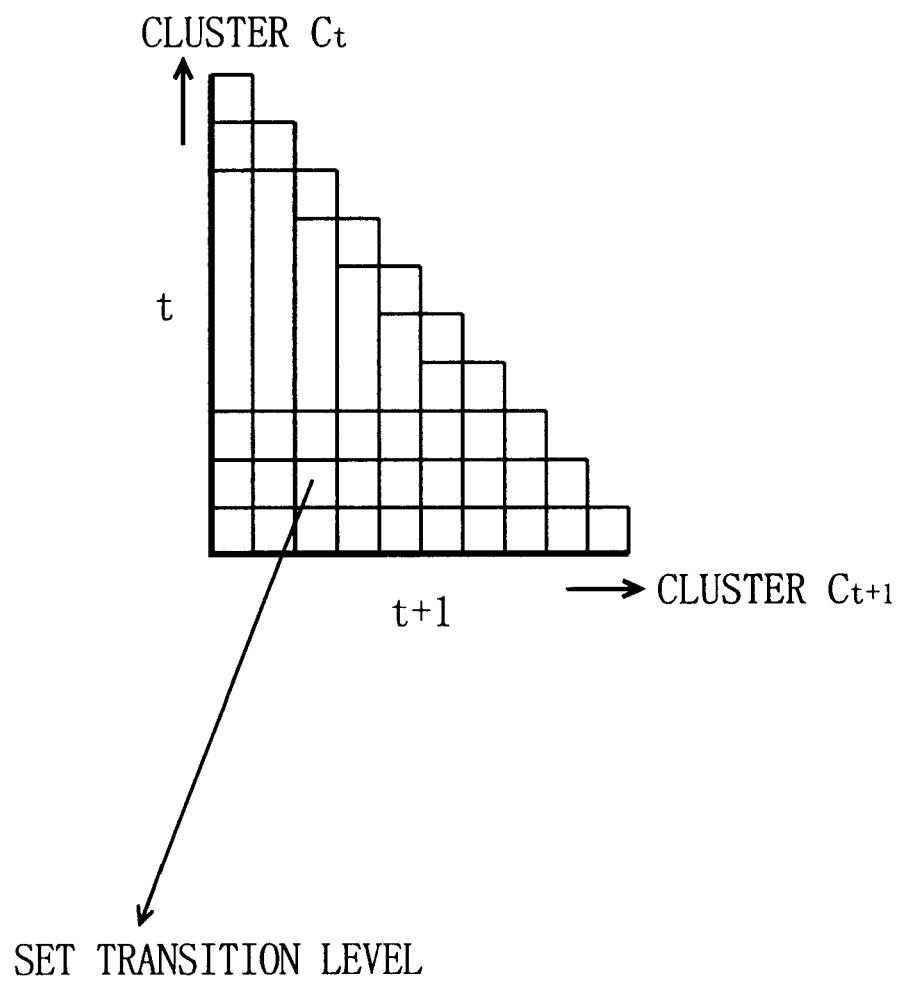
FIG. 30 shows exemplary cluster transition information stored in a cluster transition information storage part 43 in FIG. 29.

By referring to FIGS. 30 to 31, it is now described stepwise how the hand region detection part 58 in the device of the ninth embodiment detects the hand region. FIG. 30 is a diagram exemplarily showing the cluster transition information stored in the cluster transition information storage part 43 in FIG. 29. As shown in FIG. 30, the cluster transition information storage part 43 is stored with a transition level map showing a frequency of cluster transition. In detail, when a cluster is provided at a certain time t, the map shows the cluster's possible transition at the subsequent time t+1. Herein, the frequency of cluster transition is referred to as cluster transition level. FIG. 31 shows exemplary masking regions stored in the masking region storage part 45 in FIG. 29. As shown in FIG. 31, the masking region 45 is provided with the masks created from the learning images for every cluster.

First, the possible region cutting part 39 finds, in a similar manner to the eighth embodiment, a possible hand region from each of the images structuring the input hand movement image, and then cuts a rectangular region corresponding thereto.

Then, the image normalization part 41 normalizes, in size, the possible hand regions obtained by the possible region cutting part 39, and thereonto, the hand masking regions stored in the masking region storage part 45 are each superimposed for normalization in contrast. At this time, by referring to the cluster transition information storage part 43 for the cluster at the preceding time, the image normalization part 41 plurally selects the clusters having higher transition level, and then extracts the masks applicable thereto from the masking region storage part 45. Thereafter, the image normalization part 41 creates a new mask by piling up the extracted masks for OR operation, and then the created new mask is superimposed on each of the possible hand regions for normalization in contrast. In this manner, the possible hand region images are acquired.

Thereafter, the eigenspace projection part 22 projects, in a similar manner to the eighth embodiment, the possible hand region images from the image normalization part 41 onto the eigenspace to obtain the projection coordinates. The maximum likelihood cluster judgement part 25 determines the cluster closest to each of the eigenspace projection coordinates obtained by the eigenspace projection part 22, and then outputs the determined clusters and the likelihood thereof for each of the possible hand region images to the region determination part 42.

The region determination part 42 then refers to the transition level map stored in the cluster transition information storage part 43 according to the clusters and the likelihood thereof corresponding to the possible hand region images from the maximum likelihood cluster judgement part 25, and among the clusters having the transition level higher than a certain value, selects one cluster having the highest likelihood so as to determine the possible hand region thereof. Thereafter, the location (provided by the possible region cutting part 39) and the size of the possible hand region in the selected cluster are notified to the hand movement segmentation part 29 as a hand region detection result. The region determination part 42 also notifies the selected cluster to the cluster transition information registration part 44.

Based on the hand region detection result obtained by the region determination part 42, the cluster transition information registration part 44 operates only when any request for update of the cluster transition information storage part 43 is received. Such request is made by a user using the system or a person who constructs the system. When the request for update is received, based on both the detected cluster and the previous cluster, the cluster transition information registration part 44 updates the cluster transition information in the cluster transition information storage part 43. This update can be done by increasing the value found in the applicable location in the transition map by a certain value, for example.

As is known from the above, according to the device and the method for recognizing hand shape and position of the ninth embodiment, the cluster transition information is utilized to determine the hand region in the device of the eighth embodiment. In this manner, the hand region can be determined with higher accuracy.

Note that, although the above-described technique is applied to the hand movement image in this embodiment, it may be effectively applied to detect any general moving object from general time-varying images.

(Tenth Embodiment)

A tenth embodiment of the present invention provides a method for recognizing hand shape and position with still higher accuracy. This is implemented, when normalizing the hand image in the hand image normalization parts 11 and 21 in the first to seventh embodiments, not only deleting a wrist region therefrom but extracting the hand region based on color (beige), or emphasizing the characteristics of the fingers after normalization. In this manner, the hand can be photographed with a non-artificial background, and from the image taken in thereby, a hand region can be deleted.

Figure 32:
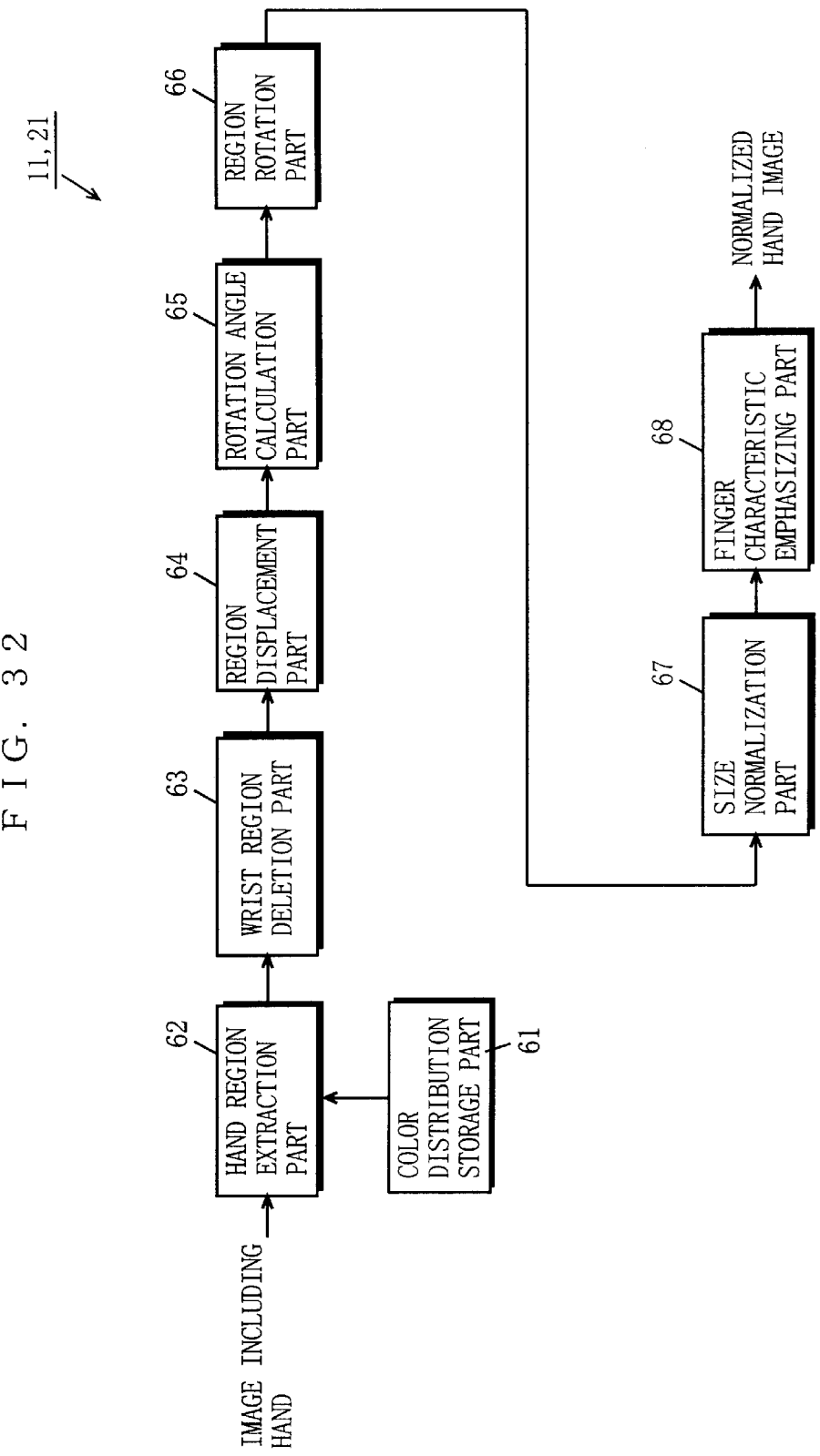
FIG. 32 is a block diagram showing the structure, to a greater degree, of the hand image normalization parts 11 and 21 provided in a device for recognizing hand shape and position according to a tenth embodiment of the present invention.

FIG. 32 is a block diagram showing the more detailed structure of the hand image normalization parts 11 and 21 provided in the device of the tenth embodiment.

In FIG. 32, the hand image normalization parts 11 and 21 in the device of the tenth embodiment are respectively provided with a color distribution storage part 61, a hand region extraction part 62, a wrist region deletion part 63, a region displacement part 64, a rotation angle calculation part 65, a region rotation part 66, a size normalization part 67, and a finger characteristic emphasizing part 68.

Other constituents in the device of the tenth embodiment are the same as those in the devices of the first to seventh embodiments, and are denoted by the same reference numerals and not described again.

First, the hand image normalization parts 11 and 21 in the device of the tenth embodiment are structurally described.

The color distribution storage part 61 previously stores a color distribution of a to-be-extracted hand region. According to the color distribution, the hand region extraction part 62 extracts the hand region. The wrist region deletion part 63 finds which direction the wrist is oriented in the extracted region, and then deletes a wrist region therefrom according to the wrist orientation. The region displacement part 64 displaces the hand region from which the wrist region is deleted to a location predetermined on the image. The rotation angle calculation part 65 determines a rotation angle of the hand to be perpendicular to the optical axis. According to the rotation angle, the region rotation part 66 so rotates that the hand is oriented to a certain direction. The size normalization part 67 normalizes, in a certain size, the rotated hand region. The finger characteristic emphasizing part 68 deletes, from the normalized hand region, a predetermined region other than the fingers so as to emphasize the characteristics of the fingers.

Figure 33:
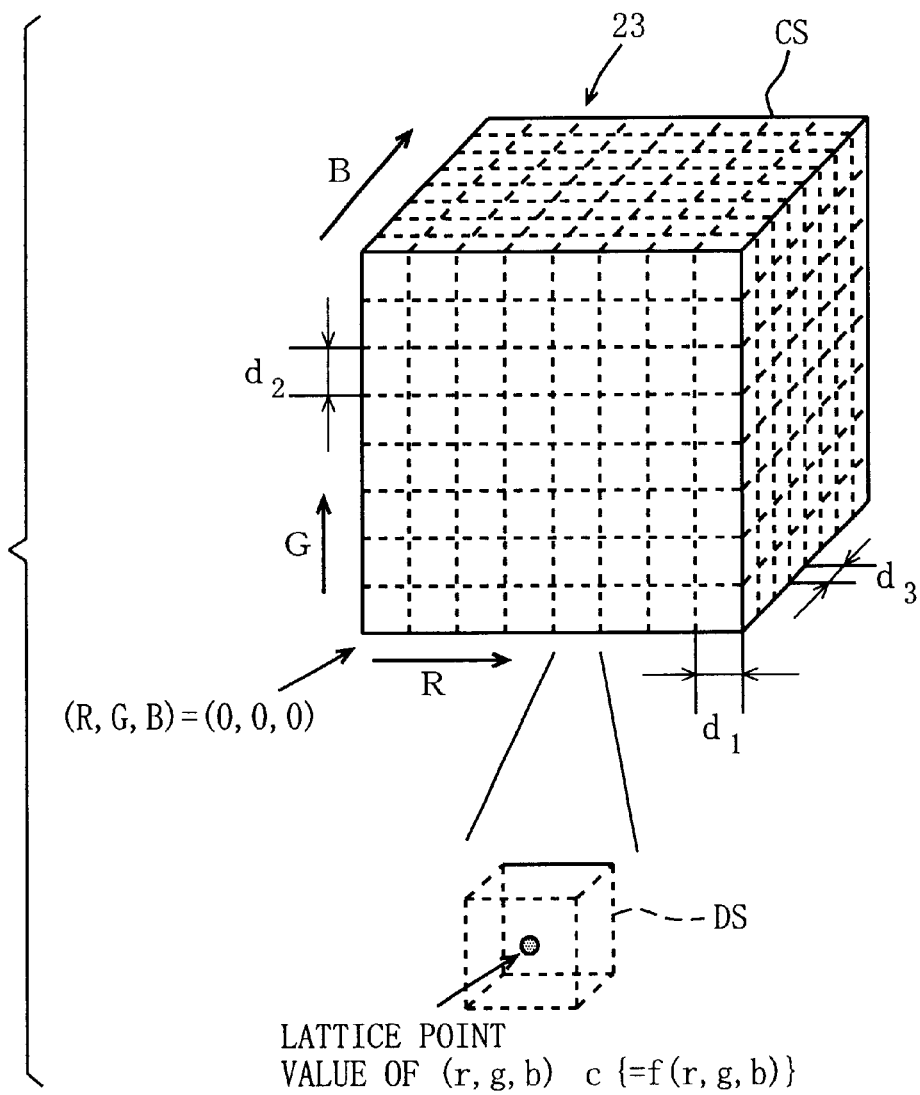
FIG. 33 is a diagram exemplarily showing the structure of a storage table provided in a color distribution storage part 61 in FIG. 32.
Figure 34:
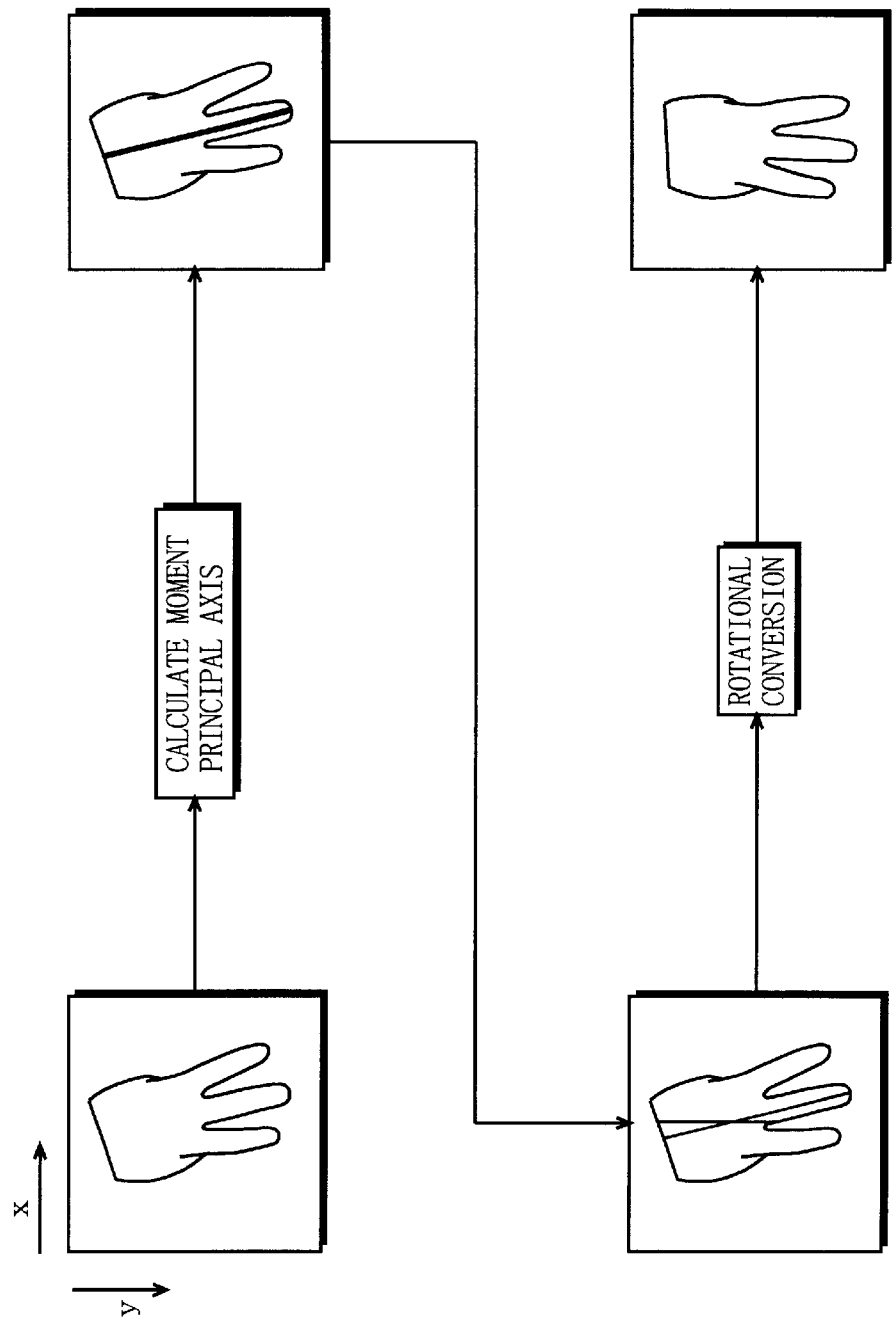
FIG. 34 shows the outline of processing carried out by a rotation angle calculation part 65 in FIG. 32.

Next, by referring to FIGS. 33 to 35, it is described stepwise how the hand image normalization parts 11 and 21 normalize the hand image. FIG. 33 exemplarily shows the structure of a storage table provided in the color distribution storage part 61 in FIG. 32. Note that, the storage table in FIG. 33 is an exemplary 3D look-up table (LUT) in RGB color space. FIG. 34 shows the outline of the processing carried out by the rotation angle calculation part 65 in FIG. 32. FIG. 35 exemplarily shows the processing carried out by the finger characteristic emphasizing part 68 in FIG. 32.

First of all, to the color distribution part 61, a beige region necessary to extract the hand region from the image with the non-artificial background is set. The color distribution storage part 61 is provided with the 3D LUT in RGB space as shown in FIG. 33. In order to obtain the 3D LUT, a 3D color space CS structured by three color values (axis) R, G, B each taking a discrete value is divided into divided spaces DS according to a width of d1, d2, or d3 depending which axis. The 3D LUT accordingly stores data values each corresponding to the color at a barycenter (lattice point) in the divided space DS. In other words, the 3D LUT is a table which stores a value c {=f(r,g,b)} of a function having the 3D coordinates (r,g,b) at each lattice point as a parameter.

In the tenth embodiment, supposedly, in the color distribution storage part 61, any color region for the hand, i.e., any region in beige is set to a positive value, and other color regions are set to "0".

First, the hand region extraction part 62 scans the input image, and compares the color of the pixel thereof with the color at each of the lattice points in the 3D LUT stored in the color distribution storage part 61. Thereafter, the hand region extraction part 62 calculates a data value of the lattice point located closest thereto. When the color of the pixel is beige, a positive value is outputted, and otherwise "0". In this manner, the beige regions can be extracted. Herein, it may also be effective if a value obtained through interpolation operation subjected to six lattice points in the vicinity of the selected lattice point is defined as the above-described function f. The hand region extraction part 62 selects, among the extracted beige regions, the region whose size is the closest to the hand, and deletes the rest of the regions in the hand image as noise. The hand image obtained thereby is outputted to the wrist region deletion part 63.

Herein, the technique for setting the beige region to the color distribution storage part 61 includes, other than the above-described, a technique for setting a constant (e.g., 255 bits) to the beige region (in this case, the image comes from the hand region extraction part 62 is a silhouette image), a technique for using the 3D LUT in which a shadowed area in the beige region is set to a value indicating darkness, and a highly-reflected area therein is set to a value indicating brightness, or a technique for setting a color distribution of the hand image directly to the 3D LUT without any change.

Thereafter, the wrist region deletion part 63 finds which direction the wrist is oriented in the hand image extracted by the hand region extraction part 62, and then deletes the wrist region according thereto. This can be done in a similar manner to the method shown in FIG. 2. The region displacement part 64 receives the hand image from which the wrist region is deleted, and then displaces the hand image in such a manner that a barycenter of the hand region coincides with the center of the hand image. The rotation angle calculation part 65 calculates an angle, as shown in FIG. 34, between a moment principal axis (a direction to which the hand is oriented, i.e, palm principal axis) in the hand region and a certain axis (e.g., x axis) in the image.

Assuming that the hand image is f(x, y), and a barycenter coordinates of the hand is $(x_g, y_g)$, $M_{11}$, $M_{20}$, and $M_{02}$ are each obtained by the following equation (5).

$$M_{pq} = \sum_x \sum_y (x - x_g)^p (y - y_g)^q f(x, y) \qquad (5)$$

Consequently, an angle θ between the moment principal axis and the x axis can be obtained by the following equation (6).

$$\theta = \frac{1}{2} \tan^{-1} \left( \frac{2M_{11}}{M_{20} - M_{02}} \right) \qquad (6)$$

After the angle calculation, the region rotation part 66 rotates the hand region in such a manner that the direction of the moment principal axis coincides with that of the y axis. The size normalization part 67 then normalizes, in a predetermined size, the rotated hand region.

These wrist region deletion part 63, the region displacement part 64, the rotation angle calculation part 65, the region rotation part 66, and the size normalization part 67 are the constituents of the hand image normalization parts 11 and 21 in the first to seventh embodiments. In the tenth embodiment, for the image recognition with higher accuracy, the finger characteristic emphasizing part 68 deletes a predetermined region other than the fingers from the normalized hand region so as to emphasize the characteristics of the fingers. Hereinafter, by referring to FIG. 35, it is exemplarily described how the finger characteristic emphasizing part 68 is operated to process.

In [Example 1] in FIG. 35, the finger region is emphasized by deleting, from the hand image, a fan-shaped region having ±A degrees in a −y direction (direction of the moment principal axis to which the wrist is oriented). Two sides of the fan-shaped region is extending from the barycenter in the hand region (i.e., a center of the image). In [Example 2], the finger region is emphasized by first forming a fan-shaped region whose side is a distance D in the −y direction in the hand image. Then, a part locating further therefrom is deleted. In [Example 3], the finger region is emphasized by simply deleting a region separated by a line horizontally drawn from a point having a predetermined length from the wrist side. In [Example 4], the finger region is emphasized by subjecting the hand image to polar-coordinates conversion.

As is known from the above, according to the device and the method for recognizing hand shape and position of the tenth embodiment, when normalizing the hand image, in addition to the deletion of the wrist region, the hand region is extracted based on color (beige), or the characteristics of the fingers are emphasized after normalization. In this manner, the hand can be photographed with a non-artificial background, and from the image taken in thereby, the hand shape and position can be recognized with higher accuracy.

(Eleventh Embodiment)

An eleventh embodiment of the present invention provides a technique for recognizing hand shape and position even if an image for recognition is not commonly oriented as other hand shape images. This is implemented by normalizing the input hand images obtained by several cameras also in hand orientation. It is applicable to a case, for example, where the hand shape image information storage parts 12A to 12C in the first to tenth embodiments are only stored with the hand shape images only upon the palm-principal axis.

Such technique in the eleventh embodiment can be realized in a manner that the hand image normalization part 21 in the first to tenth embodiments additionally finds which direction the hand is oriented by setting the moment principal axis to each of the input hand images from the several cameras, and then normalizes the input hand images also in hand orientation.

Figure 36:
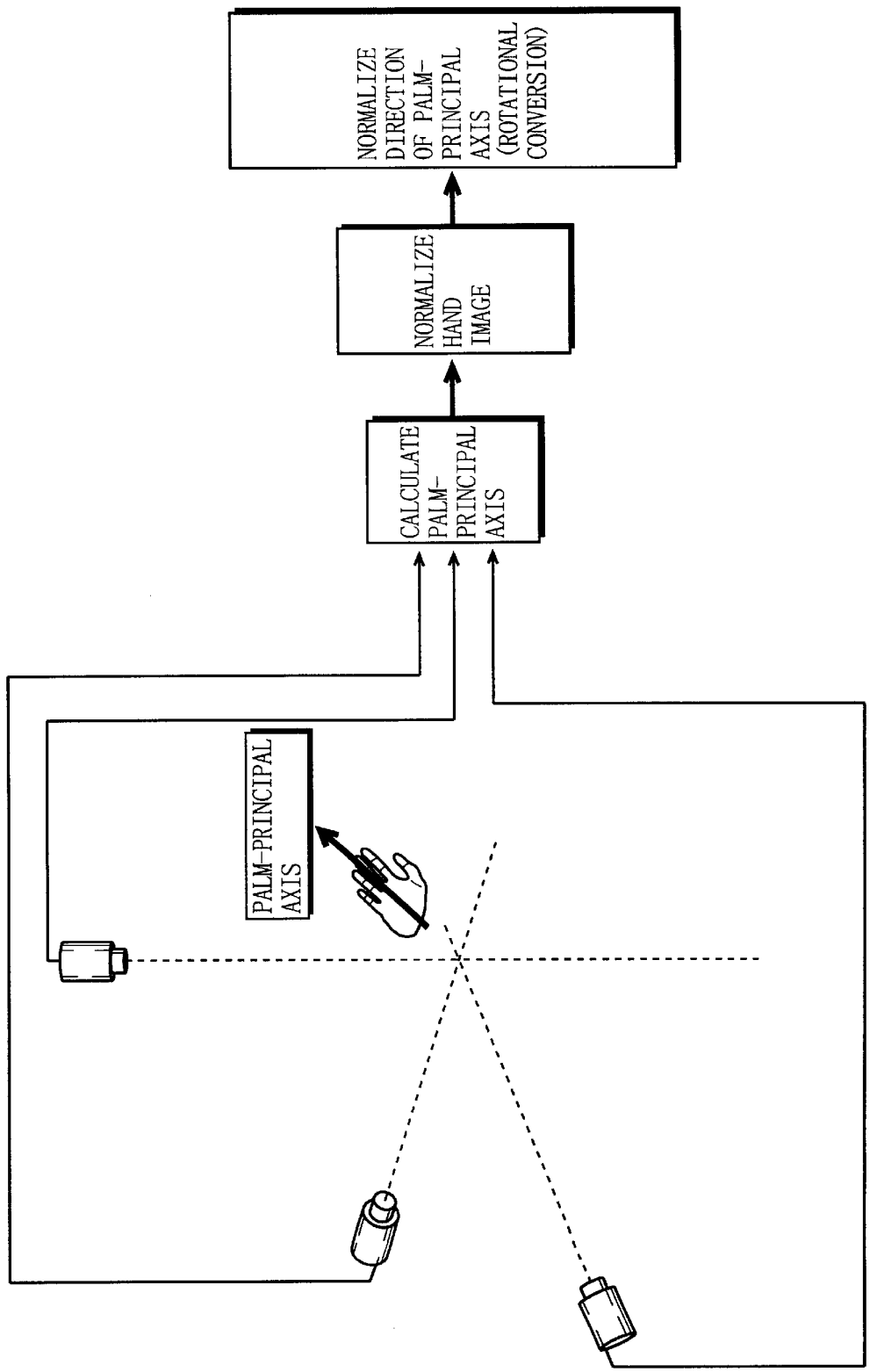
FIG. 36 shows, in a device for recognizing hand shape and position according to an eleventh embodiment of the present invention, an exemplary concept of determining, before normalization, a hand orientation by referring to input hand images obtained from a plurality of cameras.

Since the hand image normalization part 21 in the device of the eleventh embodiment is structurally similar to the hand image normalization part 21 in the devices in the first to tenth embodiments, no drawing is provided therefor. FIG. 36 shows an exemplary concept of a technique for normalizing the images after the hand orientation is determined by several cameras. FIG. 36 exemplarily shows a case where three cameras are used.

It is herein assumed that three cameras are used to photograph the hand at each location shown in FIG. 36.

First of all, the hand image normalization part 21 deletes a wrist region from each of the input hand images in a similar manner to the above embodiments. Thereafter, the hand image normalization part 21 displaces the hand region of the input hand image from which the wrist region is deleted to the center of the image, and then determines the direction of the moment principal axis in the hand region (same manner as for the region displacement part 64 and the rotation angle calculation part 65 in the tenth embodiment). Next, by referring to the moment principal axis, the hand image normalization part 21 calculates the direction of the principal axis in the 3D space as a vector value, and then calculates a conversion matrix in such a manner that the principal axis is directed to be perpendicular to the optical axis. Thereafter, according to the calculated conversion matrix, the hand image normalization part 21 changes the shape of the input hand images taken in from the cameras. Herein, the input hand images may be changed in shape by applying a technique under general affine transformation.

As is known from the above, according to the device and the method for recognizing hand shape and position of the eleventh embodiment, even in a case where the hand shape image information storage parts 12A to 12C are only stored with the input hand images upon the palm-principal axis, an image which is not commonly oriented as other hand shape images can be defined by hand shape and position.

While the invention has been described in detail, the foregoing description is in all aspects illustrative and not restrictive. It is understood that numerous other modifications and variations can be devised without departing from the scope of the invention.

What is claimed is:

1. A device for recognizing hand shape and position of an input hand image, said device comprising:

first hand image normalization means for receiving a plurality of hand images varied in hand shape and position, and after a wrist region is respectively deleted therefrom, subjecting the hand images to normalization in a predetermined manner to generate hand shape images;

hand shape image information storage means for storing so the hand shape images together with shape information and position information about each of the hand shape images;

eigenspace calculation means for calculating an eigenvalue and an eigenvector from each of the hand shape images based on an eigenspace method;

eigenvector storage means for storing the eigenvectors;

first eigenspace projection means for calculating eigenspace projection coordinates respectively for the hand shape images by projecting the hand shape images onto an eigenspace having the eigenvectors as a basis, and storing the eigenspace projection coordinates into said hand shape image information storage means;

second hand image normalization means for receiving the input hand image, and after a wrist region is deleted therefrom, normalizing the input hand image to generate an input hand shape image being equivalent to the hand shape images;

second eigenspace projection means for calculating eigenspace projection coordinates for the input hand shape image by projecting the input hand shape image onto the eigenspace having the eigenvectors as the basis;

hand shape image selection means for comparing the eigenspace projection coordinates calculated by said second eigenspace projection means with the eigenspace projection coordinates stored in said hand shape image information storage means, and determining which of the hand shape images is closest to the input hand shape image; and shape/position output means for obtaining, for output, the shape information and the position information of the closest hand shape image from said hand shape image information storage means.

2. A device for recognizing hand shape and position of an input hand image, said device comprising:

first hand image normalization means for receiving a plurality of hand images varied in hand shape and position, and after a wrist region is respectively deleted therefrom, subjecting the hand images to normalization in a predetermined manner to generate hand shape images;

hand shape image information storage means for storing the hand shape images together with shape information and position information about each of the hand shape images;

eigenspace calculation means for calculating an eigenvalue and an eigenvector from each of the hand shape images under analysis based on an eigenspace method;

eigenvector storage means for storing the eigenvectors;

first eigenspace projection means for calculating eigenspace projection coordinates respectively for the hand shape images by projecting the hand shape images onto an eigenspace having the eigenvectors as a basis, and storing the eigenspace projection coordinates into said hand shape image information storage means;

cluster evaluation means for classifying, into clusters, the eigenspace projection coordinates under cluster evaluation, determining which of the hand shape images belongs to which cluster for storage into said hand shape image information storage means, and obtaining statistical information about each cluster;

cluster information storage means for storing each of the statistical information together with the cluster corresponding thereto;

second hand image normalization means for receiving the input hand image, and after a wrist region is deleted therefrom, normalizing the input hand image to generate an input hand shape image being equivalent to the hand shape images;

second eigenspace projection means for calculating eigenspace projection coordinates for the input hand shape image by projecting the input hand shape image onto the eigenspace having the eigenvectors as the basis;

maximum likelihood cluster judgment means for comparing the eigenspace projection coordinates calculated by said second eigenspace projection means with each of coordinates included in the statistical information stored in said cluster information storage means, and determining which cluster is the closest;

image comparison means for comparing the hand shape images included in the closest cluster with the input hand shape image, and determining which of the hand shape images is most closely analogous to the input hand shape image; and shape/position output means for obtaining, for output, the shape information and the position information of the most analogous hand shape image from said hand shape image information storage means.

3. The device for recognizing hand shape and position as claimed in claim 2, wherein said image comparison means includes:

identical shape classification means for classifying, according to hand shape, the hand shape images included in the cluster determined by said maximum likelihood cluster judgment means into groups before comparing the hand shape images with the input hand shape image generated by said second hand image normalization means;

shape group statistic calculation means for calculating a statistic representing the groups; and maximum likelihood shape judgment means for calculating a distance between the input hand shape image and the statistic, and outputting a hand shape included in the closest group.

4. The device for recognizing hand shape and position as claimed in claim 2, wherein said cluster evaluation means obtains the hand shape images and the shape information for each cluster from said hand shape image information storage means, calculates a partial region respectively of the hand shape images for discrimination, and stores the partial regions into said cluster information storage means, and wherein said image comparison means compares the hand shape images in the cluster determined by said maximum likelihood cluster judgment means with the input hand shape image generated by said second hand image normalization means only in the partial region corresponding to the cluster.

5. The device for recognizing hand shape and position as claimed in claim 2, wherein, when the input hand image is plurally provided by photographing a hand from several directions, said second hand image normalization means generates the input hand shape image for each of the input hand images, said second eigenspace projection means calculates the eigenspace projection coordinates in the eigenspace respectively for the input hand shape images generated by said second hand image normalization means, said maximum likelihood cluster judgment means compares each of the eigenspace projection coordinates calculated by said second eigenspace projection means with the statistical information, and determines which cluster is the closest, and said image comparison means merges the closest clusters determined by said maximum likelihood cluster judgment means, and estimates hand shape and position consistent with the shape information and the position information about the hand shape images in each of the clusters.

6. The device for recognizing hand shape and position as claimed in claim 1, wherein said first hand image normalization means and said second hand image normalization means respectively include:

color distribution storage means for previously storing a color distribution of the hand region to be extracted from the input hand image;

hand region extraction means for extracting the hand region from an input hand image according to the color distribution;

wrist region deletion means for finding which direction a wrist is oriented, and deleting a wrist region from the hand region according to the direction;

region displacement means for displacing the hand region from which the wrist region is deleted to a predetermined location on the image;

rotation angle calculation means for calculating a rotation angle in such a manner that the hand in the hand region is oriented to a predetermined direction;

region rotation means for rotating, according to the rotation angle, the hand region in such a manner that the hand therein is oriented to a direction; and size normalization means for normalizing the rotated hand region to be in a predetermined size.

7. The device for recognizing hand shape and position as claimed in claim 2, wherein said first hand image normalization means and said second hand image normalization means respectively include:

color distribution storage means for previously storing a color distribution of the hand region to be extracted from the input hand image;

hand region extraction means for extracting the hand region from an input hand image according to the color distribution;

wrist region deletion means for finding which direction a wrist is oriented, and deleting a wrist region from the hand region according to the direction;

region displacement means for displacing the hand region from which the wrist region is deleted to a predetermined location on the image;

rotation angle calculation means for calculating a rotation angle in such a manner that the hand in the hand region is oriented to a predetermined direction;

region rotation means for rotating, according to the rotation angle, the hand region in such a manner that the hand therein is oriented to a direction; and size normalization means for normalizing the rotated hand region to be in a predetermined size.

8. The device for recognizing hand shape and position as claimed in claim 1, further comprising:

instruction storage means for storing an instruction corresponding respectively to the shape information and the position information; and instruction output means for receiving the shape information and the position information provided by said shape/position output means, and obtaining, for output, the instruction respectively corresponding to the shape information and the position information from said instruction storage means.

9. A method for recognizing hand shape and position of an input hand image, said method comprising:

receiving a plurality of hand images varied in hand shape and position, and after a wrist region is respectively deleted therefrom, subjecting the hand images to normalization in a predetermined manner to generate hand shape images;

calculating an eigenvalue and an eigenvector from each of the hand shape images based on an eigenspace method;

calculating eigenspace projection coordinates respectively for the hand shape images by projecting the hand shape images onto an eigenspace having the eigenvectors as a basis;

receiving the input hand image, and after a wrist region is deleted therefrom, normalizing the input hand image to generate an input hand shape image being equivalent to the hand shape images;

calculating eigenspace projection coordinates for the input hand shape image by projecting the input hand shape image onto the eigenspace having the eigenvectors as the basis;

comparing the eigenspace projection coordinates calculated for the hand shape images with the eigenspace projection coordinates calculated for the input hand shape image, and determining which of the hand shape images is closest to the input hand shape image; and outputting the shape information and the position information of the closest hand shape image.

10. A method for recognizing hand shape and position of an input hand image, said method comprising:

receiving a plurality of hand images varied in hand shape and position, and after a wrist region is respectively deleted therefrom, subjecting the hand images to normalization in a predetermined manner to generate hand shape images;

calculating an eigenvalue and an eigenvector from each of the hand shape images based on an eigenspace method;

calculating eigenspace projection coordinates respectively for the hand shape images by projecting the hand shape images onto an eigenspace having the eigenvectors as a basis;

classifying, under cluster evaluation, the eigenspace projection coordinates into clusters, determining which of the hand shape images belongs to which cluster, and obtaining statistical information about each of the clusters;

receiving the input hand image, and after a wrist region is deleted therefrom, normalizing the input hand image to generate an input hand shape image being equivalent to the hand shape images;

calculating eigenspace projection coordinates for the input hand shape image by projecting the input hand shape image onto the eigenspace having the eigenvectors as the basis;

comparing the eigenspace projection coordinates calculated for the input hand shape image with each of the statistical information, and determining the closest cluster;

comparing each of said hand shape images included in the closest cluster with the input hand shape image, and determining which of the hand shape images is most analogous to the input hand shape image, and outputting the shape information and the position information of the most analogous hand shape image.

11. The method for recognizing hand shape and position as claimed in claim 10, wherein said comparing each of the hand shape images and determining includes:

classifying, into clusters, the hand shape images included in the cluster determined in said comparing the eigenspace projection coordinates and determining before comparing the hand shape images with the input hand shape image generated in said receiving and normalizing of the input hand image;

calculating a statistic representing the clusters; and calculating a distance between the input hand shape image and the statistic, and outputting a hand shape included in the closest cluster.

12. The method for recognizing hand shape and position as claimed in claim 10, wherein, in said classifying and obtaining, according to the hand shape images and the shape information, a partial region is calculated respectively for the hand shape images for discrimination, and wherein in said comparing each of the hand shape images and determining, the hand shape images in the cluster determined in said comparing the eigenspace projection coordinates and determining are compared with the input hand shape image generated in said receiving of the input hand image only in the partial region corresponding to the cluster.

13. The method for recognizing hand shape and position as claimed in claim 10, wherein, when the input hand image is plurally provided by photographing a hand from several directions, in said, receiving and normalizing of the input hand image, the input hand shape image is generated for each of the input hand images, in said calculating of the eigenspace projection coordinates, eigenspace projection coordinates in the eigenspace is calculated respectively for the input hand shape images generated in said receiving and normalizing of the input hand image, in said comparing the eigenspace projection coordinates and determining, each of the eigenspace projection coordinates calculated in said calculating eigenspace projection coordinates is compared with the statistical information, and the closest cluster is determined, and in said comparing each of the hand shape images and determining, the closest clusters determined in said comparing the eigenspace projection coordinates and determining are merged, and hand shape and position consistent with the shape information and the position information of the hand shape images in each of the clusters is estimated.

14. The method for recognizing hand shape and position as claimed in claim 10, wherein said receiving a plurality of hand images and subjecting the hand images to normalization and said receiving the input hand images and normalizing the input hand image respectively include:

previously storing a color distribution of the hand region to be extracted from the input hand image;

extracting the hand region from an input hand image according to the color distribution;

finding which direction a wrist is oriented, and deleting a wrist region from the hand region according to the direction;

displacing said the hand region from which the wrist region is deleted to a predetermined location on the image;

calculating a rotation angle in such a manner that the hand in the hand region is oriented to a predetermined direction;

rotating, according to the rotation angle, the hand region in such a manner that the hand therein is oriented to a direction; and normalizing the rotated hand region to be in a predetermined size.

15. The method for recognizing hand shape and position as claimed in claim 11, wherein said receiving a plurality of hand images and subjecting the hand images to normalization and said receiving the input hand images and normalizing the input hand image respectively include:

previously storing a color distribution of the hand region to be extracted from the input hand image;

extracting the hand region from an input hand image according to the color distribution;

finding which direction a wrist is oriented, and deleting a wrist region from the hand region according to the direction;

displacing the hand region from which the wrist region is deleted to a predetermined location on the image;

calculating a rotation angle in such a manner that the hand in the hand region is oriented to a predetermined direction;

rotating, according to the rotation angle, the hand region in such a manner that the hand therein is oriented to a direction; and normalizing the rotated hand region to be in a predetermined size.

16. The method for recognizing hand shape and position as claimed in claim 14, further comprising:

storing an instruction corresponding respectively to the shape information and the position information; and receiving the shape information and the position information outputted in said outputting, and obtaining, for output, the instruction respectively corresponding to the shape information and the position information stored in said storing.

17. A recording medium having stored thereon, a computer device executable program for carrying out a method for recognizing hand shape and position of an input hand image the program being for realizing an operational environment on the computer device including:

receiving a plurality of hand images varied in hand shape and position, and after a wrist region is respectively deleted therefrom, subjecting the hand images to normalization in a predetermined manner to generate hand shape images;

calculating an eigenvalue and an eigenvector from each of the hand shape images under analysis based on an eigenspace method;

calculating eigenspace projection coordinates respectively for the hand shape images by projecting the hand shape images onto an eigenspace having the eigenvectors as a basis;

receiving the input hand image, and after a wrist region is deleted therefrom, normalizing the input hand image to generate an input hand shape image being equivalent to the hand shape images;

calculating eigenspace projection coordinates for the input hand shape image by projecting the input hand shape image onto the eigenspace having the eigenvectors as the basis;

comparing the eigenspace projection coordinates calculated for the hand shape images with the eigenspace projection coordinates calculated for the input hand shape image, and determining which of the hand shape images is closest to the input hand shape image; and outputting the shape information and the position information of the closest hand shape image.

18. A recording medium having stored thereon, a computer device executable for carrying out a method for recognizing hand shape and position of an input hand image, the program being for realizing an operational environment on the computer device including:

receiving a plurality of hand images varied in hand shape and position, and after a wrist region is respectively deleted therefrom, subjecting the hand images to normalization in a predetermined manner to generate hand shape images;

calculating an eigenvalue and an eigenvector from each of the hand shape images under analysis based on an eigenspace method;

calculating eigenspace projection coordinates respectively for the hand shape images by projecting the hand shape images onto an eigenspace having the eigenvectors as a basis;

classifying, into clusters, the eigenspace projection coordinates under cluster evaluation, determining which of the hand shape images belongs to which cluster, and obtaining statistical information about each cluster;

receiving the input hand image, and after a wrist region is deleted therefrom, normalizing the input hand image to generate an input hand shape image being equivalent to the hand shape images;

calculating eigenspace projection coordinates for the input hand shape image by projecting the input hand shape image onto the eigenspace having the eigenvectors as the basis;

comparing the eigenspace projection coordinates calculated for the input hand shape image with each of coordinates included in the statistical information, and determining which cluster is the closest;

comparing the hand shape images included in the closest cluster with the input hand shape image, and determining which of the hand shape images is most closely analogous to the input hand shape image; and outputting the shape information and the position information of the most analogous hand shape image.

19. The recording medium as claimed 18, wherein said comparing each of the hand shape images and determining includes:

classifying, into clusters, the hand shape images included in the cluster determined in said comparing the eigenspace projection coordinates and determining before comparing the hand shape images with the input hand shape image generated in said receiving and normalizing of the input hand image;

calculating a statistic representing the clusters; and calculating a distance between the input hand shape image and the statistic, and outputting a hand shape included in the closest cluster.

20. The recording medium as claimed in claim 18, wherein, in said classifying and obtaining, according to the hand shape images and the shape information, a partial region is calculated respectively for the hand shape images for discrimination, and wherein in said comparing each of the hand shape images and determining, the hand shape images in the cluster determined in said comparing the eigenspace projection coordinates and determining are compared with the input hand shape image generated in said receiving of the input hand image only in the partial region corresponding to the cluster.

21. The recording medium as claimed in claim 18, wherein, when the input hand image is plurally provided by photographing a hand from several directions, in said, receiving and normalizing of the input hand image, the input hand shape image is generated for each of the input hand images, in said calculating of the eigenspace projection coordinates, eigenspace projection coordinates in the eigenspace is calculated respectively for the input hand shape images generated in said receiving and normalizing of the input hand image, in said comparing the eigenspace projection coordinates and determining, each of the eigenspace projection coordinates calculated in said calculating eigenspace projection coordinates is compared with the statistical information, and the closest cluster is determined, and in said comparing each of the hand shape images and determining, the closest clusters determined in said comparing the eigenspace projection coordinates and determining are merged, and hand shape and position consistent with the shape information and the position information of the hand shape images in each of the clusters is estimated.

22. The recording medium as claimed in claim 18, wherein said receiving a plurality of hand images and subjecting the hand images to normalization and said receiving the input hand images and normalizing the input hand image respectively include:

previously storing a color distribution of the hand region to be extracted from the input hand image;

extracting the hand region from an input hand image according to the color distribution;

finding which direction a wrist is oriented, and deleting a wrist region from the hand region according to the direction;

displacing the hand region from which the wrist region is deleted to a predetermined location on the image;

calculating a rotation angle in such a manner that the hand in the hand region is oriented to a predetermined direction;

rotating, according to the rotation angle, the hand region in such a manner that the hand therein is oriented to a direction; and normalizing the rotated hand region to be in a predetermined size.

23. The recording medium as claimed in claim 19, wherein said first normalization step and said second normalization step respectively include:

a color storage step of previously storing a color distribution of said hand region to be extracted from the input hand image;

a step of extracting said hand region from an input hand image according to said color distribution;

a step of finding which direction a wrist is oriented, and deleting a wrist region from said hand region according to the direction;

a step of displacing said hand region from which said wrist region is deleted to a predetermined location on the image;

a step of calculating a rotation angle in such a manner that the hand in said hand region is oriented to a predetermined direction;

a step of rotating, according to said rotation angle, said hand region in such a manner that the hand therein is oriented to a direction; and a step of normalizing said rotated hand region to be in a predetermined size.

24. The recording medium claimed in claim 17, further comprising:

storing an instruction corresponding respectively to the shape information and the position information; and receiving the shape information and the position information outputted in said outputting, and obtaining, for output, the instruction respectively corresponding to the shape information and the position information stored in said storing.

25. The device for recognizing hand shape and position as claimed in claim 1, wherein said first hand image normalization means is operable to subject the hand images to normalization in a predetermined manner based on hand orientation, image size or image contrast.

26. The method for recording hand shape and position as claimed in claim 9, wherein said subjecting the hand images to normalization in a predetermined manner comprises subjecting the hand images to normalization in a predetermined manner based on hand orientation, image size or image contrast.

27. The method for recognizing hand shape and position as claimed in claim 10, wherein said subjecting the hand images to normalization in a predetermined manner comprises subjecting the hand images to normalization in a predetermined manner based on hand orientation, image size or image contrast.

28. The recording medium claimed in claim 17, wherein said subjecting the hand images to normalization in a predetermined manner comprises subjecting the hand images to normalization in a predetermined manner based on hand orientation, image size or image contrast.

* * * * *

UNITED STATES PATENT AND TRADEMARK OFFICE
CERTIFICATE OF CORRECTION

PATENT NO. : 6,819,782 B1
DATED : November 16, 2004
INVENTOR(S) : Kazuyuki Imagawa et al.

It is certified that error appears in the above-identified patent and that said Letters Patent is hereby corrected as shown below:

Column 53,
Line 37, should be amended as follows:
-- displacing the hand region from which the wrist --.

Column 54,
Line 4, should be amended as follows:
-- as claimed in claim 9, further comprising: --.
Line 15, should be amended as follows:
-- image, the program being for realizing an operational environment --.

Signed and Sealed this

Fifth Day of July, 2005

JON W. DUDAS
*Director of the United States Patent and Trademark Office*